(12) United States Patent
Yamazaki et al.

(10) Patent No.: US 11,742,673 B2
(45) Date of Patent: *Aug. 29, 2023

(54) POWER STORAGE SYSTEM AND POWER STORAGE DEVICE

(71) Applicant: SEMICONDUCTOR ENERGY LABORATORY CO., LTD., Atsugi (JP)

(72) Inventors: Shunpei Yamazaki, Tokyo (JP); Jun Koyama, Kanagawa (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 300 days.

This patent is subject to a terminal disclaimer.

(21) Appl. No.: 16/821,011

(22) Filed: Mar. 17, 2020

(65) Prior Publication Data

US 2020/0220362 A1 Jul. 9, 2020

Related U.S. Application Data

(63) Continuation of application No. 15/434,832, filed on Feb. 16, 2017, now Pat. No. 10,742,056, which is a
(Continued)

(30) Foreign Application Priority Data

Dec. 13, 2012 (JP) ................................. 2012-272121

(51) Int. Cl.
*G06F 1/00* (2006.01)
*H02J 7/00* (2006.01)
*H01M 10/42* (2006.01)

(52) U.S. Cl.
CPC ........ *H02J 7/00047* (2020.01); *H02J 7/0031* (2013.01); *H02J 7/00036* (2020.01); *H01M 10/4257* (2013.01); *H02J 7/00302* (2020.01)

(58) Field of Classification Search
CPC ...... H02J 7/007; H02J 7/00036; H02J 7/0031; H02J 7/00302; H02J 7/00047; H01M 10/4257; Y02E 60/10
See application file for complete search history.

(56) References Cited

U.S. PATENT DOCUMENTS 5,596,567 A 1/1997 DeMuro et al.
5,731,856 A 3/1998 Kim et al.
(Continued)

FOREIGN PATENT DOCUMENTS

EP 1737044 A 12/2006
EP 2072080 A 6/2009
(Continued)

OTHER PUBLICATIONS

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.
(Continued)

*Primary Examiner* — Xuxing Chen
(74) *Attorney, Agent, or Firm* — NIXON PEABODY LLP; Jeffrey L. Costellia

(57) ABSTRACT

The versatility of a power feeding device is improved. A power storage system includes a power storage device and a power feeding device. The power storage device includes data for identifying the power storage device. The power storage device includes a power storage unit, a switch that controls whether power from the power feeding device is supplied to the power storage unit, and a control circuit having a function of controlling a conduction state of the switch in accordance with a control signal input from the power feeding device. The power feeding device includes a signal generation circuit having a function of identifying the power storage device by the data input from the power
(Continued)

storage device, generating the control signal corresponding to the identified power storage device, and outputting the generated control signal to the power storage device.

8 Claims, 25 Drawing Sheets

Related U.S. Application Data continuation of application No. 14/103,883, filed on Dec. 12, 2013, now Pat. No. 9,577,446.

(56) References Cited

U.S. PATENT DOCUMENTS

| | | | |
|---|---|---|---|
| 5,744,864 A | | 4/1998 | Cillessen et al. |
| 5,754,868 A | * | 5/1998 | Yamamoto ............... G06F 1/263 700/297 |
| 5,963,012 A | | 10/1999 | Garcia et al. |
| 6,184,660 B1 | * | 2/2001 | Hatular .................. H02J 7/022 320/141 |
| 6,294,274 B1 | | 9/2001 | Kawazoe et al. |
| 6,563,174 B2 | | 5/2003 | Kawasaki et al. |
| 6,727,522 B1 | | 4/2004 | Kawasaki et al. |
| 7,049,190 B2 | | 5/2006 | Takeda et al. |
| 7,061,014 B2 | | 6/2006 | Hosono et al. |
| 7,064,346 B2 | | 6/2006 | Kawasaki et al. |
| 7,105,868 B2 | | 9/2006 | Nause et al. |
| 7,211,825 B2 | | 5/2007 | Shih et al. |
| 7,282,782 B2 | | 10/2007 | Hoffman et al. |
| 7,297,977 B2 | | 11/2007 | Hoffman et al. |
| 7,323,356 B2 | | 1/2008 | Hosono et al. |
| 7,385,224 B2 | | 6/2008 | Ishii et al. |
| 7,402,506 B2 | | 7/2008 | Levy et al. |
| 7,411,209 B2 | | 8/2008 | Endo et al. |
| 7,453,065 B2 | | 11/2008 | Saito et al. |
| 7,453,087 B2 | | 11/2008 | Iwasaki |
| 7,462,862 B2 | | 12/2008 | Hoffman et al. |
| 7,468,304 B2 | | 12/2008 | Kajl et al. |
| 7,501,293 B2 | | 3/2009 | Ito et al. |
| 7,674,650 B2 | | 3/2010 | Akimoto et al. |
| 7,732,819 B2 | | 6/2010 | Akimoto et al. |
| 7,962,222 B2 | | 6/2011 | He et al. |
| 8,202,365 B2 | | 6/2012 | Umeda et al. |
| 8,461,007 B2 | | 6/2013 | Yamazaki |
| 8,705,267 B2 | | 4/2014 | Endo et al. |
| 8,891,286 B2 | | 11/2014 | Endo et al. |
| 9,034,104 B2 | | 5/2015 | Yamazaki et al. |
| 9,202,877 B2 | | 12/2015 | Yamazaki |
| 9,231,283 B2 | | 1/2016 | Ikeuchi et al. |
| 9,257,971 B2 | | 2/2016 | Endo et al. |
| 9,687,663 B2 | | 6/2017 | He et al. |
| 9,812,533 B2 | | 11/2017 | Yamazaki |
| 9,935,451 B2 | | 4/2018 | Ikeuchi et al. |
| 10,118,045 B2 | | 11/2018 | He et al. |
| 2001/0046027 A1 | | 11/2001 | Tai et al. |
| 2002/0056838 A1 | | 5/2002 | Ogawa |
| 2002/0132454 A1 | | 9/2002 | Ohtsu et al. |
| 2003/0189401 A1 | | 10/2003 | Kido et al. |
| 2003/0218222 A1 | | 11/2003 | Wager, III et al. |
| 2004/0038446 A1 | | 2/2004 | Takeda et al. |
| 2004/0127038 A1 | | 7/2004 | Carcia et al. |
| 2004/0196680 A1 | * | 10/2004 | Kang ................. G11C 15/046 365/189.11 |
| 2005/0017302 A1 | | 1/2005 | Hoffman |
| 2005/0199959 A1 | | 9/2005 | Chiang et al. |
| 2006/0028168 A1 | | 2/2006 | Nishida |
| 2006/0035452 A1 | | 2/2006 | Carcia et al. |
| 2006/0043377 A1 | | 3/2006 | Hoffman et al. |
| 2006/0091793 A1 | | 5/2006 | Baude et al. |
| 2006/0108529 A1 | | 5/2006 | Saito et al. |
| 2006/0108636 A1 | | 5/2006 | Sano et al. |
| 2006/0110867 A1 | | 5/2006 | Yabuta et al. |
| 2006/0113536 A1 | | 6/2006 | Kumomi et al. |
| 2006/0113539 A1 | | 6/2006 | Sano et al. |
| 2006/0113549 A1 | | 6/2006 | Den et al. |
| 2006/0113565 A1 | | 6/2006 | Abe et al. |
| 2006/0170111 A1 | | 8/2006 | Isa et al. |
| 2006/0179973 A1 | | 8/2006 | Isa et al. |
| 2006/0181244 A1 | | 8/2006 | Luo et al. |
| 2006/0197092 A1 | | 9/2006 | Hoffman et al. |
| 2006/0208977 A1 | | 9/2006 | Kimura |
| 2006/0228974 A1 | | 10/2006 | Thelss et al. |
| 2006/0231882 A1 | | 10/2006 | Kim et al. |
| 2006/0233135 A1 | | 10/2006 | Kimura |
| 2006/0244107 A1 | | 11/2006 | Sugihara et al. |
| 2006/0284171 A1 | | 12/2006 | Levy et al. |
| 2006/0284172 A1 | | 12/2006 | Ishii |
| 2006/0292777 A1 | | 12/2006 | Dunbar |
| 2007/0024187 A1 | | 2/2007 | Shin et al. |
| 2007/0046191 A1 | | 3/2007 | Saito |
| 2007/0052025 A1 | | 3/2007 | Yabuta |
| 2007/0054507 A1 | | 3/2007 | Kaji et al. |
| 2007/0090365 A1 | | 4/2007 | Hayashi et al. |
| 2007/0108446 A1 | | 5/2007 | Akimoto |
| 2007/0152217 A1 | | 7/2007 | Lai et al. |
| 2007/0172591 A1 | | 7/2007 | Seo et al. |
| 2007/0187678 A1 | | 8/2007 | Hirao et al. |
| 2007/0187760 A1 | | 8/2007 | Furuta et al. |
| 2007/0194379 A1 | | 8/2007 | Hosono et al. |
| 2007/0252928 A1 | | 11/2007 | Ito et al. |
| 2007/0272922 A1 | | 11/2007 | Kim et al. |
| 2007/0287296 A1 | | 12/2007 | Chang |
| 2008/0006877 A1 | | 1/2008 | Mardilovich et al. |
| 2008/0038882 A1 | | 2/2008 | Takechi et al. |
| 2008/0038929 A1 | | 2/2008 | Chang |
| 2008/0050595 A1 | | 2/2008 | Nakagawara et al. |
| 2008/0073653 A1 | | 3/2008 | Iwasaki |
| 2008/0083950 A1 | | 4/2008 | Pan et al. |
| 2008/0106191 A1 | | 5/2008 | Kawase |
| 2008/0128689 A1 | | 6/2008 | Lee et al. |
| 2008/0129195 A1 | | 6/2008 | Ishizaki et al. |
| 2008/0150476 A1 | | 6/2008 | Lamothe |
| 2008/0166834 A1 | | 7/2008 | Kim et al. |
| 2008/0182358 A1 | | 7/2008 | Cowdery-Corvan et al. |
| 2008/0211454 A1 | | 9/2008 | Nishida |
| 2008/0224133 A1 | | 9/2008 | Park et al. |
| 2008/0254569 A1 | | 10/2008 | Hoffman et al. |
| 2008/0258139 A1 | | 10/2008 | Ito et al. |
| 2008/0258140 A1 | | 10/2008 | Lee et al. |
| 2008/0258141 A1 | | 10/2008 | Park et al. |
| 2008/0258143 A1 | | 10/2008 | Kim et al. |
| 2008/0296568 A1 | | 12/2008 | Ryu et al. |
| 2009/0066979 A1 | * | 3/2009 | Takeishi ............. G03G 15/5025 358/1.9 |
| 2009/0068773 A1 | | 3/2009 | Lai et al. |
| 2009/0073325 A1 | | 3/2009 | Kuwabara et al. |
| 2009/0114910 A1 | | 5/2009 | Chang |
| 2009/0134399 A1 | | 5/2009 | Sakakura et al. |
| 2009/0152506 A1 | | 6/2009 | Umeda et al. |
| 2009/0152541 A1 | | 6/2009 | Maekawa et al. |
| 2009/0212736 A1 | | 8/2009 | Baarman et al. |
| 2009/0278122 A1 | | 11/2009 | Hosono et al. |
| 2009/0280065 A1 | | 11/2009 | Hosono et al. |
| 2010/0065844 A1 | | 3/2010 | Tokunaga |
| 2010/0092800 A1 | | 4/2010 | Itagaki et al. |
| 2010/0109002 A1 | | 5/2010 | Itagaki et al. |
| 2010/0188044 A1 | * | 7/2010 | Yamamoto ............. H02J 7/0031 320/118 |
| 2011/0147739 A1 | | 6/2011 | Yamazaki et al. |
| 2012/0146577 A1 | | 6/2012 | Tanabe |
| 2012/0175953 A1 | * | 7/2012 | Ohkawa ............... G01R 31/396 307/18 |
| 2012/0194124 A1 | | 8/2012 | Toivola et al. |
| 2012/0221891 A1 | * | 8/2012 | Shimizu .................. G06F 1/30 714/15 |
| 2012/0293009 A1 | * | 11/2012 | Kim ...................... H02J 50/12 307/104 |
| 2012/0294102 A1 | * | 11/2012 | Ishizu ................... G11C 11/24 365/203 |
| 2012/0306433 A1 | | 12/2012 | Kim et al. |
| 2013/0063090 A1 | * | 3/2013 | Takeshita ............. H02J 7/0031 320/126 |

(56) References Cited

U.S. PATENT DOCUMENTS

| | | | | |
|---|---|---|---|---|
| 2013/0134412 | A1* | 5/2013 | Godo | H01L 29/4908 |
| | | | | 257/E29.296 |
| 2013/0257354 | A1 | 10/2013 | Koyama | |
| 2019/0030344 | A1 | 1/2019 | He et al. | |

FOREIGN PATENT DOCUMENTS

| | | |
|---|---|---|
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-152988 A | 5/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-034032 A | 2/2006 |
| JP | 2006-279844 A | 10/2006 |
| JP | 2009-518144 | 5/2009 |
| JP | 2009-167087 A | 7/2009 |
| JP | 2010-109778 A | 5/2010 |
| JP | 2010-187532 A | 8/2010 |
| JP | 2010-200485 A | 9/2010 |
| JP | 2011-109810 A | 6/2011 |
| JP | 2011-146698 A | 7/2011 |
| JP | 2011-176939 A | 9/2011 |
| JP | 2011-243976 A | 12/2011 |
| JP | 2012-125115 A | 6/2012 |
| JP | 2012-134961 A | 7/2012 |
| KR | 2012-0089776 A | 8/2012 |
| WO | WO-2004/114391 | 12/2004 |
| WO | WO-2007/067825 | 6/2007 |
| WO | WO-2011/062097 | 5/2011 |
| WO | WO-2011/074506 | 6/2011 |
| WO | WO-2011/132590 | 10/2011 |

OTHER PUBLICATIONS

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Nomura.K et ai., "Room-Temperature Fabrication of Transparent Flexible Thin-Film Transistors Using Amorphous Oxide Semiconductors", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Takahashi.M et al., "Theoretical Analysis of IGZO Transparent Amorphous Oxide Semiconductor", IDW'08 : Proceedings of the 15th International Display Workshops, Dec. 3, 2008, pp. 1637-1640.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Nakamura.M et al., "The phase relations in the In2O3—Ga2ZnO4—ZnO system at 1350° C", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor", Science, May 23, 2003, vol. 300, No. 5623, pp. 1269-1272.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Osada.T et al., "15.2: Development of Driver-Integrated Panel using Amorphous In—Ga—Zn-Oxide TFT", SID Digest '09 : SID International Symposium Digest of Technical Papers, May 31, 2009, vol. 40, pp. 184-187.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Lee. J et al., "World's Largest (15-Inch) XGA AMLCD Panel Using IGZO Oxide TFT", SID Digest '08 : SID International Symposium Digest or Technical Papers, May 20, 2008, vol. 39, pp. 625-628.

Nowatari.H et al., "60.2: Intermediate Connector With Suppressed Voltage Loss for White Tandem OLEDS", SID Digest '09 : SID International Symposium Digest or Technical Papers, May 31, 2009, vol. 40, pp. 899-902.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems", Journal of Solid-State Circuits , 2008, vol. 43, No. 1, pp. 292-299.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

(56) References Cited

OTHER PUBLICATIONS

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.

Park.J et a!., "Amorphous Indium-Gallium-Zinc Oxide TFTs and Their Application for Large Size AMOLED", AM-FPD '08 Digest of Technical Papers, Jul. 2, 2008, pp. 275-278.

Park.S et al., "Challenge to Future Displays: Transparent AM-OLED Driven by Peald Grown ZnO TFT", IMID '07 Digest, 2007, pp. 1249-1252.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDS", J. Soc. Inf. Display (Journal of the Society for Information Display), 2007, vol. 15. No. 1, pp. 17-22.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Miyasaka.M, "Suftla Flexible Microelectronics on Their Way to Business", SID Digest '07 : SID International Symposium Digest of Technical Papers, 2007, vol. 38, pp. 1673-1676.

Chern.H et al. "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Lee.H et al., "Current Status of, Challenges to, and Perspective View of AM-OLED ", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Nakamura.M, "Synthesis of Homologous Compound with New Long-Period Structure", Nirim Newsletter, Mar. 1, 1995, vol. 150, pp. 1-4.

Kikuchi.H et al., "Polymer-Stabilized Liquid Crystal Blue Phases", Nature Materials, Sep. 2, 2002, vol. 1, pp. 64-68.

Kimizuka.N et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, NI, Cu,Or Zn] at Temperatures Over 1000° C", Journal of Solid State Chemistry, 1985, vol. 60, pp. 382-384.

Kitzerow.H et al., "Observation of Blue Phases in Chiral Networks", Liquid Crystals, 1993, vol. 14, No. 3, pp. 911-916.

Costello.M et al. "Electron Microscopy of a Cholesteric Liquid Crystal and Its Blue Phase", Phys. Rev. A (Physical Review. A), May 1, 1984, vol. 29, No. 5, pp. 2957-2959.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Park.S et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Janotti.A et al., "Native Point Defects In ZnO", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Janotti.A et al., "Oxygen Vacancies In ZnO", Appl. Phys. Lett. (Applied Physics Letters) , 2005, vol. 87, pp. 122102-1-122102-3.

Oba.F et al., "Defect energetics in ZnO: A hybrid Hartree-Fock density functional study", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor", Philosophical Magazine, 2001, vol. 81, No. 5, pp. 501-515.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays". IDW '08 : Proceedings of the 6th International Display Workshops, Dec. 3, 2008, pp. 581-584.

Kim.S et al., "High-Performance oxide thin film transistors passivated by various gas plasmas", 214th ECS Meeting, 2008, No. 2317, ECS.

Clark.S et al., "First Principles Methods Using Castep", Zeitschrift fur Kristallographie, 2005, vol. 220, pp. 567-570.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Dry etching of ZnO films and plasma-induced damage to optical properties", J. Vac. Sci. Technol. B (Journal of Vacuum Science & Technology B), Mar. 1, 2003, vol. 21. No. 2, pp. 800-803.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

(56) References Cited

OTHER PUBLICATIONS

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

* cited by examiner

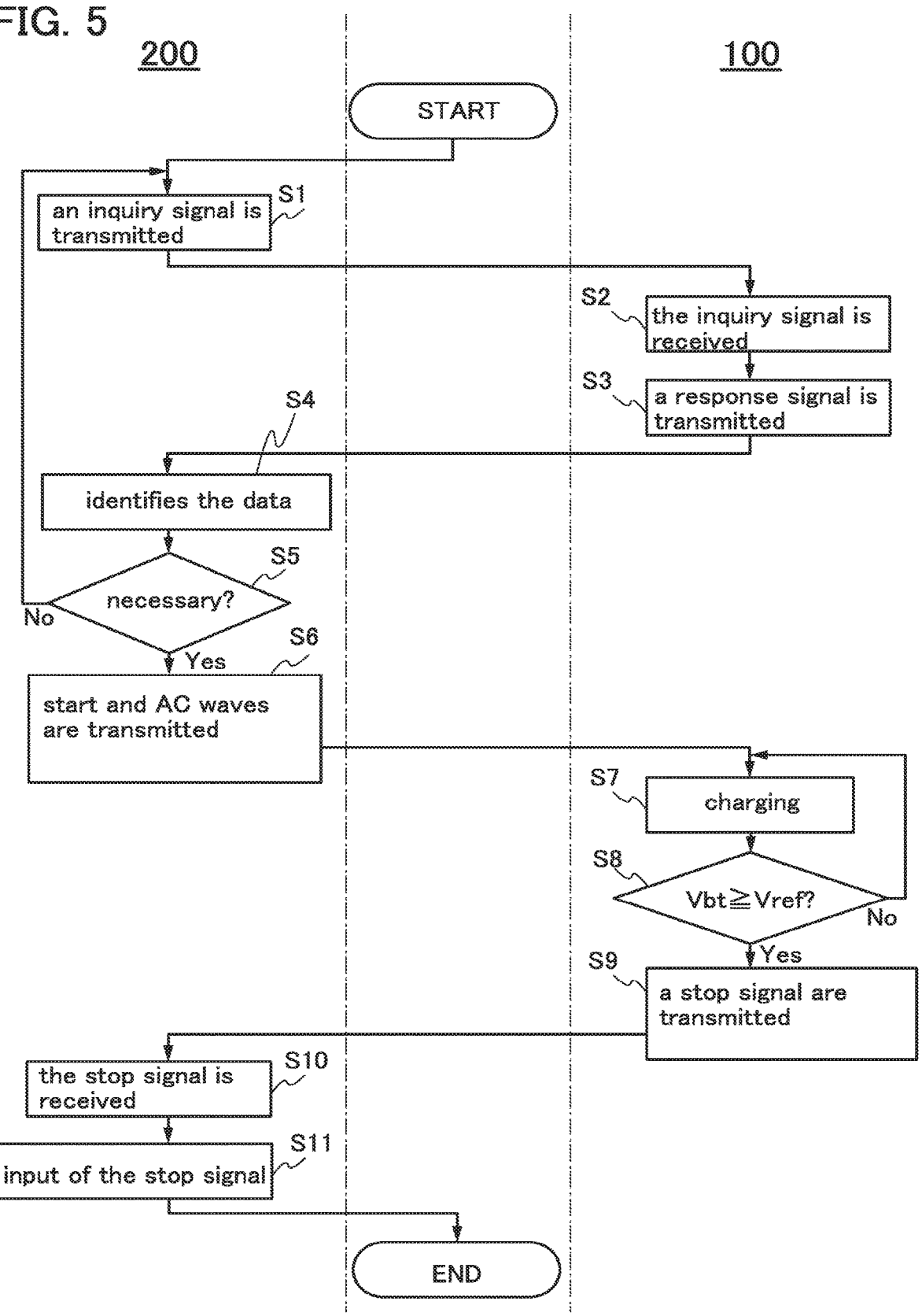

FIG. 11A1
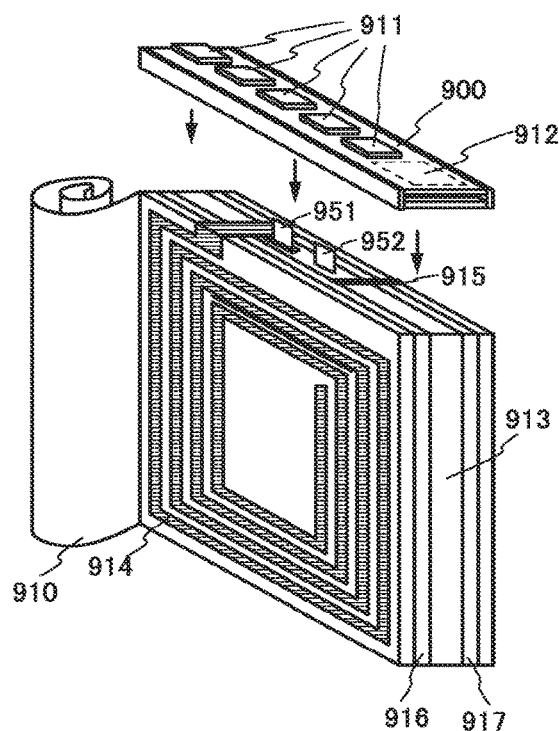
FIG. 11A2
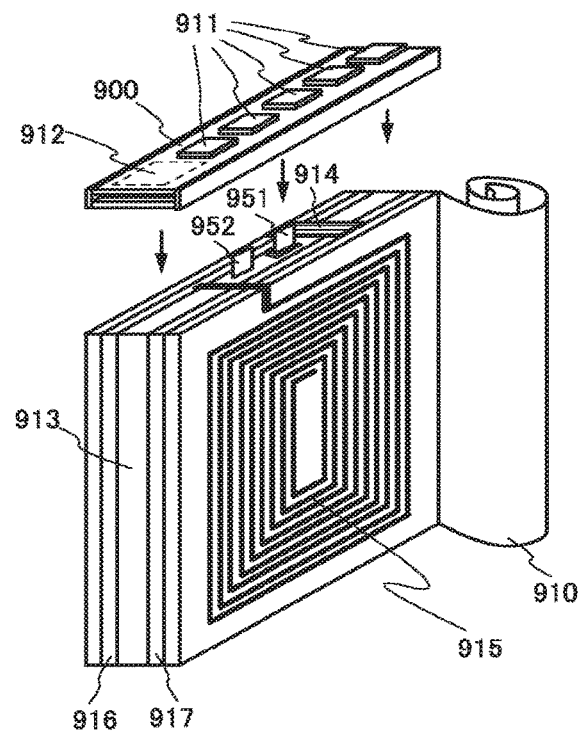
FIG. 11B1
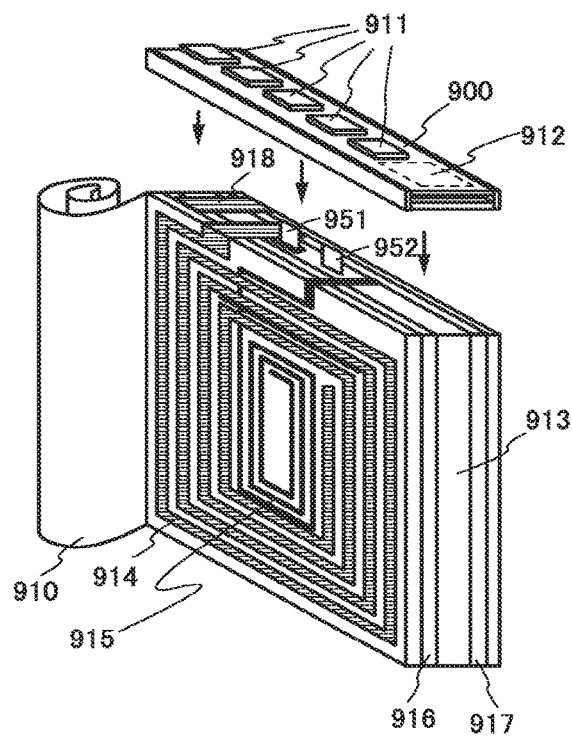
FIG. 11B2
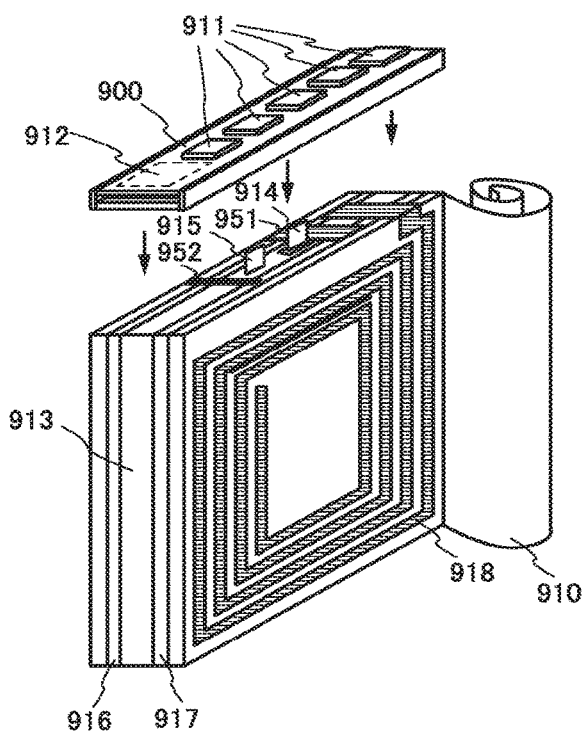

POWER STORAGE SYSTEM AND POWER STORAGE DEVICE

BACKGROUND OF INVENTION

1. Field of the Invention

The present invention relates to an object (a product including a machine, a manufacture, and a composition of matter) and a method (a process including a simple method and a production method). Specifically, one embodiment of the present invention relates to a power storage system, a power storage device, a semiconductor device, a display device, a emitting device, or another electrical device or a manufacturing method thereof. In particular, one embodiment of the present invention relates to a power storage system, a power storage device, a semiconductor device, a display device, a light-emitting, device, or another electrical device which includes an oxide semiconductor, or a manufacturing method thereof.

2. Description of the Related Art

In recent years, a variety of electrical devices, such as portable terminals (typified by mobile phones and smartphone), electric power tools, and electric vehicles, are equipped with power storage devices.

A power storage device includes a secondary battery, such as a lithium ion battery, which can be repeatedly used by accumulation of electricity by charging.

In an electrical device equipped with such a power storage device, the power storage device can be charged by a power feeding device connected to the electrical device, for example (e.g., Patent Document 1).

Moreover, in an electrical device equipped with such a power storage device, power is supplied from a power feeding device wirelessly, so that the power storage device can be charged even without being physically connected to the power feeding device (e.g., Patent Document 2). Patent Document 2 discloses, as examples of such a power feeding method, an electromagnetic induction method and a magnetic field resonance method.

In the case of using the power feeding methods disclosed in Patent Documents 1 and 2, a power storage device can be charged by a power feeding device that matches the specifications of the power storage device.

REFERENCE

Patent Document

[Patent Document 1] Japanese Published Patent Application No. 2010-109778
[Patent Document 2] Japanese Published Patent Application No. 2012-125115

SUMMARY OF THE INVENTION

An object of one embodiment of the present invention is to improve the versatility of a power feeding device.

Another object of one embodiment of the present invention is to improve the versatility of a power storage system using a power feeding device.

Another object of one embodiment of the present invention is to reduce power consumption of a power storage device.

Another object of one embodiment of the present invention is to improve the reliability of a power storage device.

Another object of one embodiment of the present invention is to provide a novel power storage device. Another object of one embodiment of the present invention is to provide a favorable power storage device.

Another object of one embodiment of the present invention is to provide a semiconductor device with low off-state current. Another object of one embodiment of the present invention is to provide a semiconductor device with low power consumption. Another object of one embodiment of the present invention is provide a semiconductor device using a transparent semiconductor layer. Another object of one embodiment of the present invention is to provide a semiconductor device using a semiconductor layer with high reliability.

One embodiment of the present invention can achieve at least one of the above objects. Note that in one embodiment of the present invention, them is no need to achieve all the objects. Other objects will be apparent from and can be derived from the description of the specification, the drawings, the claims, and the like.

In one embodiment of the present invention, at least one of a power storage device and a power feeding device may be used, for example.

In one embodiment of the present invention, conditions for charging a power storage device are optimized by using data for identifying the power storage device (also referred to as identification data); thus, for example, a plurality of power storage devices with different specifications can be charged by one power feeding device, which results in an improvement in versatility.

In this specification, data for identifying a power storage device includes specifications (e.g., mechanical characteristics or electrical characteristics) of the power storage device or information on the inside of the power storage device (e.g., the degree of deterioration or the remaining amount of accumulated electric energy). Examples of information on a power storage device include the average voltage, the capacity, the energy density, the resistance, output power, cycle characteristics, the temperature, the operating temperature range, and the allowable charging current of the power storage device. Other examples of information on a power storage device may include the manufacturer, the serial number, the weight, and the size of the power storage device. Note that the identification data may be individual identification data.

One embodiment of the present invention is a power storage system including a power storage device and a power feeding device. The power storage device includes data for identifying the power storage device. The power storage device includes a power storage unit, a switch that controls whether power from the power feeding device is supplied to the power storage unit, and a control circuit having a function of controlling a conduction state of the switch in accordance with a control signal input from the power feeding device. The power feeding device includes a signal generation circuit having a function of identifying the power storage device by the data input from the power storage device, generating the control signal corresponding to the identified power storage device, and outputting the generated control signal to the power storage device.

Another embodiment of the present invention is a power storage device including a power receiving circuit, a data communication circuit, a power storage unit, a first transistor between the power receiving circuit and the power storage unit, and a control circuit electrically connected to a gate of the first transistor and to the power storage unit. The control circuit includes a processor that includes a register and is electrically connected to the gate of the first transistor, a memory that includes data for identifying the power storage device and is electrically connected to the processor, and a controller electrically connected to the processor and to the memory. The register includes a first memory circuit that holds data in a period during which power is supplied to the processor from the power storage unit and a second memory circuit that holds data in a period during which supply of the power to the processor from the power storage unit is stopped. The second memory circuit includes a second transistor that controls writing and holding of data. An off-state current per micrometer of channel width of the second transistor is lower than or equal to 100 zA.

One embodiment of the present invention can improve the versatility of a power feeding device or a power storage system using a power feeding device.

One embodiment of the present invention can reduce power consumption of a power storage device.

One embodiment of the present invention can improve the reliability of a power storage device.

BRIEF DESCRIPTION OF THE DRAWINGS

FIG. 5 shows an example of a method for driving a power storage system.
FIGS. 11A1, 11A2, 11B1, and 11B2 illustrate examples of a power storage unit.

DETAILED DESCRIPTION OF THE INVENTION

Figure 1A:
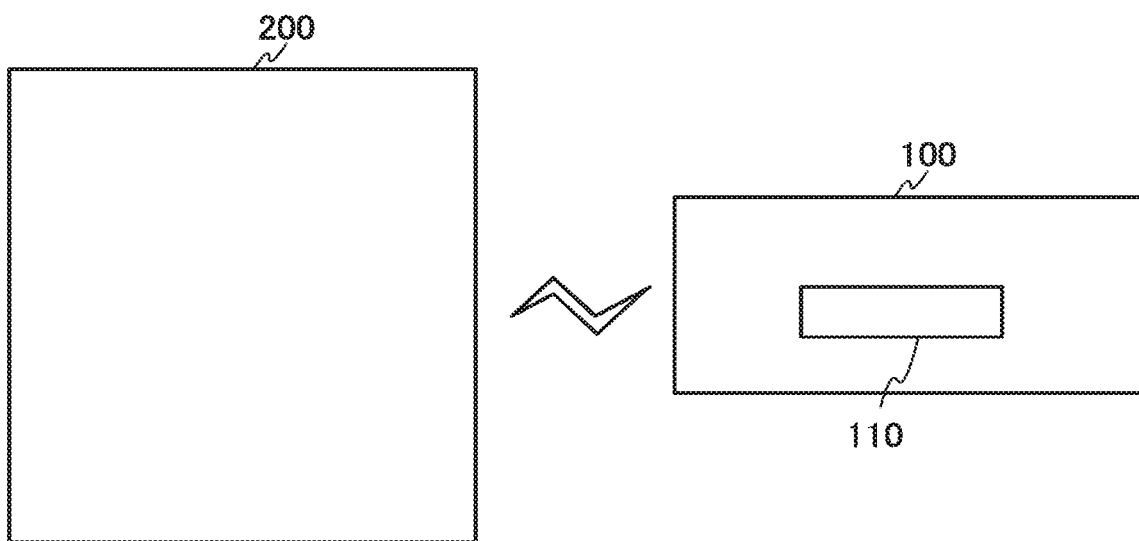
FIGS. 1A and 1B each illustrate an example of a power storage system.

Hereinafter, embodiments will be described with reference to drawings. Note that the embodiments can be implemented with various modes, and it will be readily appreciated by those skilled in the art that modes and details can be changed in various ways without departing from the spirit and scope of the present invention. The present invention is therefore not limited to the following description of the embodiments. Note that in structures of the invention described below, the same portions or portions having similar functions are denoted by common reference numerals, and the descriptions thereof are not repeated.

Note that what is described (or part thereof in one embodiment can be applied to, combined with, or exchanged with another content in the same embodiment and/or what is described (or part thereof) in another embodiment or other embodiments.

Note that in each embodiment, a content described in the embodiment is a content described with reference to a variety of diagrams or a content described with texts described in this specification.

In addition, by combining a diagram (or part thereof) described in one embodiment with another part of the diagram, a different diagram (or part thereof) described in the same embodiment, and/or a diagram (or part thereof) described in one or a plurality of different embodiments, much more diagrams can be formed.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, even when such portions are not specified, one embodiment of the present invention can be clear and it can be determined that one embodiment of the present invention is disclosed in this specification and the like in some cases. In particular, in the case where the number of portions to which the terminal is connected is plural, it is not necessary to specify the portions to which the terminal is connected. Therefore, it might be possible to constitute one embodiment of the invention by specifying only portions to which some of terminals of an active element (e.g., a transistor or a diode), a passive element (e.g., a capacitor or a resistor), or the like are connected.

Note that a content which is not specified in any drawing or text in the specification can be excluded from the invention. When the number range of values indicated by e.g., the maximum value and the minimum value is described, the range may be freely narrowed or a value in the range may be excluded, so that the invention can be specified by a range resulting from exclusion of part of the range. In this manner, it is possible to specify the technical scope of the present invention so that a conventional technology is excluded, for example.

Note that in this specification and the like, it might be possible those skilled in the art to specify the invention when at least the connection portion of a circuit is specified. Alternatively, it might be possible for those skilled in the art to specify the invention when at least a function of a circuit is specified. In other words, when a function of a circuit is specified, one embodiment of the present invention can be clear and it can be determined that one embodiment of the present invention is disclosed in this specification and the like in some cases. Therefore, when a connection portion of a circuit is specified, the circuit is disclosed as one embodiment of the invention even when a function of the circuit is not specified, and one embodiment of the invention can be constituted. Alternatively, when a function of a circuit is specified, the circuit is disclosed as one embodiment of the invention even when a connection portion of the circuit is not specified, and one embodiment of the invention can be constituted.

Further, the ordinal numbers such as "first" and "second" are used to avoid confusion between components and do not limit the number of each component.

Embodiment 1

FIG. 1A illustrates a configuration example of a power storage system. The power storage system illustrated in FIG. 1A includes a device 100 and a device 200.

Power is supplied to the device 100 from the device 200. Note that power may be supplied to the device 100 from a power source. The device 100 has a function of inputting and outputting signals. The device 100 may have a function of receiving power wirelessly, in which case the device 100 may serve as a power receiving device. Alternatively, the device 100 may have a function of storing power, in which case the device 100 may serve as a power storage device. Note that the device 100 may have both the function of receiving power wirelessly and the function of storing power, in which case the device 100 may serve as a power receiving device, a power storage device, or a semiconductor device. The device 100 may be provided with a protection circuit which has a function of preventing breakdown of the device 100 due to overcharge and overdischarge.

The device 100 includes data 110. The data 110 is data for identifying the device 100. For example, the device 100 may be provided with a memory and the data 110 may be stored therein. Note that the data 110 may be referred to as identification data.

Figure 4A:
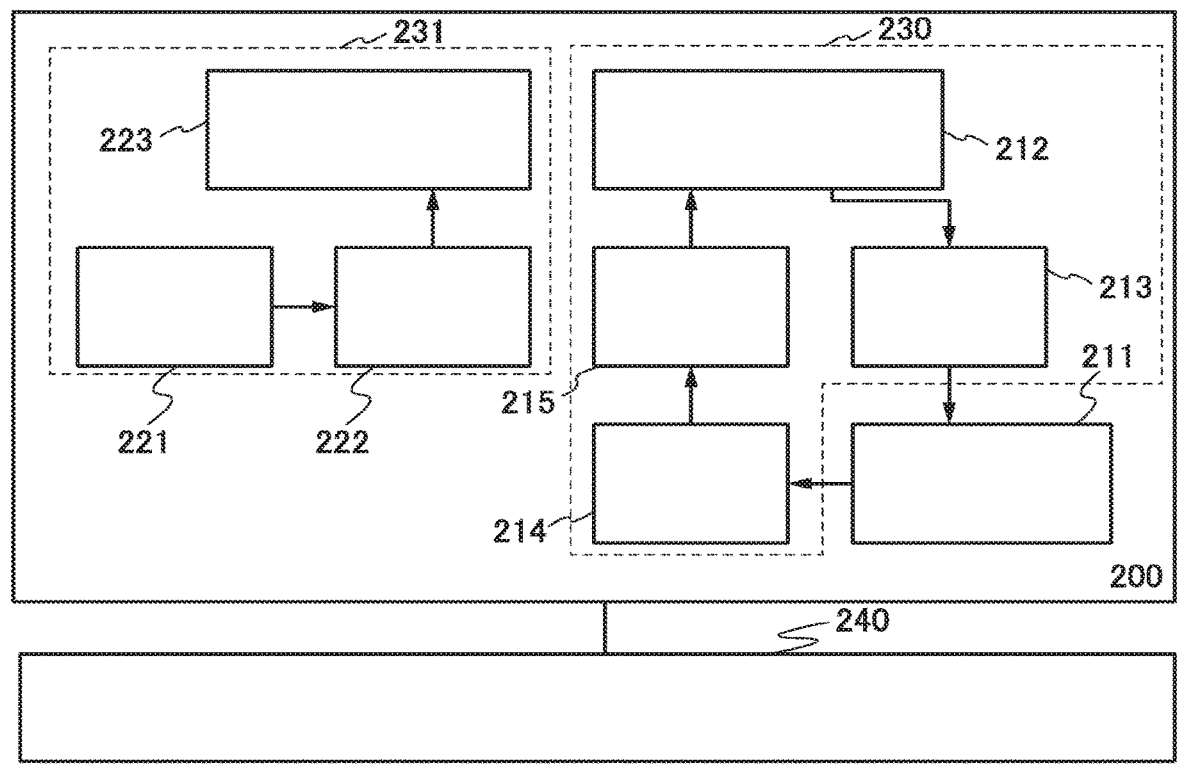
FIGS. 4A and 4B each illustrate an example of a device.
Figure 4B:
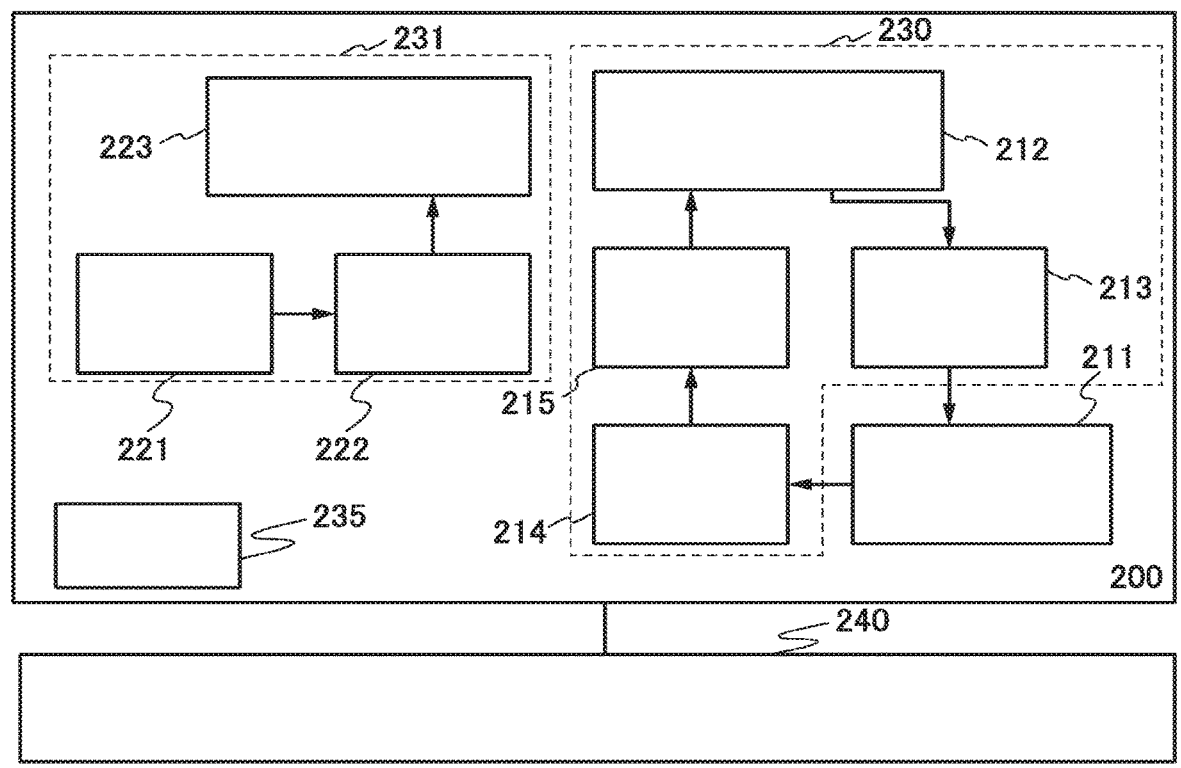

Power is supplied to the device 200 from an external power source 240 (see FIGS. 4A and 4B). A commercial power source may be used as the external power source, for example. The device 200 has a function of supplying power to the device 100. The device 200 has a function of inputting and outputting signals. The device 200 may have a function of transmitting power wirelessly, in which case the device 200 may serve as a power transmitting device. Alternatively, the device 200 may have a function of feeding power to a power storage device, in which case the device 200 may serve as a power feeding device. Note that the device 200 may have both the function of transmitting power wirelessly and the function of feeding power to a power storage device, in which case the device 200 may serve as a power transmitting device, a power feeding device, or a semiconductor device.

Figure 1B:
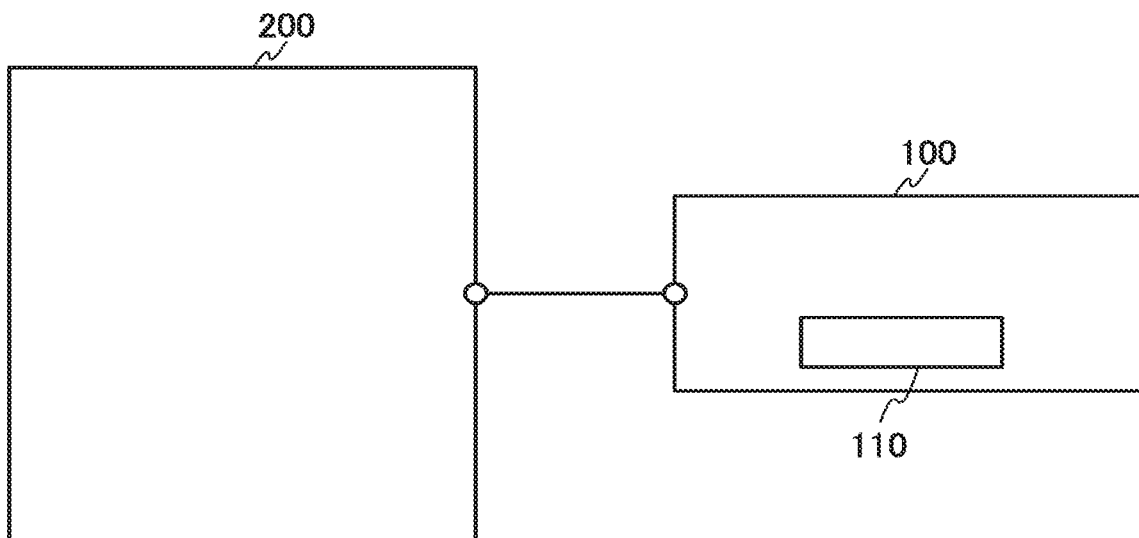

In the power storage system in FIG. 1, power can be supplied to the device 100 from the device 200 wirelessly. In the power storage system in FIG. 1A, signals can be transmitted and received between the device 100 and the device 200 wirelessly (i.e., without contact). Without limitation to this structure, as shown in FIG. 1B, power may be supplied to the device 100 from the device 200 that is connected to the device 100. Moreover, signals may be transmitted and received between the device 100 and the device 200 that are connected to each other.

In the case where power or signals are supplied wirelessly, radio waves of the 13.56 MHz band can be used, for example. Alternatively, radio waves of the 135 kHz band, the 433 MHz band, the 952 MHz band, the 2.45 GHz band, or the like may be used.

Further, to supply power wirelessly, an electromagnetic induction method, an electric field resonance method, a magnetic field resonance method, or a microwave method can be used, for example.

Note that a connection includes an electrical connection, a functional connection, and a direct connection. A connection relation of components shown in the embodiment is not limited to the connection relation illustrated in the drawings and the specification.

For example, in the case where two objects are electrically connected, an element which enables electrical connection between the two objects (e.g., a switch, a transistor, an inductor, a resistor, a diode, a display element, a light-emitting element, and a load) may be provided between the two objects.

Alternatively, in the case where the two objects are functionally connected, another circuit which enables functional connection (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit or a step-down circuit) or a level shifter circuit; a voltage source; a current source; a switching circuit; an amplifier circuit such as an operational amplifier, a differential amplifier circuit, a source follower circuit, or a buffer circuit; a signal generation circuit; a memory circuit; and/or a control circuit) may be provided between the two objects.

Note that a switch has a function of determining whether current flows or not by being turning on or off (becoming an on state or an off state). Alternatively, the switch has a function of selecting and changing a current path. For example, the switch has a function of determining whether current flows through a first current path or a second current path and switching the paths.

Next, configuration examples of the device 100 are described with reference to circuit diagrams in FIGS. 2A and 2B.

A power storage unit 111 has a function of storing power. The power storage unit 111 has a pair of terminals. One of the pair of terminals is connected to a terminal "b" of the device 100 via a transistor 131, a transistor 132, and a transistor 170, for example, and the other is connected to a terminal "d" of the device 100. The power storage unit 111 may be provided with an additional terminal, and the power storage unit 111 may be charged with power supplied from an external power source via the terminal.

The following can be used for the power storage unit 111: a secondary battery such as a lithium ion battery, a lead storage battery, a lithium-ion polymer secondary battery, a nickel hydrogen storage battery, a nickel cadmium storage battery, a nickel iron storage battery, a nickel zinc storage battery, or a zinc-silver oxide storage battery; a secondary flow battery such as a redox flow battery, a zinc chlorine battery, or a zinc bromine battery; a mechanically rechargeable secondary battery such as an aluminum-air battery, a zinc-air battery, or an iron-air battery; or a high temperature operation type secondary battery such as a sodium-sulfur battery or a lithium-iron sulfide battery. Note that without limitation to these, a lithium-ion capacitor may be used for the power storage unit 111, for example.

One of a source and a drain of the transistor 132 is connected to the power storage unit 111, and the other is connected to one of a source and a drain of the transistor 131. The transistors 131 and 132 have fractions of controlling charging and discharging of the power storage unit 111. For example, the transistors 131 and 132 can serve as protection switches for preventing overcharge and overdischarge of the power storage unit 111. Alternatively, the transistors 131 and 132 have functions of adjusting the amount of current flowing through the power storage unit 111 and a circuit 113. A circuit including the transistors 131 and 132 may serve as a protection circuit for controlling charging and discharging of the power storage unit 111. Note that the transistors 131 and 132 may serve as switches, in which case current which flows through a parasitic diode in the transistors 131 and 132 can be reduced when the switches are turned off. Note that the configuration of a switch(s) is not limited to those in FIGS. 2A and 2B; for example, one transistor or three or more transistors may be used. Further, instead of the transistors 131 and 132, a bipolar transistor, a diode, or a logic circuit in which any of these are combined may be used.

The potentials of gates of the transistors 131 and 132 are controlled by the circuit 113, for example.

The circuit 113 has a function of controlling the conduction states of the transistors 131 and 132, a transistor 150, and the transistor 170, for example. The circuit 113 has a function of monitoring the state of charge of the power storage unit 111. Note that the circuit 113 may be referred to as a control circuit. Alternatively, the circuit 113 may be a microcomputer, a field programmable gate array (FPGA), or a central processing unit (CPU).

The circuit 113 includes a memory, a processor, and a controller, for example. The data 110 is stored in the memory, for example. The processor has a function of generating a control signal on the basis of the data 110. The controller has a function of controlling the memory and the processor. Note that program data that is needed for driving the processor may be stored in the memory, for example. An example of the program data is program data that makes the processor control the potentials of gates of the transistors 131, 132, 150, and 170 in accordance with a data signal input from a circuit 142, for example.

A circuit 141 includes an antenna 114, a circuit 115, and a circuit 116. The circuit 141 has a function of receiving power wirelessly. Note that the circuit 141 may be referred to as a power receiving circuit.

Note that the antenna 114 may be an antenna circuit, in which case the antenna circuit includes an antenna and a capacitor.

The circuit 115 has a function of rectifying AC waves generated by reception of radio waves via the antenna 114. The circuit 115 may be referred to as a rectifier circuit. Note that the circuit 115 is not necessarily provided.

The circuit 116 has a function of smoothing the AC waves rectified by the circuit 115. The circuit 116 may serve as a regulator.

The transistor 150 is provided between the power storage unit 111 and the circuit 141, for example. One of a source and a drain of the transistor 150 is connected to the circuit 116, and the other is connected to the other of the source and the drain of the transistor 131. The transistor 150 has a function of controlling whether or not the power storage unit 111 is charged with power received by the circuit 141, for example. Note that the transistor 150 may serve as a switch.

The potential of a gate of the transistor 150 is controlled by the circuit 113, for example. Note that the configuration of a switch(s) is not limited to those in FIGS. 2A and 2B; for example, a plurality of transistors may be used. Further, instead of the transistor 150, a bipolar transistor, a diode, or a logic circuit in which any of these are combined may be used.

The circuit 142 includes an antenna 118 and a circuit 119. The circuit 142 has a function of transmitting and receiving data signals. Note that the circuit 142 may be referred to as a transmission/reception circuit or a data communication circuit.

Note that the antenna 118 may be an antenna circuit, in which case the antenna circuit includes an antenna and a capacitor.

Instead of the antenna 114 and the antenna 118, one antenna may be connected the circuit 115 and the circuit 119.

The circuit 119 has a function of generating data signals from the radio waves received via the antenna 118. The circuit 119 can include, for example, functional circuits such as a rectifier circuit, a demodulation circuit, and a modulation circuit. The circuit 119 may also include functional circuits such as an analog baseband circuit and a digital baseband circuit. Further, the circuit 119 may include an interface. The circuit 119 may be referred to as a signal generation circuit.

Carrier waves may be used as the radio waves. The carrier wave is an AC signal which is also referred to as a carrier. With the carrier wave, data signals are exchanged. Note that radio waves received from the outside include modulated radio waves (modulated waves).

Figure 3:
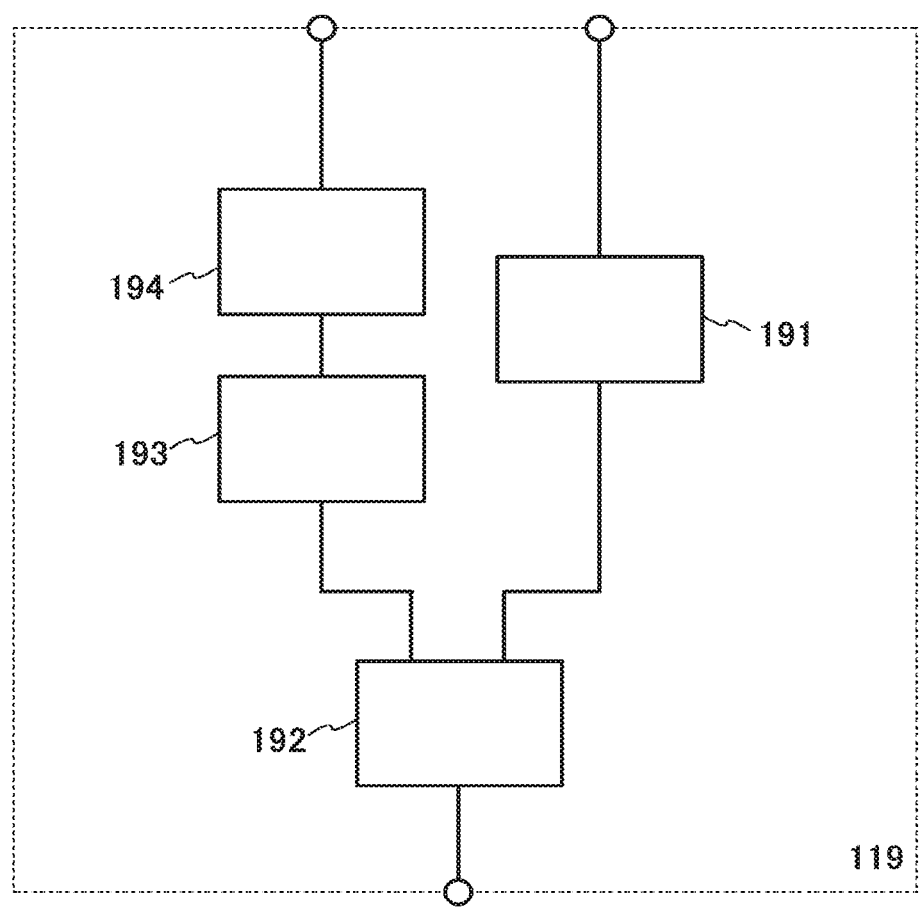
FIG. 3 illustrates an example of a circuit.

The circuit 119 includes a circuit 191, an interface 192, a circuit 193, and a circuit 194 as shown in FIG. 3, for example.

The circuit 191 has a function of demodulating received radio waves and extracting data. Note that the circuit 191 may be referred to as a demodulation circuit.

The interface 192 has a function of controlling exchange of signals between the circuit 119 and the circuit 113. Note that the interface 192 is not necessarily provided.

The circuit 193 has a function of modulating a signal that is input via the interface 192. Note that the circuit 193 may be referred as a modulation circuit.

The circuit 194 has a function of amplifying the voltage of the modulated signal to adjust the signal. Note that the circuit 194 may be referred to as an amplifier circuit.

A circuit 121 has a function of smoothing the voltage output from the power storage unit 111. The circuit 121 may serve as a regulator. Note that the circuit 121 is not necessarily provided.

Figure 2A:
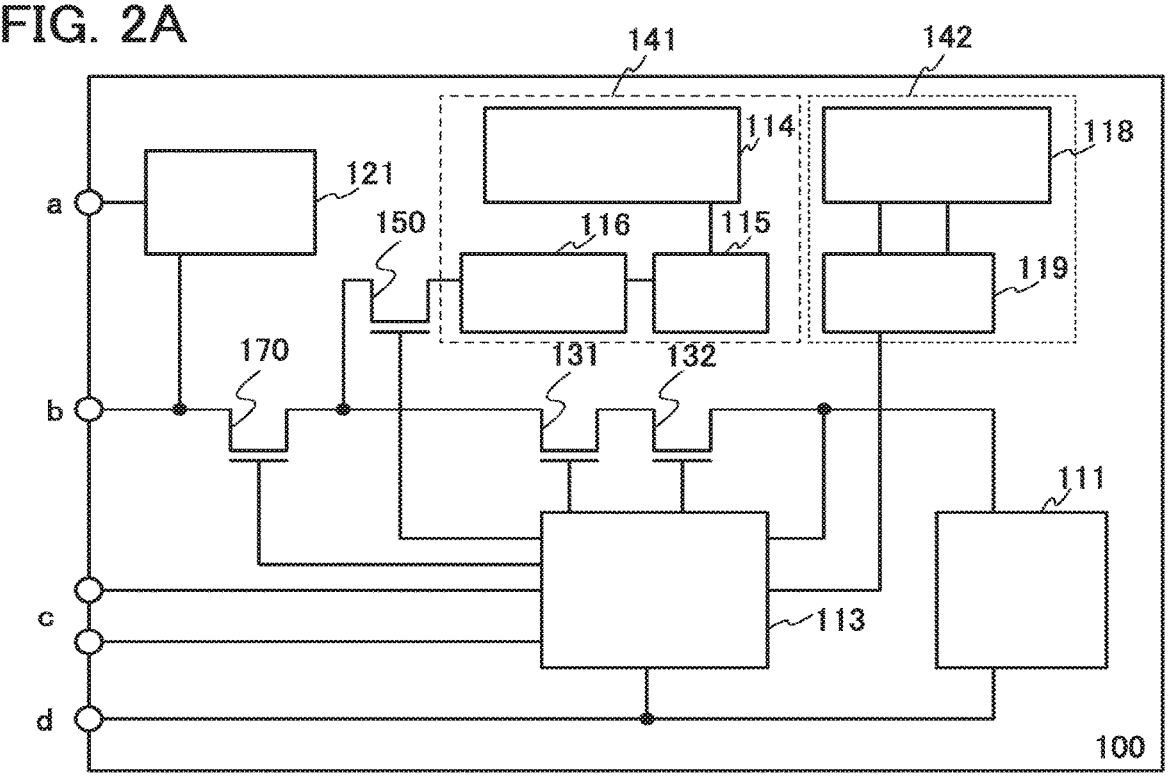
FIGS. 2A and 2B each illustrate an example of a device.
Figure 2B:
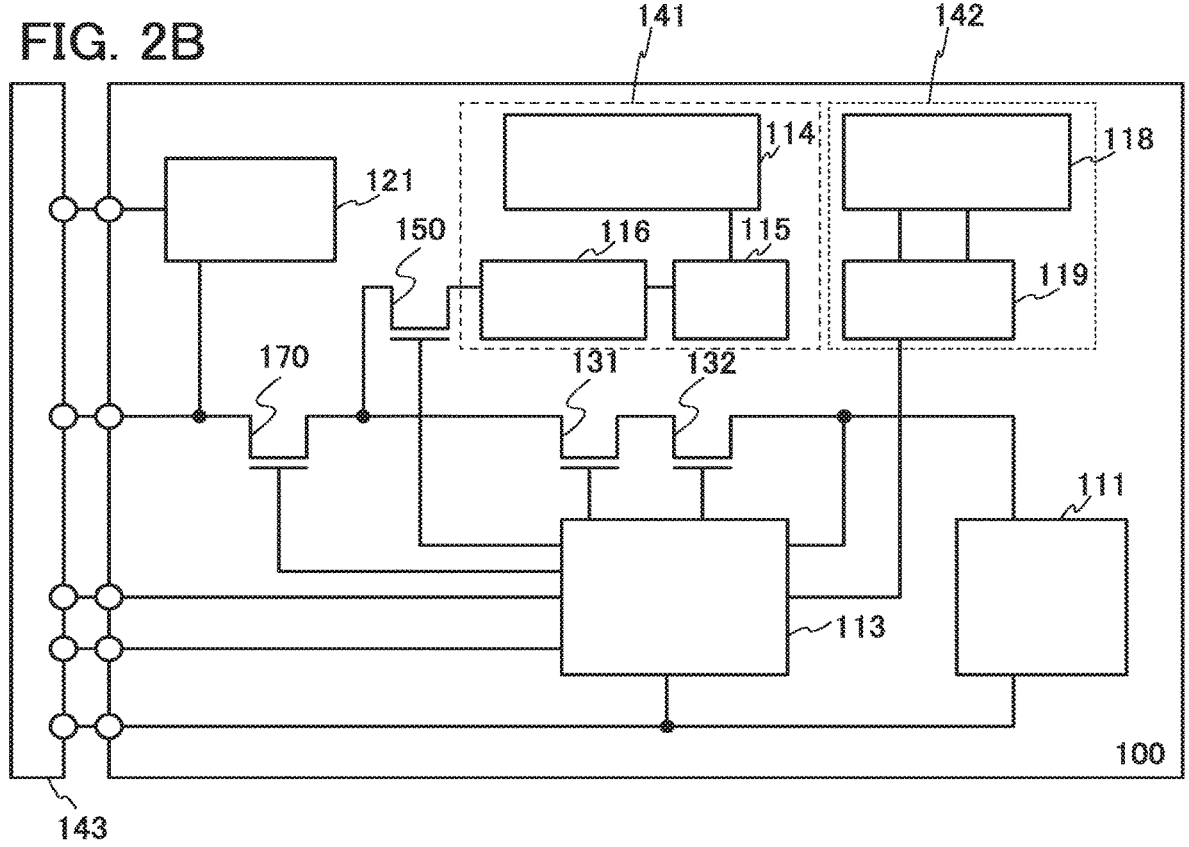

The transistor 170 is provided between a load 143 and the power storage unit 111 with the transistors 131 and 132 provided therebetween, for example, as shown in FIG. 2B. One of a source and a drain of the transistor 170 is connected to the other of the source and the drain of the transistor 131. The transistor 170 has a function of controlling supply (discharge) of power to the load 143 from the power storage unit 111. The transistor 170 may serve as a switch.

The potential of a gate of the transistor 170 is controlled by the circuit 113, for example. Note that one embodiment of the present invention is not limited to the configuration examples in FIGS. 2A and 2B; for example, a plurality of transistors may be used.

The device 100 has a function of outputting a power supply voltage V1 via a terminal "a" and the terminal "d". A potential Va may be supplied to the terminal "a", for example. A potential Vd may be supplied to the terminal "d", for example. The potential Va may be higher than the potential Vd. The device 100 has a function of outputting a power supply voltage V2 via the terminal "b" and the terminal "d". A potential Vb may be supplied to the terminal "b", for example. The potential Vb may be higher than the potential Vd.

Control signals for controlling the circuit 113 can be input to terminals "c", for example. The number of the terminals "c" corresponds to, for example, the number of control signals. An example of the control signal is a bus signal compatible with the I$^2$C standard.

The above are the configuration examples of the device 10 in FIGS. 2A and 2B.

Next, configuration examples of the device 200 are described with reference to FIGS. 4A and 4B.

The circuit 211 has a function of identifying the input data 110. The circuit 211 also has a function of generating a signal on the basis of the data 110 and outputting the signal. Note that the circuit 211 may be referred to as a signal processing circuit.

The circuit 211 includes a memory, a processor, and a controller, for example. Program data that is needed for driving the processor may be stored in the memory, for example. An example of the program data is program data that makes the processor adjust the amount of power on the basis of identification data.

A circuit 230 includes an antenna 212, a circuit 213, a circuit 214, and a circuit 215. The circuit 230 has a function of generating data signals from the radio waves received via the antenna 212. Note that the circuit 230 may be referred to as a transmission/reception circuit or a data communication circuit.

Note that the antenna 212 may be an antenna circuit, in which case the antenna circuit includes an antenna and a capacitor.

The circuit 213 is connected to the antenna 212. The circuit 213 has a function of demodulating radio waves received via the antenna 212 and extracting a data signal, for example. Data of the extracted data signal includes, for example, the data 110. Note that the circuit 213 may be referred to as a demodulation circuit.

The circuit 214 is connected to the circuit 211. The circuit 214 has a function of modulating a signal input from the circuit 211, for example. Note that the circuit 214 may be referred to as a modulation circuit.

As a modulation method, for example, an amplitude modulation method, a frequency modulation method, a phase modulation method, or the like may be used.

The circuit 215 has a function of amplifying the modulated data signal to adjust the data signal, for example. The circuit 215 may be referred to as an amplifier circuit. Note that the circuit 215 is not necessarily provided.

A circuit 231 includes a circuit 221, a circuit 222, and an antenna 223. The circuit 231 may serve as a power feeding circuit or a power transmitting circuit. Note that the device 200 may be provided with a sensor 235 as shown in FIG. 4B. The sensor 235 has a function of measuring displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, smell, or infrared rays. Thus, the existence of the device 100 can be determined by the sensor 235, for example.

The circuit 221 has a function of generating AC waves for supplying power, for example. The circuit 221 may be referred to as an oscillation circuit.

The circuit 222 has a function of amplifying AC waves to adjust the AC waves, for example. The circuit 222 may be referred to as an amplifier circuit. Note that the circuit 222 is not necessarily provided.

The AC waves are output as radio waves via the antenna 223. Note that the antenna 223 may be an antenna circuit, in which case the antenna circuit includes an antenna and a capacitor.

Power may be supplied to the device 200 from a commercial power source or the like.

Next, an example of a method for driving the power storage system illustrated in FIG. 1A will be described with reference to a flow chart in FIG. 5, as an example of a method for driving the power storage system in this embodiment. Here, the device 100 has the structure illustrated in FIG. 2B, and the device 200 has the structure illustrated in FIG. 4A.

In the example of a method for driving the power storage system illustrated in FIG. 1A, an inquiry signal is transmitted to the device 100 from the device 200 by radio waves in Step S1. It is preferable to transmit the inquiry signal once every several seconds, for example.

Next, in Step S2, the device 100 receives the inquiry signal.

In this step, the inquiry signal is extracted by the circuit 119 in the circuit 142 and output to the circuit 113.

Then, in Step S3, the device 100 generates a response signal responding to the received inquiry signal and transmits the response signal to the device 200.

In this step, the circuit 113 reads out necessary program data from the memory on the basis of data of the inquiry signal and makes the processor execute the program to generate a response signal. The response signal includes the data 110 for identifying the device 100.

As a response method using signals between the device 100 and the device 200, for example, a method compatible with a standard such as ISO 15693 or ISO 14443 can be used. Alternatively, a method compatible with the near field communication (NFC) standard (e.g., NFCIP-1 (ISO 18092)) can be used.

Note that the location of the device 100 may be detected by the response signal. For example, the distance from the device 200 to the device 100 is calculated on the basis of the response signal by the circuit 211, whereby the location of the device 100 can be detected.

Further, radio waves including the response signal generated by the circuit 142 are transmitted to the device 200.

Next, in Step S4, the device 200 receives the response signal and identifies the data 110 included in the received response signal.

For example, the circuit 230 extracts the response signal from the received radio waves and outputs the extracted response signal to the circuit 211.

The circuit 211 identifies the device 100 on the basis of the data 110 included in the input response signal. For example, the circuit 211 can identify the device 100 by comparing the data 110 with data for identifying the device 100 that is stored in the memory in advance. Then, in Step S5, the necessity and feasibility of charging the power storage unit 111 are determined on the basis of the response signal.

When it is determined that charging is unnecessary or impossible, the operation of the circuit 231 is stopped. For example, supply of power supply voltage to the circuit 231 is stopped by the controller in the circuit 211, whereby the operation of the circuit 231 can be stopped.

When it is determined that charging is necessary and possible, power transmission to the device 100 from the device 200 is started in Step S6.

It is preferable that the amount of charge accumulated in the power storage unit 111 not be zero even when it is determined that charging is necessary and that charge needed for the operation of the device 100 (e.g., power for operating the circuit 113) be accumulated in the power storage unit 111.

In Step 6, the operation of the circuit 231 is started and AC waves are transmitted to the device 100, whereby power is supplied to the device 100.

Note that the frequency or amplitude of the transmitted AC waves is varied depending on the data for identifying the device 100, for example, whereby the amount of power supplied to the device 100 can be optimized. For example, the power supply time can be adjusted in accordance with the capacity of the power storage unit 111 in the device 100. Further, when the conversion efficiency of amplified AC waves is controlled by the circuit 211, the frequency or amplitude of the transmitted AC waves can be varied.

Next, in Step S7, power reception by the device 100 is started and charging of the power storage unit 111 is started. For example, the device 100 can receive power by an electromagnetic induction method, an electric field resonance method, a magnetic field resonance method, a microwave method, or the like.

Power supplied from the device 200 is adjusted by the circuit 141. Further, the circuit 113 turns on the transistors 131, 132, and 150, whereby the power storage unit 111 is charged.

Then, in Step S8, it is determined whether charging makes a voltage Vbt of the power storage unit 111 higher than or equal to a reference voltage Vref. For example, the circuit 113 can compare the voltage Vbt with the reference voltage Vref.

When it is determined that the voltage Vbt is lower than the reference voltage Vref, charging of the power storage unit 111 is continued.

On the other hand, when it is determined that the voltage Vbt is higher than or equal to the reference voltage Vref, the transistor 150 is turned off by the circuit 113, and in Step S9, radio waves including a stop signal are transmitted to the device 200 via the circuit 142. Note that when it is determined that the voltage Vbt is higher than or equal to the reference voltage Vref, the transistors 131 and 132 may be turned off. Thus, overcharge of the power storage unit 111 can be prevented.

Even when it is determined that the voltage Vbt is lower than the reference voltage Vref, for example, a user wants to move away the device 100 to forcibly terminate charging of the storage unit 111 in some cases. In such a case, for example, the location of the device 100 can be detected with the sensor 235 and when the value of location data of the device 100 exceeds a threshold value, the circuit 211 can stop the operation of the circuit 231. Alternatively, for example, the device 200 can transmit an inquiry signal to the device 100 during power feeding, and when there is no response signal from the device 100 the circuit 211 can stop the operation of the circuit 231.

Next, in Step S10, when the device 200 receives radio waves including the stop signal, the circuit 213 extracts the stop signal and outputs the extracted stop signal to the circuit 211.

Upon input of the stop signal, the circuit 211 stops the operation of the circuit 231. For example, supply of power supply voltage to the circuit 231 is stopped by the controller in the circuit 211, whereby the operation of the circuit 231 can be stopped. In this manner, the operation of the circuit 231 is stopped when not needed, whereby power consumption can be reduced.

Then, if necessary, the transistors 131, 132, and 170 are turned on, so that the power supply voltage V1 can be output via the terminal "a" and the terminal "d" and power can be supplied to the load from the power storage unit 111. Alternatively, the transistors 131, 132, and 170 may be turned on, so that the power supply voltage V2 can be output via the terminal "b" and the terminal "d" and power can be supplied to the load from the power storage unit 111.

The above is the example of a method for driving the power storage system.

As described with reference to FIGS. 1A and 1B, FIGS. 2A and 2B, FIG. 3, FIGS. 4A and 4B, and FIG. 5, in the example of power storage system in this embodiment, the device 100 is identified with identification data by the device 200; thus, charging can be performed under conditions optimal for each device 100, and for example, the device 100 can be charged regardless of its specifications. Specifications of conventional power storage devices are set individually for portable terminals, for example; different power feeding devices need to be prepared for power storage devices with different specifications. For example, a power feeding device that does not match a connector for connecting a power feeding cable or the like cannot be used. Therefore, a user who has a plurality of portable terminals with different specifications needs to use several power feeding devices, which is inconvenient. In this embodiment, it is not necessary to change the device 200 in accordance with the specifications of the device 100, resulting in an improvement in versatility.

Note that an example where the device 100 is identified with identification data by the device 200 is described here; however, one embodiment of the present invention is not limited thereto. Depending on circumstances or conditions, identification data does not need to be used. Further, depending on circumstances or conditions, the device 100 does not need to be identified by the device 200.

Embodiment 2

In this embodiment, a configuration example of the circuit 113 is described with reference to FIG. 6.

The circuit 113 includes a processor 710, a bus bridge 711, a RAM (random access memory) 712, a memory interface 713, a controller 720, an interrupt controller 721, an I/O interface (input-output interface) 722, and a power gate unit 730.

The circuit 113 further includes a crystal oscillation circuit 741, a timer circuit 745, an I/O interface 746, an I/O port 750, a comparator 751, an I/O interface 752, a bus line 761, a bus line 762, a bus line 763, and a data bus line 764. Further, the circuit 113 includes at least connection terminals 770 to 776 as portions for connection to an external device. Note that each of the connection terminals 770 to 776 represents one terminal or a terminal group including plural terminals. An oscillation unit 742 including a quartz crystal oscillator 743 is connected to the circuit 113 through the connection terminal 772 and the connection terminal 773.

The processor 710 includes a register 785 and is connected to the bus lines 761 to 763 and the data bus line 764 through the bus bridge 711.

The memory 712 is a memory device which can function as a main memory of the processor 710; a random access memory is used as the memory 712, for example. The memory 712 stores an instruction executed by the processor 710, data necessary for execution of an instruction, and data processed by the processor 710. In accordance with the instruction of the processor 710, data is written and read into/from the memory 712. Note that the data 110 shown in FIGS. 1A and 1B may be stored in the memory 712.

When the circuit 113 is in a low power consumption mode, supply of electric power to the memory 712 is blocked. Therefore, a memory capable of storing data when power is not supplied to the memory is preferably used as the memory 712.

The memory interface 713 is an input-output interface with an external memory device. Under the instruction of the processor 710, data is written into and read out from the external memory device connected to the connection terminal 776 via the memory interface 713.

A clock generation circuit 715 is a circuit that generates a clock signal MCLK (hereinafter, also simply referred to as "MCLK") to be used in the processor 710, and includes an RC oscillator and the like. MCLK is also output to the controller 720 and the interrupt controller 721.

The controller 720 is a circuit that controls the entire circuit 113, and can control, for example, a bus and a memory map; power supply of the circuit 113; the clock generation circuit 715; and the crystal oscillation circuit 741.

The connection terminal 770 is a terminal for inputting an external interrupt signal. A non-maskable interrupt signal NMI is input to the controller 720 through the connection terminal 770. As soon as the non-maskable interrupt signal NMI is input to the controller 720, the controller 720 outputs the non-maskable interrupt signal NMI to the processor 710, so that the processor 710 executes interrupt processing.

The interrupt signal INT is input to the interrupt controller 721 through the connection terminal 770. Interrupt signals (T0IRQ, P0IRQ, and C0IRQ) from peripheral circuits are input to the interrupt controller 721 without going through the buses (761 to 764).

The interrupt controller 721 has a function of setting priorities to interrupt requests. When the interrupt controller 721 detects the interrupt signal, the interrupt controller 721 determines if the interrupt request is valid or not. If the interrupt request is valid, the interrupt controller 721 outputs an internal interrupt signal INT into the controller 720.

The interrupt controller 721 is connected to the bus line 761 and the data bus line 764 through the I/O interface 722.

When the interrupt signal INT is input, the controller 720 outputs the interrupt signal INT to the processor 710 and makes the processor 710 execute interrupt processing.

The interrupt signal T0IRQ is directly input to the controller 720 without going through the interrupt controller 721 in some cases. When the controller 720 receives the interrupt signal T0IRQ, the controller 720 outputs the non-maskable interrupt signal NMI to the processor 710, so that the processor 710 executes interrupt processing.

With this structure, for example, the device 100 may be provided with a sensor, and a change in the voltage of the power storage unit 111 or a change in the distance between the device 100 and the device 200 may be detected and interrupt processing based on the detection result may be executed. For example, power feeding by the device 200 may be stopped in accordance with the interrupt processing.

A register 780 of the controller 720 is provided in the controller 720. A register 786 of the interrupt controller 721 is provided in the I/O interface 722.

Then, peripheral circuits included in the circuit 113 will be described. The circuit 113 includes the timer circuit 745, the I/O port 750, and the comparator 751 as peripheral circuits. The circuits are examples of the peripheral circuits, and a circuit needed for an electrical device using the circuit 113 can be provided as appropriate.

The timer circuit 745 has a function of measuring time in response to a clock signal TCLK (hereinafter, also simply referred to as "TCLK") output from a clock generation circuit 740. The clock generation circuit 715 outputs the interrupt signal T0IRQ to the controller 720 and the interrupt, controller 721 at predetermined intervals. The timer circuit 745 is connected to the bus line 761 and the data bus line 764 through the I/O interface 746.

TCLK is a clock signal of which frequency is lower than that of MCLK. For example, the frequency of MCLK is about several megahertz (MHz) (e.g., 8 MHz) and the frequency of TCLK is about several tens of kilohertz (kHz) (e.g., 32 kHz). The clock generation circuit 740 includes the crystal oscillation circuit 741 incorporated in the circuit 113 and the oscillation unit 742 which is connected to the connection terminal 772 and the connection terminal 773. The quartz crystal oscillator 743 is used as an oscillator of the oscillation unit 742. When the clock generation circuit 740 is made up of a CR oscillator and the like, all modules in the clock generation circuit 740 can be incorporated in the circuit 113.

The I/O port 750 is an interface that inputs and outputs information to and from an external device which is connected to the I/O port 750 via the connection terminal 774 and is an input-output interface of a digital signal. For example, the I/O port 750 is connected to the circuit 119, the transistor 131, the transistor 132, the transistor 150, the transistor 170, or the power storage unit 111 via the connection terminal 774. The I/O port 750 outputs the interrupt signal P0IRQ to the interrupt controller 721 in accordance with an input digital signal, for example. Note that a plurality of connection terminals 774 may be provided, and the I/O port 750 may be connected to the transistor 150 via the circuit 119, the transistor 131, the transistor 132, and one connection terminal 774, to the transistor 170 via another connection terminal 774, and to the power storage unit 111 via the other connection terminal 774.

The comparator 751 can compare a potential (or current) of an analog signal input from the connection terminal 775 with a potential (or current) of a reference signal and can generate a digital signal the level of which is 0 or 1. Further, the comparator 751 can generate the interrupt signal C0IRQ when the level of the digital signal is 1. The interrupt signal C0IRQ is output to the interrupt controller 721. Further, the comparator 751 can, for example, compare a signal of the voltage Vbt of the power storage unit 111 that is input via the connection terminal 774 with a signal of the reference voltage Vref.

The I/O port 750 and the comparator 751 are connected to the bus line 761 and the data bus line 764 through the interface 752 common to the both. Here, one I/O interface 752 is used because the I/O interfaces of the I/O port 750 and the comparator 751 can share a circuit; however, the I/O port 750 and the comparator 751 can have an I/O interface different from each other.

In addition, a register of each peripheral circuit is placed in the input/output interface corresponding to the peripheral circuit. A register 787 of the timer circuit 745 is placed in the I/O interface 746, and a register 783 of the I/O port 750 and a register 784 of the comparator 751 are placed in the I/O interface 752.

The circuit 113 includes the power gate unit 730 that can stop power supply to the internal circuits. Power is supplied only to a circuit necessary for operation by the power gate unit 730, so that power consumption of the whole circuit 113 can be lowered.

Figure 6:
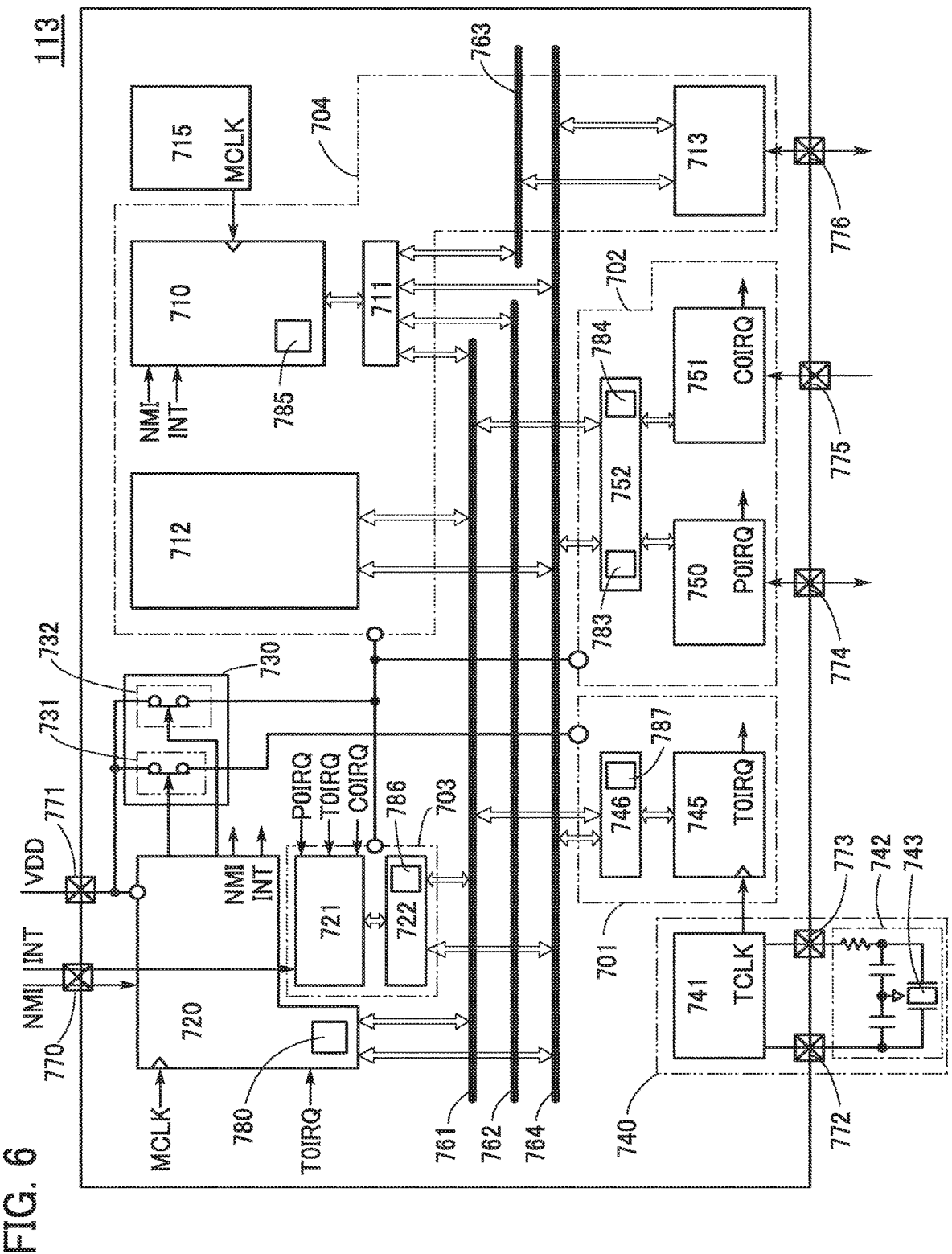
FIG. 6 illustrates an example of a circuit.

As illustrated in FIG. 6, the circuits in a unit 701, a unit 702, a unit 703, and a unit 704 in the circuit 113 which are surrounded by dashed lines are connected to the connection terminal 771 through the power gate unit 730. The connection terminal 771 is connected to the power storage unit 111, for example.

In this embodiment, the unit 701 includes the timer circuit 745 and the I/O interface 746. The unit 702 includes the I/O port 750, the comparator 751, and the I/O interface 752. The unit 703 includes the interrupt controller 721 and the I/O interface 722. The unit 704 includes the processor 710, the memory 712, the bus bridge 711, and the memory interface 713.

The power gate unit 730 is controlled by the controller 720. The power gate unit 730 includes a switch 731 and a switch 732 for blocking supply of a power supply voltage to the units 701 to 704. As the power supply voltage in that case, a voltage of the power storage unit 111 can be used, for example.

The switching of the switches 731 and 732 is controlled by the controller 720. Specifically, the controller 720 outputs a signal to turn off one or both of the switches included in the power gate unit 730, depending on the request by the processor 710 (power supply stop). In addition, the controller 720 outputs a signal to turn on the switch included in the power gate unit 730 with, as a trigger, the non-maskable, interrupt signal NMI or the interrupt signal T0IRQ from the timer circuit 745 (start of power supply).

FIG. 6 illustrates a structure where two switches (the switches 731 and 732) are provided in the power gate unit 730; however, the structure is not limited thereto. Switches may be provided as many as needed to block supply of power.

In this embodiment, the switch 731 is provided to individually control supply of power to the unit 701 and the switch 732 is provided to individually control supply of power to the units 702 to 704. However, the embodiment of the present invention is not limited to such a power supply path. For example, another switch which is not the switch 732 may be provided to individually control supply of power to the memory 712. Further, a plurality of switches may be provided for one circuit.

In addition, a power supply voltage is constantly supplied from the connection terminal 771 to the controller 720 without going through the power gate unit 730. In order to reduce noise, a power supply potential from an external power supply circuit, which is different from the power supply circuit for the power supply voltage, is given to each of the oscillation circuit of the clock generation circuit 715 and the crystal oscillation circuit 741.

By provision of the controller 720, the power gate unit 730, and the like, the circuit 113 can operate in three kinds of operation modes. The first operation mode is a normal operation mode where all circuits included in the circuit 113 are active. Here, the first operation mode is referred to as "Active mode".

In the first operation mode, for example, generation of a response signal based on an inquiry signal from the device 200, which is described in Embodiment 1, is performed.

The second and third operation modes are low power consumption modes where some of the circuits are active. In the second operation mode, the controller 720, the timer circuit 745, and circuits (the crystal oscillation circuit 741 and the interface 746) associated thereto are active. In the third operation mode, only the controller 720 is active. Here, the second operation mode is referred to as "Noff1 mode" and the third operation mode is referred to as "Noff2 mode". Only the controller 720 and some of the peripheral circuits (circuits necessary for timer operation) operate in the Noff1 mode and only the controller 720 operates in the Noff2 mode.

Note that power is constantly supplied to the oscillator of the clock generation circuit 715 and the crystal oscillation circuit 741 regardless of the operation modes. In order to bring the clock generation circuit 715 and the crystal oscillation circuit 741 into non-Active modes, an enable signal is input from the controller 720 or an external circuit to stop oscillation of the clock generation circuit 715 and the crystal oscillation circuit 741.

In addition, in Noff1 and Noff2 modes, power supply is stopped by the power gate unit 730, so that the I/O port 750 and the I/O interface 752 are non-active, but power is supplied to parts of the I/O port 750 and the I/O interface 752 in order to allow the external device connected to the connection terminal 774 to operate normally. Specifically, power is supplied to an output buffer of the I/O port 750 and the register 783 of the I/O port 750. In the Noff1 and Noff2 modes, actual functions of the I/O port 750, that is, functions of data transmission between the I/O interface 752 and the external device and generation of an interrupt signal, are stopped. In addition, a communication function of the I/O interface 752 is also stopped similarly.

Note that in this specification, the phrase "a circuit is non-active" includes a state where major functions in Active mode (normal operation mode) are stopped and an operation state with power consumption lower than that of Active mode, as well as a state that a circuit is stopped by blocking of power supply.

With the above-described structure, when a user forcibly terminates charging operation of the device 100, a signal for turning off one or both of the switches included in the power gate unit 730 is output in response to the request of the processor 710 to switch the circuit 113 to the Noff1 or Noff2 mode; thus, supply of electric power to a circuit block which does not need to be supplied with electric power can be stopped.

Further, an example of a structure of the register which can be used in each circuit block will be described with reference to FIGS. 7A and 7B.

Figure 7A:
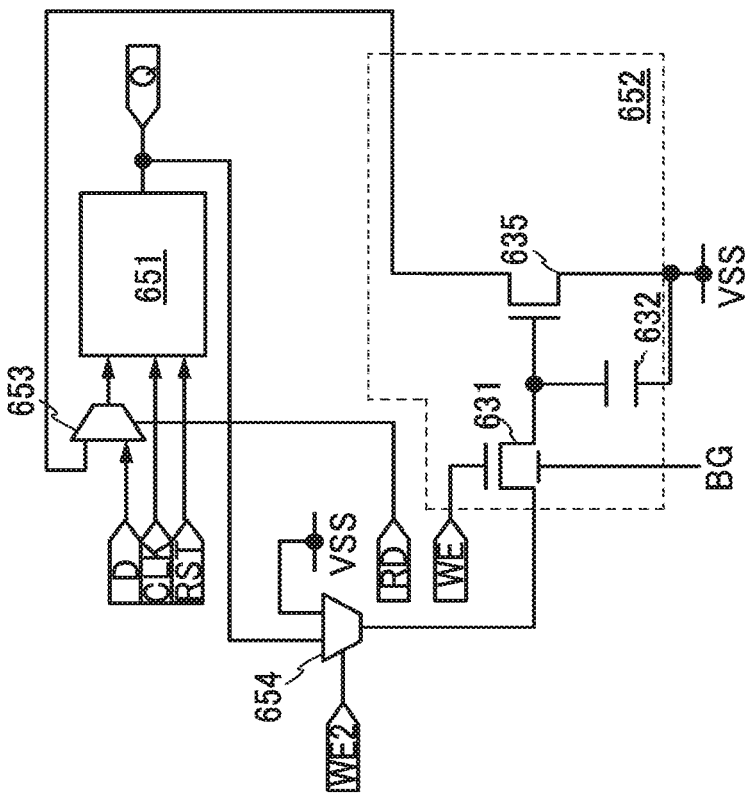
FIGS. 7A and 7B each illustrate an example of a register.

The register illustrated in FIG. 7A includes a memory circuit 651, a memory circuit 652, and a selector 653.

The memory circuit 651 is supplied with a reset signal RST, a clock signal CLK, and a data signal D. The memory circuit 651 has a function of storing data of the data signal D that is input in response to the clock signal CLK and outputting the data as a data signal Q. The memory circuit 651 can form, for example, a register such as a buffer register or a general-purpose register. As the memory circuit 651, a cache memory including a static random access memory (SRAM) or the like can be provided. Data of such a register or a cache memory can be stored in the memory circuit 652.

The memory circuit 652 is supplied with a write control signal WE, a read control signal RD, and a data signal. The write control signal WE, the read control signal RD, and the like can be input via the terminals "c", for example.

The memory circuit 652 has a function of storing data of an input data signal in accordance with the write control signal WE and outputting the stored data as a data signal in accordance with the read control signal RD.

The selector 653 selects the data signal D or the data signal output from the memory circuit 652 and inputs the selected signal to the memory circuit 651 in accordance with the read control signal RD.

The memory circuit 652 includes a transistor 631 and a capacitor 632.

The transistor 631, which is an n-channel transistor, functions as a selection transistor. One of a source and a drain of the transistor 631 is connected to an output terminal of the memory circuit 651. Further, a back gate of the transistor 631 is supplied with a power supply potential. The transistor 631 has a function of controlling holding of a data signal output from the memory circuit 651 in accordance with the write control signal WE.

A transistor with low off-state current may be used as the transistor 631, for example. As the transistors with low off-state current, a transistor including a channel formation region that includes an oxide semiconductor with a wider bandgap than that of silicon and is substantially i-type can be used, for example.

The transistor including the oxide semiconductor can be fabricated in such a manner that, for example, impurities such as hydrogen or water are reduced as much as possible and oxygen vacancies are reduced as much as possible by supply of oxygen. At this time, the amount of hydrogen that is regarded as a donor impurity in the channel formation region, which is measured by secondary ion mass spectrometry (also referred to as SIMS), is preferably reduced to lower than or equal to $1\times10^{19}/cm^3$, further preferably lower than or equal to $1\times10^{18}/cm^3$. The off-state current per micrometer of the channel width of the transistor 631 at 25° C. is lower than or equal to $1\times10^{-19}$ A (100 zA), preferably lower than or equal to $1\times10^{-22}$ A (100 yA). It is preferable that the off-state current of the transistor be as low as possible; the lowest value of the off-state current of the transistor is estimated to be about $1\times10^{-30}$ A/μm.

For example, an In-based metal oxide, a Zn-based metal oxide, an In—Zn-based metal oxide, an In—Ga—Zn-based metal oxide, or the like can be used as the oxide semiconductor.

One of a pair of electrodes of the capacitor 632 is connected to the other of the source and the drain of the transistor 631, and the other of the pair of electrodes is supplied with a power supply potential VSS. The capacitor 632 has a function of holding charge based on data of a stored data signal. Since the off-state current of the transistor 631 is extremely low, the charge in the capacitor 632 is held and thus the data is stored even when the supply of the power supply voltage is stopped.

A transistor 633 is a p-channel transistor. A power supply potential VDD is supplied to one of a source and a drain of the transistor 633, and the read control signal RD is input to a gate of the transistor 633.

A transistor 634 is an n-channel transistor. One of a source and a drain of the transistor 634 is connected to the other of the source and the drain of the transistor 633, and the read control signal RD is input to a gate of the transistor 634.

A transistor 635 is an n-channel transistor. One of a source and a drain of the transistor 635 is connected to the other of the source and the drain of the transistor 634, and the other of the source and the drain of the transistor 635 is supplied with the power supply potential VSS.

An input terminal of an inverter 636 is connected to the other of the source and the drain of the transistor 633. An output terminal of the inverter 636 is connected to an input terminal of the selector 653.

One of a pair of electrodes of a capacitor 637 is connected to the input terminal of the inverter 636, and the other of the pair of electrodes is supplied with the power supply potential VSS. The capacitor 637 has a function of holding charge based on data of a data signal input to the inverter 636.

Note that without limitation to the above, the memory circuit 652 may include a phase-change RAM (PRAM), a phase change memory (PCM), a resistive RAM (ReRAM), a magnetoresistive RAM (MRAM), or the like. For the MRAM, a magnetic tunnel junction element (MTJ element) can be used for example.

Next, an example of a method for driving the register illustrated in FIG. 7A will be described.

First, in a normal operation period, the register is supplied with the power supply voltage that is power for the register, the reset signal RST, and the clock signal CLK. At this time, the selector 653 outputs data of the data signal D to the memory circuit 651. The memory circuit 651 stores the data of the data signal D that is input in accordance with the clock signal CLK. At this time, in response to the read control signal RD, the transistor 633 is turned on while the transistor 634 is turned off.

Then, in a backup period provided immediately before the supply of the power supply voltage is stopped, in accordance with the pulse of the write control signal WE, the transistor 631 is turned on, the data of the data signal D is stored in the memory circuit 652, and the transistor 631 is turned off. After that, the supply of the clock signal CLK to the register is stopped, and then, the supply of the reset signal RST to the register is stopped. Note that when the transistor 631 is on, the back gate of the transistor 631 may be supplied with a positive power supply potential. At this time, in response to the read control signal RD, the transistor 633 is turned on while the transistor 634 is turned off.

Next, in a power stop period, the supply of the power supply voltage to the register is stopped. During this period, the stored data is held because the off-state current of the transistor 631 in the memory circuit 652 is low. Note that the supply of the power supply voltage may be stopped by supplying the ground potential CND instead of the power supply potential VDD. For example, the ground potential is supplied through the terminal "d" shown in FIG. 2A. Note that when the transistor 631 is off, the back gate of the transistor 631 may be supplied with a negative power supply potential, so that the transistor 631 is kept off.

Then, in a recovery period immediately before a normal operation period, the supply of the power supply voltage to the register is restarted; then, the supply of the clock signal CLK is restarted, and after that, the supply of the reset signal RST is restarted. At this time, before the supply of the clock signal CLK is restarted, the wiring which is to be supplied with the clock signal CLK is set to the power supply potential VDD. Moreover, in accordance with the pulse of the read control signal RD, the transistor 633 is turned off, the transistor 634 is turned on, and the data signal stored in the memory circuit 652 is output to the selector 653. The selector 653 outputs the data signal to the memory circuit 651 in accordance with the pulse of the read control signal RD. Thus, the memory circuit 651 can be returned to a state just before the power stop period.

Then, in a normal operation period, normal operation of the memory circuit 651 is performed again.

The above is an example of the method for driving the register illustrated in FIG. 7A.

Note that the structure of the register is not limited to that illustrated in FIG. 7A.

Figure 7B:
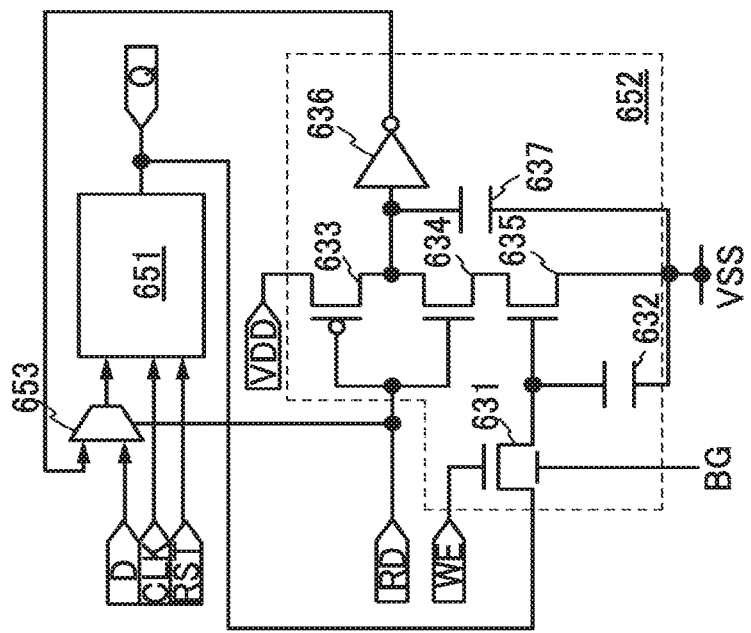

For example, the register illustrated in FIG. 7B has a structure in which the transistors 633 and 634, the inverter 636, and the capacitor 637 are removed from the register illustrated in FIG. 7A and a selector 654 is added to the register illustrated in FIG. 7A. For the same components as those in the register illustrated in FIG. 7A, the description of the register in FIG. 7A is referred to as appropriate.

One of the source and the drain of the transistor 635 is connected to the input terminal of the selector 653.

In the selector 654, the power supply potential VSS to be data or the data signal output from the memory circuit 651 is selected in accordance with the write control signal WE2, and input to the memory circuit 652.

Next, an example of a method for driving the register illustrated FIG. 7B will be described.

First, in a normal operation period, the register is supplied with the power supply voltage, the reset signal RST, and the clock signal CLK. At this time, the selector 653 outputs data of the data signal D to the memory circuit 651. The memory circuit 651 stores the data of the data signal D that is input in accordance with the clock signal CLK. In addition, the selector 654 outputs the power supply potential VSS to the memory circuit 652 in accordance with the write control signal WE2. In the memory circuit 652, the transistor 631 is turned on in response to the pulse of the write control signal WE, and the power supply potential VSS is stored as data in the memory circuit 652.

Then, in a backup period provided immediately before the supply of the power supply voltage is stopped, the selector 654 does not supply the power supply potential VSS but provides electrical conduction between the output terminal of the memory circuit 651 and one of the source and the drain of the transistor 631 in accordance with the write control signal WE2. Further, in accordance with the pulse of the write control signal WE, the transistor 631 is turned on, the data of the data signal D is stored in the memory circuit 652, and the transistor 631 is turned off. At this time, the data of the memory circuit 652 is rewritten only when the potential of the data signal D is equal to the power supply potential VDD. Furthermore, the supply of the clock signal CLK to the register is stopped, and then, the supply of the reset signal RST the register is stopped. Note that when the transistor 631 is on, the back gate of the transistor 631 may be supplied with a positive power supply potential.

Next, in a power stop period, the supply of the power supply voltage to the register is stopped. During this period, the stored data is held in the memory circuit 652 because the off state current of the transistor 631 is low. Note that the supply of the power supply voltage may be stopped by supplying the ground potential GND instead of the power supply potential VDD. Note that when the transistor 631 is off, the back gate of the transistor 631 may be supplied with a negative power supply potential from a multiplexer, so that the transistor 631 is kept off.

Then, in a recovery period immediately before a normal operation period, the supply of the power supply voltage to the register is restarted; then, the supply of the clock signal CLK is restarted, and alter that, the supply of the reset signal RST is restarted. At this time, before the supply of the clock signal CLK is restarted, the wiring which is to be supplied with the clock signal CLK is set to the power supply potential VDD. In accordance with the pulse of the read control signal RD, the selector 653 outputs to the memory circuit 651 the data signal corresponding to the data stored in the memory circuit 652. Thus, the memory circuit 651 can be returned to a state just before the power stop period.

Then, in a normal operation period, normal operation of the memory circuit 651 is performed again.

The above is an example of the method for driving the register illustrated in FIG. 7B.

By using the structure illustrated in FIG. 7B, the data of the power supply potential VSS does not need to be written in the backup period, resulting in an increase in operation speed.

In the case of using the above-described register for the registers 784 to 787, when Active mode shifts to Noff1 or Noff2 mode, prior to the block of power supply, data stored in the memory circuit 651 of the registers 784 to 787 is written to the memory circuit 652, so that data in the memory circuit 651 is reset to initial values; then, supply of power is blocked.

In the case where Noff1 or Noff2 mode is returned to Active mode, when power supply to the registers 784 to 787 is restarted, data in the memory circuit 651 is reset to initial values. Then, data in the memory circuit 652 is written to the memory circuit 651.

Accordingly, even in the low power consumption mode, data needed for processing of the circuit 113 are stored in the registers 784 to 787, and thus, the circuit 113 can return from the low power consumption mode to Active mode immediately. Therefore, the power consumption of the device 100 can be reduced.

Embodiment 3

In this embodiment, the memory 712 in FIG. 6 is described as an example of a memory device.

An example of a structure of the memory device of this embodiment will be described.

An example of a memory cell array is described with reference to FIG. 8.

Figure 8:
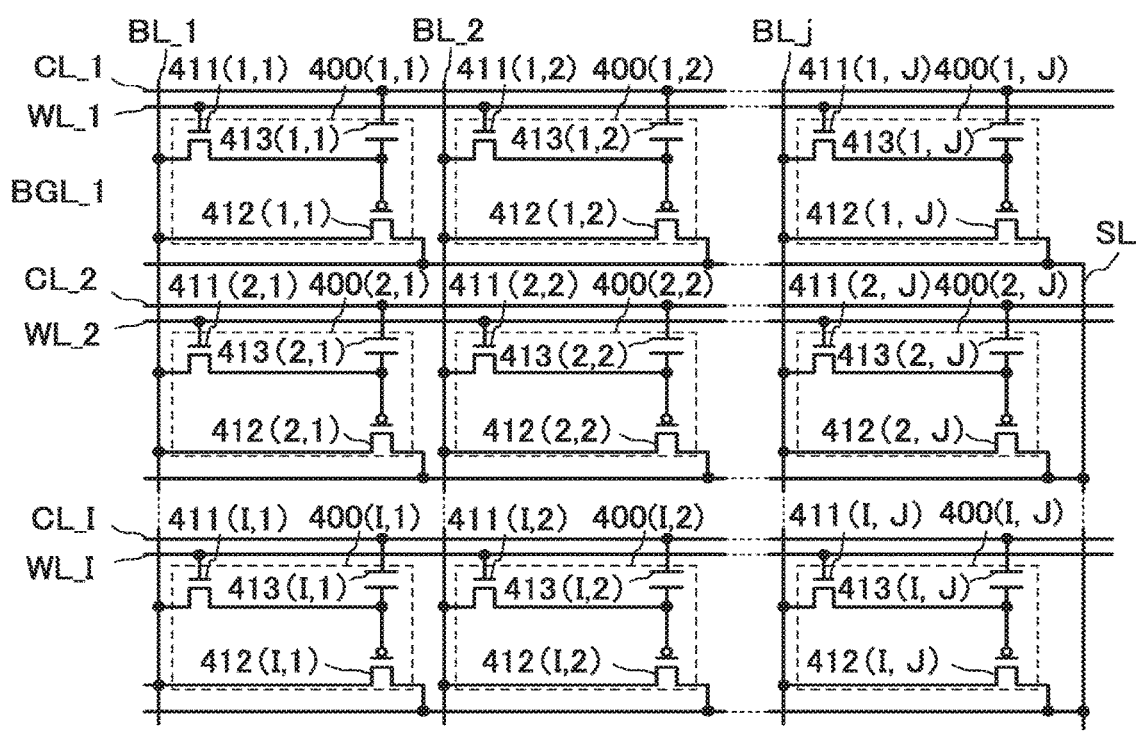
FIG. 8 illustrates an example of a memory.

A memory cell array shown in FIG. 8 includes a plurality of memory cells (memory circuits) 400 arranged in I rows and J columns, wirings BL_1 to BL_J, wirings WL_1 to WL_I, wirings CL_1 to CL_I, and a wiring SL supplied with a potential at a predetermined level.

In the memory cell array in FIG. 8, the memory cell 400 of the M-th row (M is a natural number larger than or equal to 1 and smaller than or equal to I) and the N-th column (N is a natural number larger than or equal to 1 and smaller than or equal to J), that is, the memory cell 400(M, N) includes a transistor 411(M, N), a transistor 412(M, N), and a capacitor 413(M, N).

One of a source and a drain of the transistor 411(M, N) is connected to the wiring BL_N. A gate of the transistor 411(M, N) is connected to the wiring WL_M. Note that the potential of a back gate of the transistor 411(M, N) may be held for a certain period by a circuit including a diode and a capacitor.

The transistor 411(M, N), which is an n-channel transistor, is a selection transistor for controlling writing and holding of data.

As the transistor 411(M, N), the transistor with low off-state current described above can be used.

The transistor 412 is a p-channel transistor. One of a source and a drain of the transistor 412(M, N) is connected to the wiring BL_N, and the other of the source and the drain of the transistor 412(M, N) is connected to the wiring SL. A gate of the transistor 412(M, N) is connected to the other of the source and the drain of the transistor 411(M, N).

The transistor 412(M, N) functions as an output transistor which sets a potential of data to be output.

One of a pair of electrodes of the capacitor 413(M, N) is connected to the other of the source and the drain of the transistor 411(M, N), and the other of the pair of electrodes is connected to the wiring CL_M.

The capacitor 413(M, N) functions as a storage capacitor that holds data.

The above is the description of the configuration example of the memory cell array illustrated in FIG. 8.

Next, an example of a method for driving a memory including the memory cell array in FIG. 8 is described. Here, the case where data is sequentially written into the memory cells 400 of the M-th row and then the written data is read is described as an example; however, one embodiment of the present invention is not limited to this case.

First, in order to write data into the memory cells 400 of the M-th row, the potential of the M-th wiring WL_M is set at VH and the potentials of the other wirings WL_other are set at VL.

Note that VH is a potential at a higher level than a reference potential (e.g., a power supply potential VSS) and is a power supply potential VDD, for example. Moreover, VL is a potential at a level lower than or equal to the level of the reference potential.

At this time, in each of the memory cells 400 of the M-th row, the transistor 411 is turned on and the level of the potential of one of the pair of electrodes of the capacitor 413 is equivalent to the level of the potential of the corresponding wiring BL.

Then, the transistor 411 is turned off and the gate of the transistor 412 is in a floating state, so that the gate potential of the transistor 412 is held.

Data can be written into all the memory cells 400 by performing the above operation row by row.

In order to read data from the memory cells 400 of the M-th row, the potentials of all the wirings WL are set at VL, the potential of the wiring CL_M is set at VL, and the potentials of the other wirings CL_other are set at VH.

In each of the memory cells 400 of the M-th row, the resistance between the source and the drain of the transistor 412 depends on the gate voltage of the transistor 412. In addition, a potential corresponding to the amount of current flowing between the source and the drain of the transistor 412 can be read as data from the memory cell 400.

Data can be read from all the memory cells 400 by repeatedly performing the above operation row by row. The above is the description of the method for driving the memory.

Embodiment 4

In this embodiment, structural examples of a circuit included in the device 100 are described with reference to FIGS. 9A and 9B. Examples of the circuit include the circuits 113, 115, 116, 119, and 121.

Figure 9A:
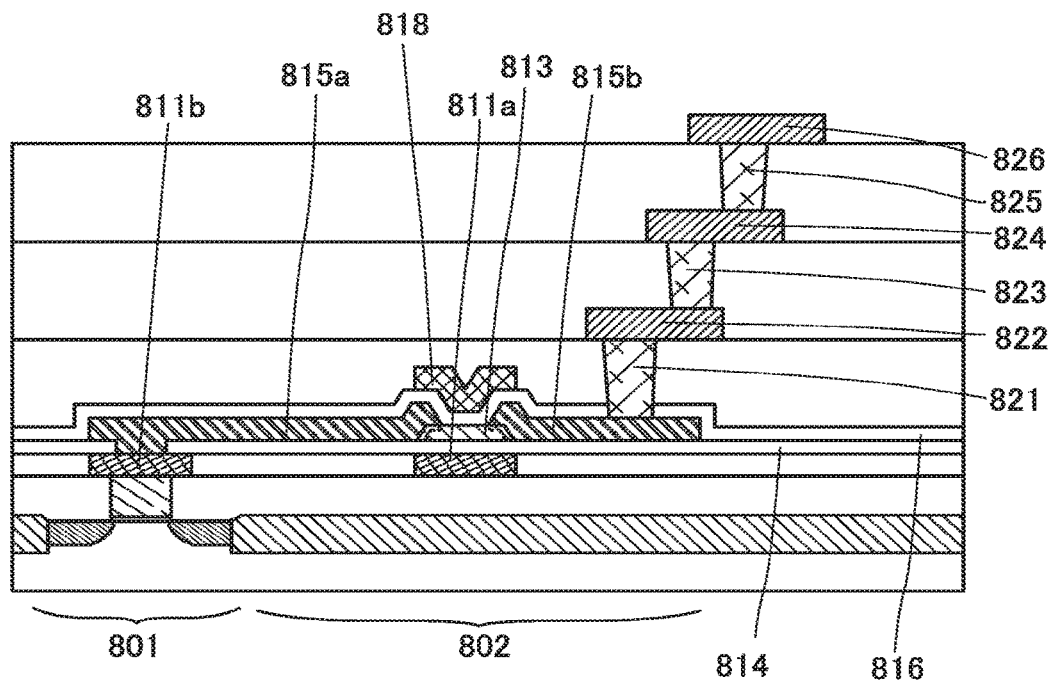
FIGS. 9A and 9B each illustrate a structural example of a device.

In the device 100 illustrated in FIG. 9A, a transistor 801 containing silicon in a channel formation region and a transistor 802 containing an oxide semiconductor in a channel formation region are stacked and further a plurality of wiring layers are stacked over the transistor 802.

The transistor 801 is provided in a semiconductor substrate having an embedded insulating layer.

The transistor 802 includes a conductive layer 811a embedded in an insulating layer, an insulating layer 814 over the conductive layer 811a, an oxide semiconductor layer 813 which overlaps with the conductive layer 811a with the insulating layer 814 provided therebetween, conductive layers 815a and 815b which are connected to the oxide semiconductor layer 813, an insulating layer 816 over the oxide semiconductor layer 813 and the conductive layers 815a and 815b, and a conductive layer 818 which overlaps with the oxide semiconductor layer 813 with the insulating layer 816 provided therebetween. In this case, the conductive layer 811a functions as a back gate electrode. The insulating layer 814 functions as a gate insulating layer. The oxide semiconductor layer 813 functions as a channel formation layer. Each of the conductive layers 815a and 815b functions as a source electrode or a drain electrode. The insulating layer 816 functions as a gate insulating layer. The conductive layer 818 functions as a gate electrode.

It is preferred that the insulating layer 814 has a function of blocking impurities such as hydrogen. For example, an aluminum oxide layer, a silicon nitride layer, or the like has a function of blocking hydrogen. The oxide semiconductor layer 813 is surrounded by the insulating layers 814 and 816 in the structure illustrated in FIG. 9A; therefore, diffusion of impurities such as hydrogen from the outside (e.g., the transistor 801) into the transistor 802 is suppressed.

Further, the conductive layer 815a is connected to a conductive layer 811b formed using the same conductive film as the conductive layer 811a through an opening penetrating the insulating layer 814, and the conductive layer 811b is connected to a gate electrode of the transistor 801.

Further, wiring layers 822, 824, and 826 are stacked in that order over the transistor 802. The wiring layer 822 is connected to the conductive layer 815b through a wiring layer 821 embedded in an insulating layer. The wiring layer 824 is connected to the wiring layer 822 through a wiring layer 823 embedded in an insulating layer. The wiring layer 826 is connected to the wiring layer 824 through a wiring layer 825 embedded in an insulating layer. For example, the wiring layer 826 may be used as an external connection terminal.

Figure 9B:
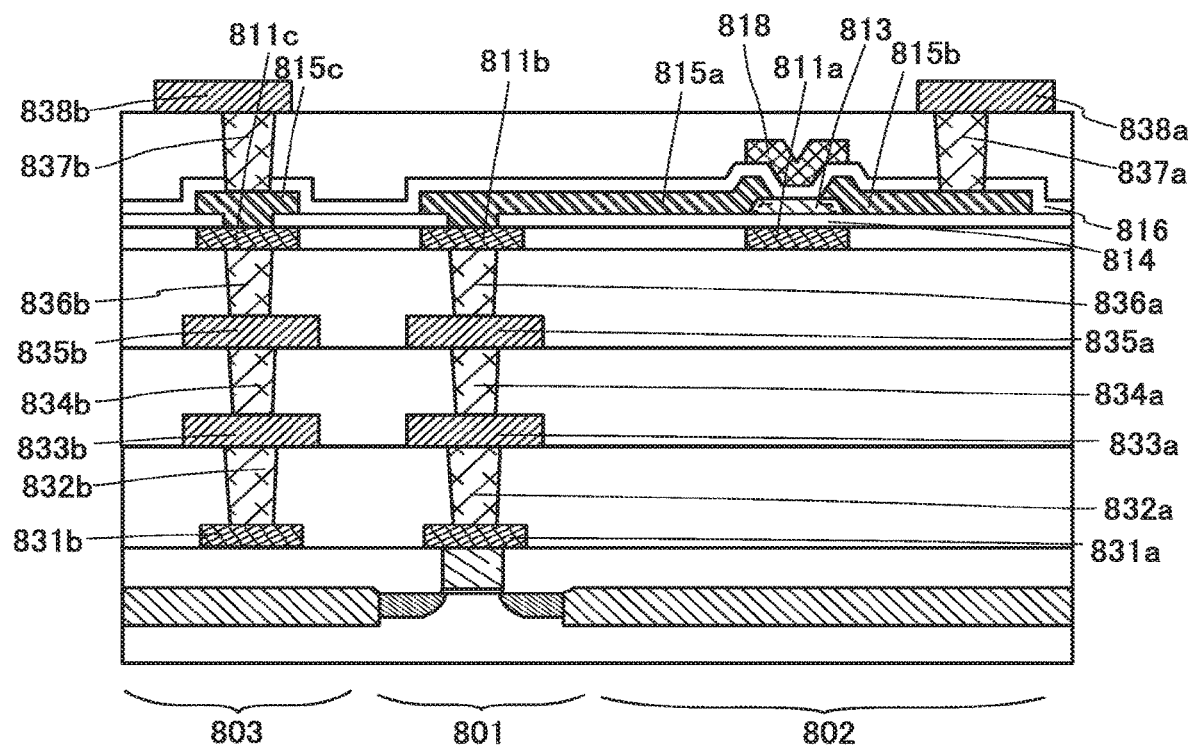

Further, in the structure illustrated in FIG. 9B, the transistor 801 and the transistor 802 are stacked and further a plurality of wiring layers are provided between the transistor 801 and the transistor 802. Further, a terminal portion 803 is also illustrated in FIG. 9B.

Wiring layers 831a, 833a, and 835a are stacked in that order over the transistor 801. The wiring layer 831a is connected to the gate electrode of the transistor 801. The wiring layer 833a is connected to the wiring layer 831a through a wiring layer 832a embedded in an insulating layer. The wiring layer 835a is connected to the wiring layer 833a through a wiring layer 834a embedded in an insulating layer.

Further, the conductive layer 815a is connected to the conductive layer 811b formed using the same conductive film as the conductive layer 811a through the opening penetrating the insulating layer 814, and the conductive layer 811b is connected to the wiring layer 835a through a wiring layer 836a embedded in an insulating layer.

Further, a wiring layer 838 is stacked over the transistor 802. The wiring layer 838a is connected to the conductive layer 815b through a wiring layer 837a embedded in an insulating layer.

In the terminal portion 803, a wiring layer 831b formed using the same conductive film as the wiring layer 831a, a wiring layer 833b formed using the same conductive film as the wiring layer 833a, a wiring layer 835b formed using the same conductive film as the wiring layer 835a a conductive layer 811c formed using the same conductive film as the conductive layer 811a, a conductive layer 815c formed using the same conductive film as the conductive layer 815a, a wiring layer 837b formed using the same conductive film as the wiring layer 837a, and a wiring layer 838b formed using the same conductive film as the wiring layer 838a are stacked in that order. The wiring layer 833b is connected to the wiring layer 831b through a wiring layer 832b which is embedded in the insulating layer and formed using the same conductive film as the wiring layer 832a. The wiring layer 835b is connected to the wiring layer 833b through a wiring layer 834b which is embedded in the insulating layer and formed using the same conductive film as the wiring layer 834a. The conductive layer 811c is connected to the wiring layer 835b through a wiring layer 836b which is embedded in the insulating layer and formed using the same conductive film as the wiring layer 836a. The conductive layer 815c is connected to the conductive layer 811c through an opening penetrating the insulating layer 814. The wiring layer 838b is connected to the conductive layer 815c through the wiring layer 837b which is embedded in the insulating layer and formed using the same conductive film as the wiring layer 837a. For example, the wiring layer 838b may be used as an external connection terminal.

Further, components are described.

Each of the conductive layers 811a to 811c and the conductive layer 818 and the wiring layers 831a to 838a and the wiring layers 831b to 838b can be a layer containing a metal material such as molybdenum, titanium, chromium, tantalum, magnesium, silver, tungsten, aluminum, copper, neodymium, ruthenium, or scandium. Further, for each of the conductive layers 811a to 811c and the conductive layer 818 and the wiring layers 831a to 838a and the wiring layers 831b to 838b, a metal oxide or the like may be used.

As each of the insulating layers including the insulating layer 814 and the insulating layer 816, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, a hafnium oxide layer, a gallium oxide layer, or the like can be used, for example. For example, a silicon oxide layer, a silicon oxynitride layer, or the like can be used as each of the insulating layer 814 and the insulating layer 816. The above insulating layer may contain halogen. Note that the insulating layer 814 and the insulating layer 816 are not necessarily provided.

For the oxide semiconductor layer 813, an In-based metal oxide, a Zn-based metal oxide, an In—Zn-based metal oxide, an In—Ga—Zn-based metal oxide, or the like can be used, for example. The oxide semiconductor layer may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC. Note that an oxide semiconductor including CAAC is referred to as a CAAC-OS (c-axis aligned crystalline oxide semiconductor). For example, the oxide semiconductor layer may include a CAAC-OS. In the CAAC-OS, for example, c-axes are aligned, and a-axes and/or b-axes are not macroscopically aligned.

Alternatively, a metal oxide including another metal element instead of part or all of Ga in the In—Ga—Zn-based metal oxide may be used. As the aforementioned another metal element, a metal element that is capable of combining, with more oxygen atoms than gallium is can be used, for example, and specifically one or more elements of titanium, zirconium, hafnium, germanium, and tin can be used, for instance. Alternatively, as the aforementioned another metal element, one or more elements of lanthanum, cerium, praseodymium, neodymium, samarium, europium, gadolinium, terbium, dysprosium, holmium, erbium, thulium, ytterbium, and lutetium may be used. These metal elements function as a stabilizer. Note that the amount of such a metal element added is determined so that the metal oxide can function as a semiconductor. When a metal element that is capable of combining with more oxygen atoms than gallium is is used and oxygen is supplied to a metal oxide, oxygen defects in the metal oxide can be reduced.

Each of the conductive layers 815a to 815c can be, for example, a layer containing a metal material such as molybdenum, titanium, chromium, tantalum, magnesium, silver, tungsten, aluminum, copper, neodymium, ruthenium, or scandium. Further, a metal oxide or the like may be used for each of the conductive layers 815a to 815c.

As illustrated in FIGS. 9A and 9B, in the examples of the device 100 in this embodiment, the device 100 has a stack of different transistors, whereby the circuit area can be reduced.

Note that the above structure is not necessarily applied to the device 100; the device 200 may have the above structure.

Embodiment 5

In this embodiment, structural examples of the device 100 will be described with reference to FIGS. 10A and 10B, FIGS. 11A1, 11A2, 11B1, and 11B2. FIGS. 12A and 12B, FIGS. 13A and 13B, FIG. 14, FIGS. 15A to 15B, FIGS. 16A to 16C, and FIG. 17.

Figure 10A:
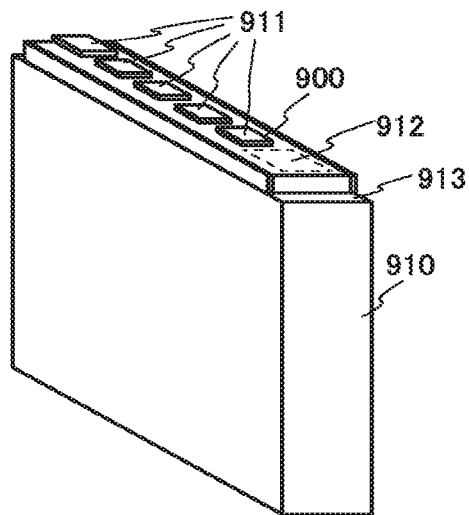
FIGS. 10A and 10B illustrate an example of a power storage unit.
Figure 10B:
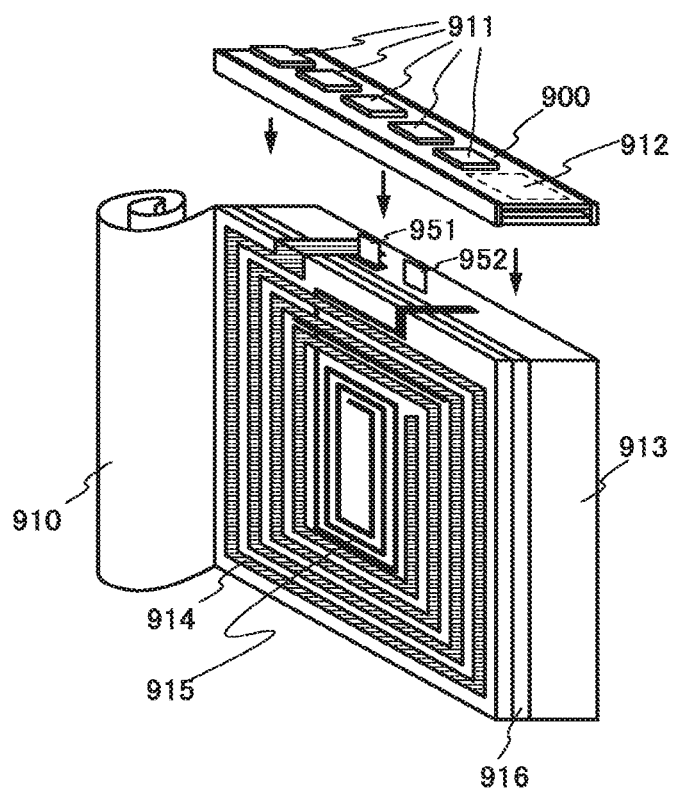

FIGS. 10A and 10B are external views of the device 100. The device 100 includes a circuit board 900 and a power storage unit 913. A label 910 is attached to the power storage unit 913. Further, as shown in FIG. 10B, the device 100 includes a terminal 951 and a terminal 952, and includes an antenna 914 and an antenna 915 between the power storage unit 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 includes, for example, the circuits 113, 115, 116, 119, and 121 and the transistors 131, 132, 150, and 170 shown in FIG. 2A. The circuit 912 may be provided on the rear side of the circuit board 900. Note that the antenna 914 corresponds to the antenna 114, and the antenna 915 corresponds to the antenna 118. Each of the antennas 914 and 915 is not limited to having a coil shape and may have a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, power can be transmitted and received not only by an electromagnetic field or a magnetic field but also by an electric field.

The power storage unit 913 corresponds to the power storage unit 111 in FIG. 2A.

The line width of the antenna 914 is preferably larger than that of the antenna 915. This makes it possible to increase the amount of electric power received by the antenna 914.

The device 100 includes a layer 916 between the power storage unit 913 and the antennas 914 and 915. The layer 916 has a function of preventing shielding of an electromagnetic field applied to the power storage unit 913. As the layer 916, for example, a magnetic body can be used. The layer 916 may serve as a shielding layer.

Note that the structure of the device 100 is not limited to that shown in FIGS. 10A and 10B.

For example, as shown in FIGS. 11A1 as 11A2 two opposing surfaces of the power storage unit 913 in FIGS. 10A and 10B may be provided with respective antennas. FIG. 11A1 is an external view showing one side of the opposing surfaces, and FIG. 11A2 is an external view showing the other side of the opposing surfaces. Note that for portions similar to those in FIGS. 10A and 10B, description on the device 100 shown in FIGS. 10A and 10B can be referred to as appropriate.

As shown in FIG. 11A1, the antenna 914 is provided on one of the opposing surfaces of the power storage unit 913 with the layer 916 provided therebetween, and as shown in FIG. 11A2, the antenna 915 is provided on the other of the opposing surfaces of the power storage unit 913 with a layer 917 provided therebetween. The layer 917 has a function of preventing shielding of an electromagnetic field applied to the power storage unit 913. As the layer 917, for example, a magnetic body can be used. The layer 917 may serve as a shielding layer.

With the above structure, both of the antennas 914 and 915 can be increased in size.

Alternatively, as shown in FIGS. 11B1 and 11B2, two opposing surfaces of the power storage unit 913 in FIGS. 10A and 10B may be provided with different types of antennas. FIG. 11B1 is an external view showing one side of the opposing surfaces, and FIG. 11B2 is an external view showing the other side of the opposing surfaces. Note that for portions similar to those in FIGS. 10A and 10B, description on the device 100 shown in FIGS. 10A and 10B can be referred to as appropriate.

As shown in FIG. 11B1, the antennas 914 and 915 are provided on one of the opposing surfaces of the power storage unit 913 with the layer 916 provided therebetween, and as shown in FIG. 11B2, an antenna 918 is provided on the other of the opposing surfaces of the power storage unit 913 with the layer 917 provided therebetween. The antenna 918 has a function of performing data communication with an external device, for example. An antenna with a shape that can be applied to the antennas 914 and 915, for example, can be used as the antenna 918. As a system for communication using the antenna 918 between the device 100 and another device, a response method which can be used between the device 100 and the device 200, such as NFC, can be employed.

Figure 12A:
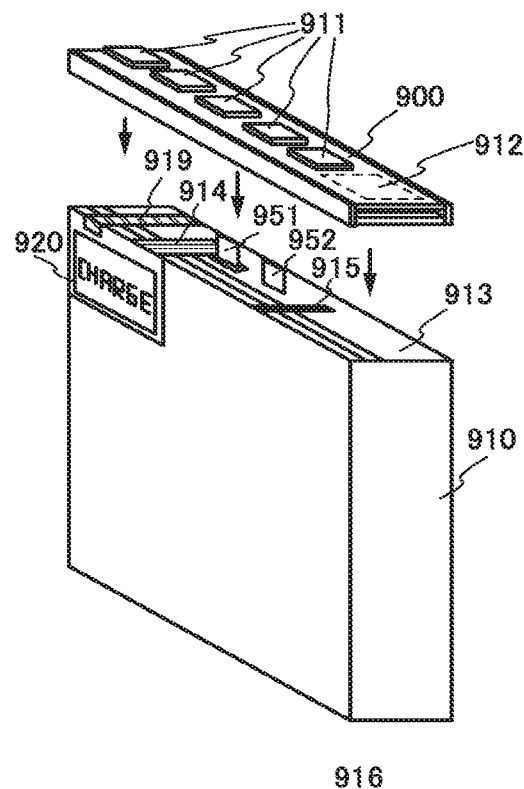
FIGS. 12A and 12B each illustrate an example of a power storage unit.

Alternatively, as shown in FIG. 12A, the power storage unit 913 in FIGS. 10A and 10B may be provided with a display device 920. The display device 920 is electrically connected to the terminal 911 via a terminal 919. It is possible that the label 910 is not provided in a portion where the display device 920 is provided. Note that for portions similar to those in FIGS. 10A and 10B, description on the device 100 shown in FIGS. 10A and 10B can be referred to as appropriate.

The display device 920 can display, for example, an image showing whether or not charging is being carried out, an image showing the amount of stored power, or the like. As the display device 920, electronic paper, a liquid crystal display device, an electroluminescent (EL) display device, or the like can be used. For example, power consumption of the display device 920 can be reduced when electronic paper is used.

Figure 12B:
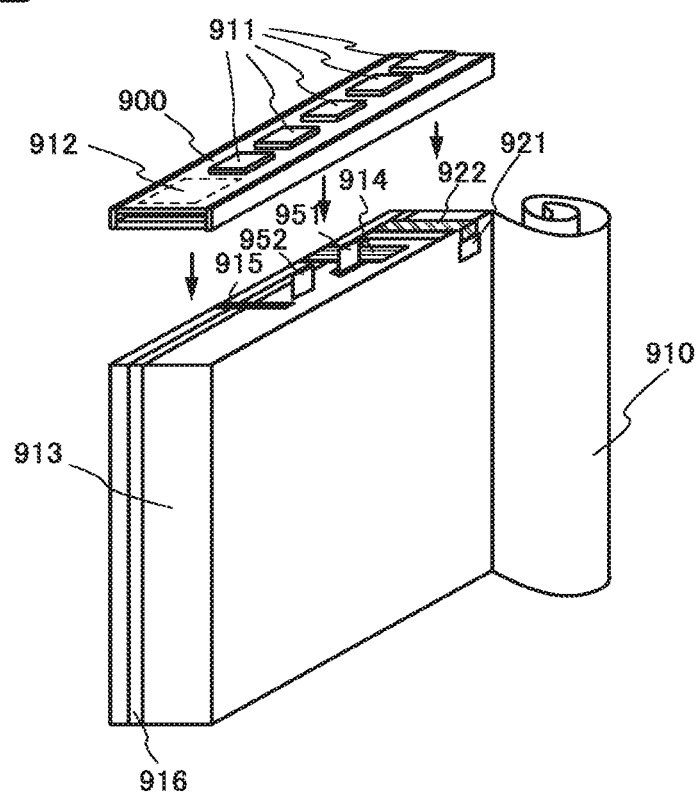

Alternatively, as shown in FIG. 12B, the power storage unit 913 in FIGS. 10A and 10B may be provided with a sensor 921. The sensor 921 is electrically connected to the terminal 911 via a terminal 922. Note that the sensor 921 may be provided between the power storage unit 913 and the label 910. Note that for portions similar to those in FIGS. 10A and 10B, description on the device 100 shown in FIGS. 10A and 10B can be referred to as appropriate.

As the sensor 921, for example, a sensor that can be used as the sensor 235 can be used. Accordingly, the sensor 921 may be used as the sensor 235. With the sensor 921, for example, data on an environment (e.g., temperature) where the device 100 is placed can be detected and stored in a memory inside the circuit 912.

Further, structural examples of the power storage unit 913 are described with reference to FIGS. 13A and 13B and FIG. 14.

Figure 13A:
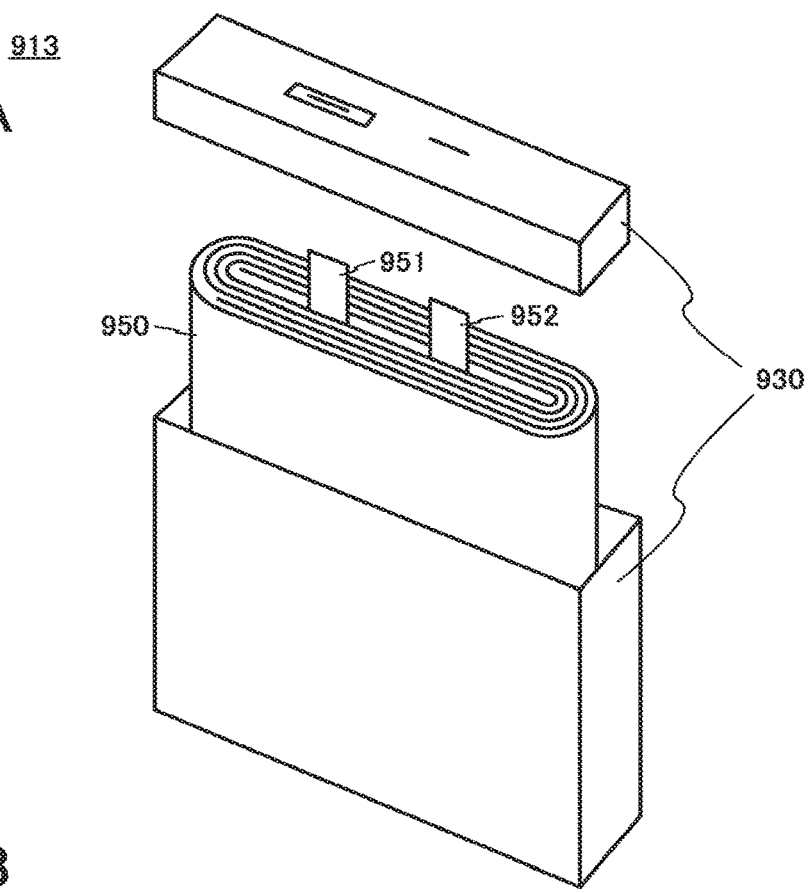
FIGS. 13A and 13B each illustrate an example of a power storage unit.

The power storage unit 913 shown in FIG. 13A includes a wound body 950 provided with the terminals 951 and 952 inside a housing 930. The wound body 950 is soaked in an electrolytic solution inside the housing 930. The terminal 952 is in contact with the housing 930. An insulator or the like prevents contact between the terminal 951 and the housing 930. Note that in FIG. 13A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 13B:
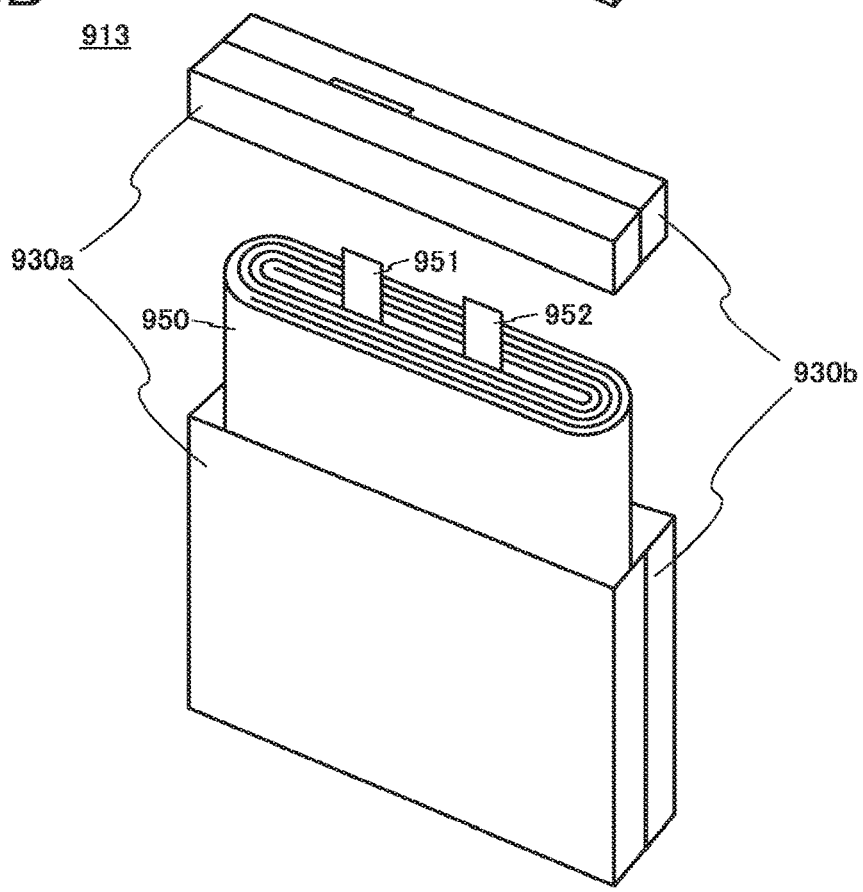

Note that as shown in FIG. 13B, the housing 930 in FIG. 13A may be formed using a plurality of materials. For example, in the power storage unit 913 in FIG. 13B, a housing 930*a* and a housing 930*b* are attached to each other and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, shielding of an electric field applied to the power storage unit 913 can be prevented. Note that when the effect of electric field shielding by the housing 930*a* is low, an antenna such as the antennas 914 and 915 may be provided inside the housing 930. For the housing 930*b*, a metal material can be used, for example.

Figure 14:
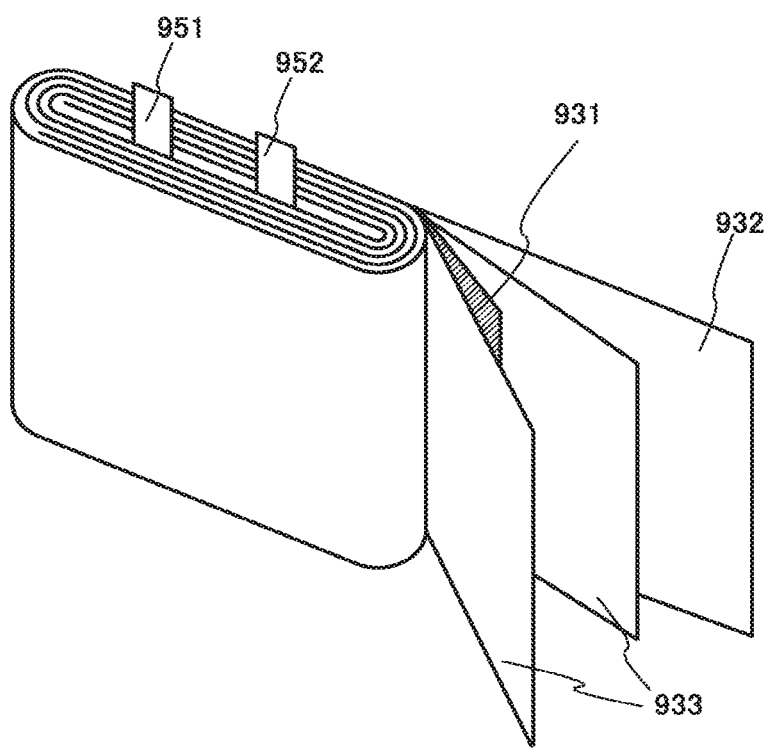
FIG. 14 illustrates an example of part of a power storage unit.

FIG. 14 shows a structure of the wound body 950. The wound body 950 includes a negative electrode 931, a positive electrode 932, and a separator 933. The wound body 950 is obtained by winding a sheet of a stack in which the negative electrode 931 overlaps with the positive electrode 932 with the separator 933 provided therebetween.

The negative electrode 931 is connected to the terminal 911 in FIGS. 10A and 10B via one of the terminals 951 and 952. The positive electrode 932 is connected to the terminal 911 in FIGS. 10A and 10B via the other of the terminals 951 and 952.

Further, components are described.

An example of the negative electrode 931 is described with reference to FIG. 15A to 15D.

Figure 15A:
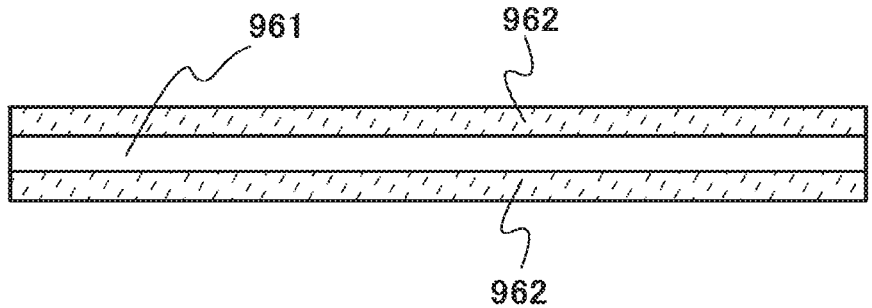
FIGS. 15A to 15D illustrate an example of part of a power storage unit.

As illustrated in FIG. 15A, the negative electrode 931 includes a negative electrode current collector 961 and a negative electrode active material layer 962 provided on one or both surfaces (on the both surfaces in the drawing) of the negative electrode current collector 961.

The negative electrode current collector 961 is formed using a highly conductive material which is not alloyed with a carrier ion such as a lithium ion. For example, stainless steel, iron, copper, nickel, or titanium can be used. The negative electrode current collector 961 can have a foil shape, a plate shape (sheet shape), a net shape, a punching metal shape, an expanded-metal shape, or the like as appropriate. The negative electrode current collector 961 preferably has a thickness of greater than or equal to 10 μm and less than or equal to 30 μm.

The negative electrode active material layer 962 is provided on one or both surfaces of the negative electrode current collector 961. Other than a lithium metal, graphite, which is a carbon material generally used in the field of power storage, can also be used for the negative electrode active material layer 962. Examples of graphite include low crystalline carbon, such as soft carbon and hard carbon, and high crystalline carbon, such as natural graphite, kish graphite, pyrolytic carbon, mesophase pitch based carbon fiber, meso-carbon microbeads (MCMB), mesophase pitches, and petroleum-based or coal-based coke.

As the negative electrode active material, other than the above materials, an alloy-based material which enables a charge-discharge reaction by an alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used as the alloy-based material.

Note that, for example, a surface of the negative electrode active material may be coveted with an oxide film of metal, silicon, or the like. The formation of the above oxide film covering the surface of the negative electrode active material can suppress formation of a solid electrolyte interphase film on the surface of the negative electrode, and thus can prevent generation of irreversible capacity.

In this embodiment, the negative electrode active material layer 962 formed by mixing the above electrode material, a conductive additive, and a binder and baking the mixture is used.

Figure 15B:
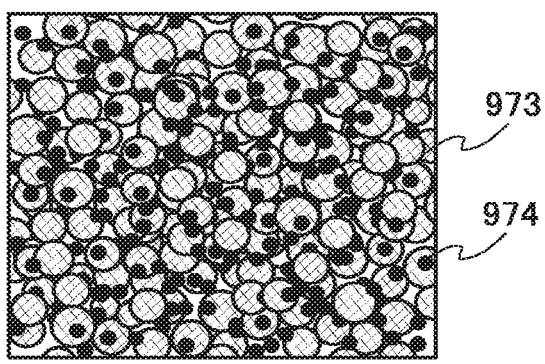

The negative electrode active material layer 962 is described with reference to FIG. 15B. FIG. 15B is a cross-sectional view of part of the negative electrode active material layer 962. The negative electrode active material layer 962 includes the above electrode material, a conductive additive 974, and a binder (not illustrated).

The conductive additive 974 has a function of increasing the conductivity between negative electrode active material particles 973 or between the negative electrode active material particle 973 and the negative electrode current collector 961, and is preferably added to the negative electrode active material layer 962, for example. As the conductive additive 974, a material with a large specific surface is desirably used; for example, acetylene black (AB) or the like can be used. Alternatively, a carbon material such as a carbon nanotube, graphene, or fullerene can be used as the conductive additive 974. Note that an example where graphene is used will be described below.

As the binder, a material which at least binds the negative electrode active material, the conductive additive, and the current collector is used. Examples of the binder include resin materials such as polyvinylidene fluoride (PVDF), a vinylidene fluoride-hexafluoropropylene copolymer, a vinylidene fluoride-tetrafluoroethylene copolymer, styrene-butadiene copolymer rubber, polytetrafluoroethylene polypropylene, polyethylene, and polyimide.

The negative electrode 931 is formed in the following manner. First, the electrode material is mixed into a solvent such as NMP (N-methylpyrrolidone) in which a vinylidene fluoride-based polymer such as polyvinylidene fluoride is dissolved, whereby slurry is formed.

Then, the slurry is applied to one or both surfaces of the negative electrode current collector 961, and dried. In the case where the application step is performed on both surfaces of the negative electrode current collector 961, the negative electrode active material layers 962 are formed on the surfaces at the same time or one by one. After that, rolling with a roller press machine is performed, whereby the negative electrode 931 is formed.

Next, an example of using graphene as the conductive additive added to the negative electrode active material layer 962 is described with reference to FIGS. 15C and 15D.

Here, graphene in this specification includes single-layer graphene and multilayer graphene including two to a hundred layers. Single-layer graphene refers to a sheet of one atomic layer of carbon molecules having bonds. Graphene oxide refers to a compound formed by oxidation of such graphene. When graphene oxide is reduced to form graphene, oxygen contained in the graphene oxide is not entirely released and part of the oxygen remains in the graphene in some cases. When the graphene contains oxygen, the proportion of the oxygen measured by X-ray photoelectron spectroscopy (XPS) in the graphene is higher than or equal to 2 atomic % and lower than or equal to 20 atomic %, preferably higher than or equal to 3 atomic % and lower than or equal to 15 atomic %.

Figure 15C:
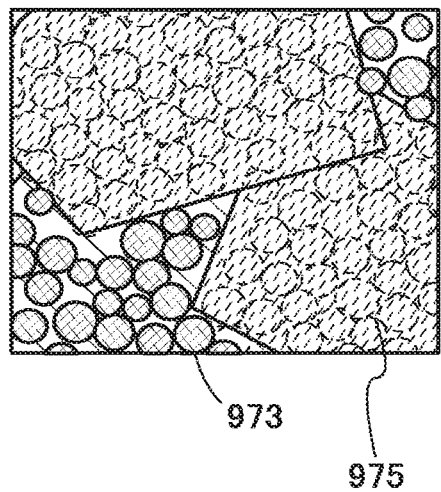

FIG. 15C is a plan view of part of the negative electrode active material layer 962 formed using graphene. The negative electrode active material layer 962 includes the negative electrode active material particles 973 and graphenes 975 which cover a plurality of the negative electrode active material particles 973 and at least partly surround the plurality of the negative electrode active material particles 973. A hinder which is not illustrated may be added; however, in the case where the graphenes 975 are included so many as to sufficiently function as a binder by being bound with each other, the binder is not necessarily added. In the plan view of the negative electrode active material layer 962, different graphenes 975 cover the surfaces of the plurality of the negative electrode active material particles 973. The negative electrode active material particles 973 may be partly exposed.

Figure 15D:
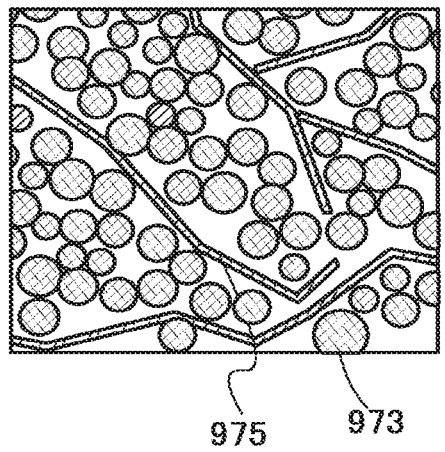

FIG. 15D is a cross-sectional view of part of the negative electrode active material layer 962 in FIG. 15C. FIG. 15D illustrates the negative electrode active material particles 973 and the graphenes 975. In the plan view of the negative electrode active material layer 962, the graphenes 975 cover a plurality of the negative electrode active material particles 973. The graphenes 975 are observed to have linear shapes in cross section. One graphene or plural graphenes overlap with a plurality of the negative electrode active material particles 973, or the plurality of the negative electrode active material particles 973 are at least partly surrounded with one graphene or plural graphenes. Note that the graphene 975 has a bag-like shape, and a plurality of the negative electrode active material particles are at least partly surrounded with the graphene in some cases. The graphene 975 partly has openings where the negative electrode active material particles 973 are exposed in some cases.

The thickness of the negative electrode active material layer 962 is preferably selected as appropriate in the range of 20 μm to 150 μm.

The negative electrode active material layer 962 may be predoped with lithium in such a manner that a lithium layer is formed on a surface of the negative electrode active material layer 962 by a sputtering method. Alternatively, a lithium foil is provided on the surface of the negative electrode active material layer 962, whereby the negative electrode active material layer 962 can be predoped with lithium.

An example of the negative electrode active material particle 973 is a material whose volume is expanded by reception of carrier ions. When such a material is used, the negative electrode active material layer gets vulnerable and is partly collapsed by charge and discharge, resulting in lower reliability (e.g., inferior cycle characteristics) of a power storage device.

However, the graphene 975 covering the periphery of the negative electrode active material particles 973 can prevent dispersion of the negative electrode active material particles and the collapse of the negative electrode active material layer, even when the volume of the negative electrode active material particles is increased and decreased due to charge and discharge. That is to say, the graphene 975 has a function of maintaining the bond between the negative electrode active material particles even when the volume of the negative electrode active material particles is increased and decreased by charge and discharge. For this reason, a binder does not need to be used in forming the negative electrode active material layer 962. Accordingly, the proportion of the negative electrode active material particles in the negative electrode active material layer 962 with certain weight (certain volume) can be increased, leading to an increase in charge and discharge capacity per unit weight (unit volume) of the electrode.

The graphene 975 has conductivity and is in contact with a plurality of the negative electrode active material particles 973; thus, it also serves as a conductive additive. That is, a conductive additive does not need to be used in forming the negative electrode active material layer 962. Accordingly, the proportion of the negative electrode active material particles in the negative electrode active material layer 962 with certain weight (certain volume) can be increased, leading to an increase in charge and discharge capacity per unit weight (unit volume) of the electrode.

The graphene 975 efficiently forms a sufficient electron conductive path in the negative electrode active material layer 962, so that the conductivity of the negative electrode 931 can be increased.

Note that the graphene 975 also as a negative electrode active material capable of receiving and releasing carrier ions, leading to an increase in charge capacity of the negative electrode 931.

Note that the graphene may be used as a positive electrode active material.

Next, a method for forming the negative electrode active material layer 962 in FIGS. 15C and 15D is described.

First, the electrode material and a dispersion liquid containing graphene oxide are mixed to form slurry.

Next, the slurry is applied to the negative electrode current collector 961. Next, drying is performed in a vacuum for a certain period of time to remove a solvent from the slurry applied to the negative electrode current collector 961. After that, rolling with a roller press machine is performed.

Then, the graphene oxide is electrochemically reduced with electric energy or thermally reduced by heat treatment to form the graphene 975. Particularly in the case where electrochemical reduction treatment is performed, the proportion of carbon atoms forming π bonds of graphene formed by the electrochemical reduction treatment is higher than that of graphene formed by heat treatment; therefore, the graphene 975 having high conductivity can be formed. Through the above steps, the negative electrode active material layer 962 in which the graphene is used as a conductive additive can be formed on one or both surfaces of the negative electrode current collector 961, and thus the negative electrode 931 can be formed.

Next, the positive electrode 932 is described with reference to FIGS. 16A to 16C.

Figure 16A:
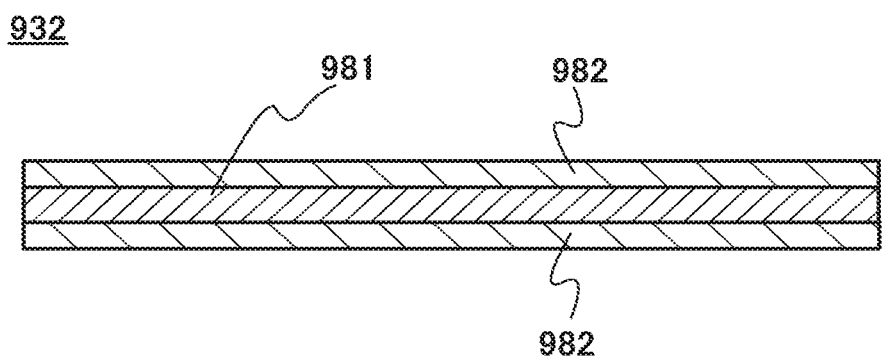
FIGS. 16A to 16C illustrate an example of part of a power storage unit.

FIG. 16A is a cross-sectional view of the positive electrode 932. In the positive electrode 932, a positive electrode active material layer 982 is formed over a positive electrode current collector 981.

For the positive electrode current collector 981, a highly conductive material such as a metal typified by stainless steel, gold, platinum, zinc, iron, copper, aluminum, or titanium, or an alloy thereof can be used. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 981 can have a foil shape, a plate shape (sheet shape), a net shape, a punching metal shape, an expanded-metal shape, or the like as appropriate.

In addition to a positive electrode active material, a conductive additive and a binder may be included in the positive electrode active material layer 982.

As the positive electrode active material of the positive electrode active material layer 982, a compound such as $LiFeO_2$, $LiCoO_2$, $NiO_2$, $LiMn_2O_4$, $V_2O_5$, $Cr_2O_5$, or $MnO_2$ can be used.

Alternatively, a lithium-containing complex phosphate ($LiMPO_4$ (general formula) (M is one or more of Fe(II), Mn(II), Co(II), and Ni(II))) can be used for the positive electrode active material layer 982. Typical examples of $LiMPO_4$ (general formula) which can be used as an active material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \le 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \le 1$, $0<c<1$, $0<d<1$, and $0<e<1$), and $LiFe_fNi_gCo_hMn_iPO_4$ ($f+g+h+i \le 1$, $0<f<1$, $0<g<1$, $0<h<1$, and $0<i<1$).

Further, a lithium-containing complex silicate such as $Li_{(2-j)}MSiO_4$ (general formula) (M is one or more of Fe(II), Mn(II), Co(II), and Ni(II) and $0 \le j \le 2$) can be used. Typical examples of $Li_{(2-j)}MSiO_4$ (general formula) which can be used as a material are compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \le 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \le 1$, $0<m<1$, $0<n<1$, and $0<q<1$), and $Li_{(2-j)}Fe_rNi_sCo_tMn_uSiO_4$ ($r+s+t+u \le 1$, $0<r<1$, $0<s<1$, $0<t<1$, and $0<u<1$).

In the case where carrier ions are alkaline-earth metal ions or alkali metal ions other than lithium ions, the positive electrode active material layer 982 may contain, instead of lithium in the above lithium compound, lithium-containing complex phosphate, and lithium-containing complex silicate, an alkali metal (e.g., sodium or potassium) or an alkaline-earth metal (e.g., calcium, strontium, barium, beryllium, or magnesium).

The positive electrode active material layer 982 is not necessarily formed in contact with the positive electrode current collector 981. Between the positive electrode current collector 981 and the positive electrode active material layer

982, any of the following functional layers may be formed using a conductive material such as a metal: an adhesive layer for the purpose of improving adhesiveness between the positive electrode current collector 981 and the positive electrode active material layer 982, a planarization layer for reducing unevenness of the surface of the positive electrode current collector 981, a heat radiation layer for radiating heat, and a stress relaxation layer for relieving stress of the positive electrode current collector 981 or the positive electrode active material layer 982.

Figure 16B:
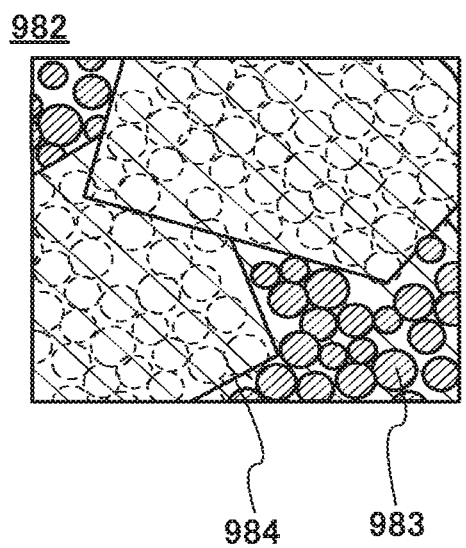

FIG. 16B is a plan view of the positive electrode active material layer 982. For the positive electrode active material layer 982, positive electrode active material particles 983 that can receive and release carrier ions are used. An example is shown in which graphenes 984 covering a plurality of the positive electrode active material particles 983 and at least partly surrounding the plurality of the positive electrode active material particles 983 are included. The different graphenes 984 cover the surfaces of the plurality of the positive electrode active material particles 983. The positive electrode active material particles 983 may be partly exposed.

The size of the positive electrode active material particle 983 is preferably greater than or equal to 20 nm and less than or equal to 100 nm. Note that the size of the positive electrode active material particle 983 is preferably smaller because electrons transfer in the positive electrode active material particles 983.

Sufficient characteristics can be obtained even when the surface of the positive electrode active material particle 983 is not covered with a graphite layer; however, it is preferable to use both the graphene and the positive electrode active material particle covered with a graphite layer because current flows.

Figure 16C:
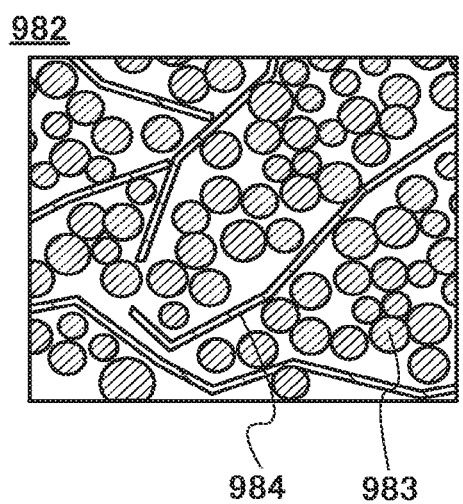

FIG. 16C is a cross-sectional view of part of the positive electrode active material layer 982 in FIG. 16B. The positive electrode active material layer 982 includes the positive electrode active material particles 983 and the graphenes 984 which cover a plurality of the positive electrode active material particles 983. The graphenes 984 are observed to have linear shapes in cross section. A plurality of the positive electrode active material particles 983 are at least partly surrounded with one graphene 984 or a plurality of the graphenes 984 or sandwiched between a plurality of the graphenes 984. Note that the graphene 984 has a bag-like shape and a plurality of the positive electrode active material particles 981 are surrounded with the graphene 984 in some cases. In addition, part of the positive electrode active material particles is not covered with the graphenes and exposed in some cases.

The desired thickness of the positive electrode active material layer 982 is determined in the range of 20 µm to 100 µm. It is preferable to adjust the thickness of the positive electrode active material layer 982 as appropriate so that neither a crack nor flaking is caused.

Note that the positive electrode active material layer 982 may contain a known conductive additive, for example, acetylene black particles having a volume 0.1 to 10 times as large as that of the graphene or carbon particles such as carbon nanofibers having a one-dimensional expansion.

Depending on a material of positive electrode active material particles, the volume is expanded because of reception of ions serving as carriers. When such a material is used, the positive electrode active material layer gets vulnerable and is partly collapsed by charge and discharge, resulting in lower reliability of a power storage device. However, graphene covering the periphery of positive electrode active material particles allows prevention of dispersion of the positive electrode active material particles and the collapse of a positive electrode active material layer, even when the volume of the positive electrode active material particles is increased and decreased by charge and discharge. That is to say, the graphene has a function of maintaining the bond between the positive electrode active material particles even when the volume of the positive electrode active material particles is increased and decreased by charge and discharge. Therefore, the use of the graphene can improve the reliability of the power storage unit.

The graphene 984 is in contact with a plurality of the positive electrode active material particles and serves also as a conductive additive. Further, the graphene 984 has a function of holding the positive electrode active material particles capable of receiving and releasing carrier ions. Thus, a binder does not have to be mixed into the positive electrode active material layer. Accordingly, the proportion of the positive electrode active material particles in the positive electrode active material layer can be increased, which allows an increase in discharge capacity of the power storage unit.

Next, a method for forming the positive electrode active material layer 982 will be described.

First, a slurry containing positive electrode active material particles and graphene oxide is formed. Then, the slurry is applied to the positive electrode current collector 981. After that, heating is performed in a reducing atmosphere for reduction treatment so that the positive electrode active material particles are baked and part of oxygen is released from graphene oxide to form graphene. Note that oxygen in the graphene oxide might not be entirely released and partly remains in the graphene. Note that the reduction treatment of the graphene oxide is not limited to the above-described reduction by heating (hereinafter referred to as thermal reduction). The reduction treatment may be performed by a reduction method different from the thermal reduction, e.g., reduction caused by a chemical reaction using a reducer such as hydrazine (hereinafter referred to as chemical reduction) or electrochemical reduction performed by applying a potential at which graphene oxide is reduced to an electrode in an electrolytic solution (hereinafter referred to as electrochemical reduction). Through the above steps, the positive electrode active material layer 982 can be formed over the positive electrode current collector 981. Consequently, the positive electrode active material layer 982 has higher conductivity.

Graphene oxide contains oxygen and thus is negatively charged in a polar solvent. As a result of being negatively charged, graphene oxide is dispersed in the polar solvent. Accordingly, the positive electrode active material particles contained in the slurry are not easily aggregated, so that the size of the positive electrode active material particle can be prevented from increasing. Thus, the transfer of electrons in the positive electrode active material particles is facilitated, resulting in an increase in conductivity of the positive electrode active material layer.

Note that a carbon layer or the like may be provided on a surface of the positive electrode active material particle.

For the separator 933, an insulator such as cellulose (paper), polypropylene with pores, or polyethylene with pores can be used.

Note that the negative electrode 931, the positive electrode 932, and the separator 933 are impregnated with an electrolytic solution. As an electrolyte contained in the electrolytic solution, a material containing carrier ions is used. In the case where lithium ions are used as carrier ions, a lithium salt such as $LiClO_4$, $LiAsF_6$, $LiBF_4$, $LiPF_6$, $Li(C_2F_5SO_2)_2N$ can be used as the electrolyte.

Note that when carrier ions are alkali metal ions other than lithium ions, or alkaline-earth metal ions, instead of lithium in the above lithium salts, an alkali metal (e.g., sodium or potassium), an alkaline-earth metal (e.g., calcium, strontium, barium, beryllium, or magnesium) may be used for the electrolyte.

As a solvent of the electrolytic solution, a material in which the carrier ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used.

When a gelled high-molecular material is used as the solvent for the electrolytic solution, safety against liquid leakage and the like is improved. Further, a lithium ion battery can be thinner and more lightweight. Typical examples of gelled high-molecular materials are a silicone gel, an acrylic gel, an acrylonitrile polyethylene oxide, polypropylene oxide, and a fluorine-based polymer.

Alternatively, the use of one or more of ionic liquids (room temperature molten salts) which are less likely to burn and volatilize as the solvent of the electrolytic solution can prevent the lithium ion battery from exploding or catching fire even when the lithium ion battery internally shorts out or the internal temperature increases due to overcharging or the like.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator is not necessary. Further, the battery can be entirely solidified; therefore, there is no possibility of liquid leakage and thus the safety of the battery is dramatically increased.

Note that the structure of the power storage unit 913 is not limited to those in FIGS. 10A and 10B. An example of a laminated power storage unit 913 will be described with reference to FIG. 17.

Figure 17:
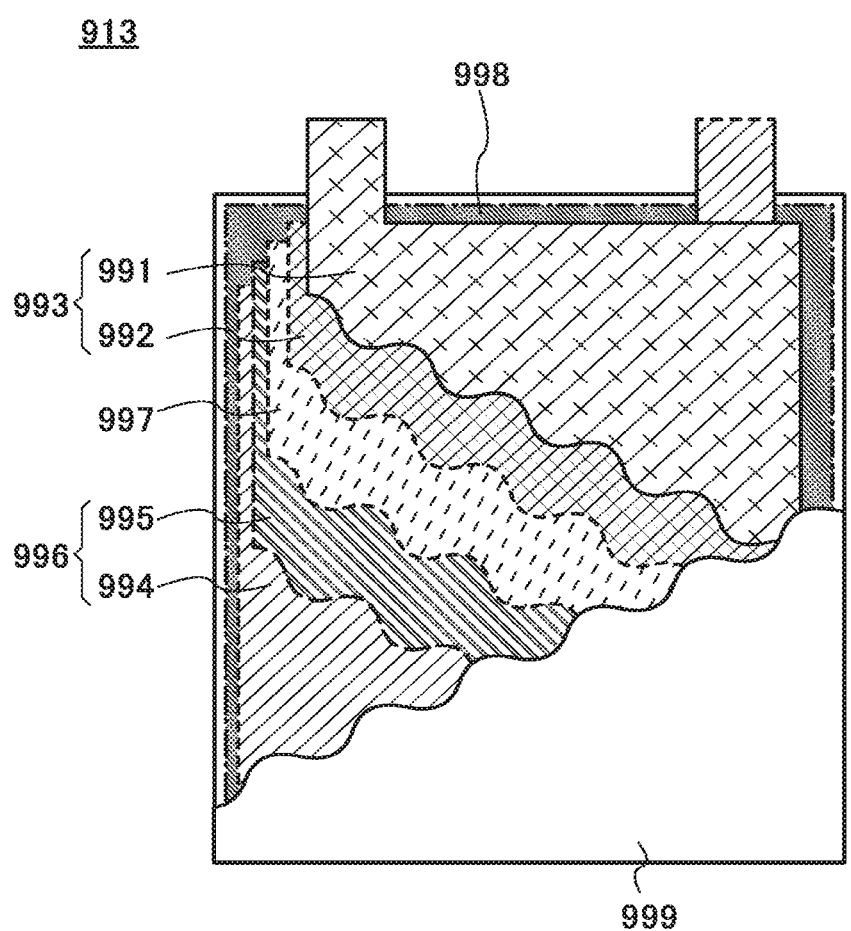
FIG. 17 illustrates an example of a power storage unit.

The laminated power storage unit 913 illustrated in FIG. 17 can be obtained in such a manner that a positive electrode 993 including a positive electrode current collector 991 and a positive electrode active material layer 992, a separator 997, and a negative electrode 996 including a negative electrode current collector 994 and a negative electrode active material layer 995 are stacked and sealed in an exterior body 999 and then an electrolytic solution 998 is injected into the exterior body 999. Although the power storage unit 913 in FIG. 17 has a structure where one sheet-like positive electrode 993 and one sheet-like negative electrode 996 are stacked, it is preferable to roll the stack or stack a plurality of the stacks and then seal the stack(s) in order to increase battery capacity. Particularly in the case of a laminated lithium ion battery, the battery has flexibility and thus is suitable for applications which require flexibility.

In the laminated power storage unit 913 illustrated in FIG. 17, the positive electrode current collector 991 and the negative electrode current collector 994 serve also as terminals for an electrical contact with the outside. For this reason, each of the positive electrode current collector 991 and the negative electrode current collector 994 is provided so as to be partly exposed on the outside of the exterior body 999.

As the exterior body 999 in the laminated power storage unit 913, for example, a stacked film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolytic solution and a gas can be blocked and an insulating property and resistance to the electrolytic solution can be obtained.

Note that, without limitation to a laminated power storage unit, a coin-type power storage unit or a square-type power storage unit may be used, for example.

Further, a lithium-ion capacitor may be used as the power storage unit 913.

A lithium-ion capacitor a hybrid capacitor including a combination of a positive electrode of an electric double layer capacitor (EDLC) and a negative electrode of a lithium ion battery formed using a carbon material and is also an asymmetric capacitor where power storage principles of the positive electrode and the negative electrode are different from each other. The positive electrode forms an electrical double layer and enables charge and discharge by a physical action, whereas the negative electrode enables charge and discharge by a chemical action of lithium. In a lithium-ion capacitor, a negative electrode in which lithium is received in a negative electrode active material such as a carbon material is used, whereby energy density is much higher than that of a conventional electric double layer capacitor whose negative electrode is formed using active carbon.

In the lithium-ion capacitor, instead of the above positive electrode active material layer, a material capable of reversibly having at least one of lithium ions and anions is used. Examples of such a material include active carbon, a conductive high molecule, a polyacenic semiconductor (PAS), and the like.

The lithium-ion capacitor has high charge and discharge efficiency which allows rapid charge and discharge and has a long life even when it is repeatedly used.

As the negative electrode of such a lithium-ion capacitor, the above negative electrode is used. Thus, initial irreversible capacity is suppressed, so that a power storage device having improved cycle characteristics can be fabricated. Further, a power storage device having excellent high temperature characteristics can be fabricated.

Embodiment 6

In this embodiment, electrical devices will be described.

Here, electrical devices refer to industrial products including portions which operate with electric power. Electrical devices are not limited to consumer products such as home electrical products and also include products for various uses such as business use, industrial use, and military use in their category.

Examples of electrical devices which can use the power storage device of one embodiment of the present invention are as follows: display devices of televisions, monitors, and the like, lighting devices, desktop personal computers, laptop personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, remote controllers, clocks such as table clocks and wall clocks, cordless phone handsets, transceivers, mobile phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, radiation counters, electric massagers, and dialyzers. The examples also include industrial equipment such as guide lights, traffic lights, meters such as gas meters and water meters, belt conveyors, elevators, escalators, automatic vending machines, automatic ticket machine, cash dispensers (CD), automated teller machines (ATM), digital signage, industrial robots, radio relay stations, mobile phone base stations, power storage systems, and secondary batteries for leveling the amount of power supply and smart grid. In addition, moving objects (transporters) driven by an electric motor using electric power from a secondary battery are also included in the category of the electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, agricultural machines, motorized bicycles including motor-assisted bicycles, motorcycles, electric wheelchairs, electric carts, boats or ships, submarines, aircrafts such as fixed-wing aircraft and rotary-wing aircraft, rockets, artificial satellites, space probes, planetary probes, and spacecrafts.

In the electrical devices, the power storage device of one embodiment of the present invention can be used as a main power source for supplying enough electric power for almost the whole power consumption. Alternatively, in the electrical devices, the power storage device of one embodiment of the present invention can be used as an uninterruptible power source which can supply power to the electrical devices when the supply of power from the main power source or a commercial power source is stopped. Further alternatively, in the electrical devices, the power storage device of one embodiment of the present invention can be used as an auxiliary power source for supplying electric power to the electrical devices at the same time as the power supply from the main power source or a commercial power source.

Figure 18A:
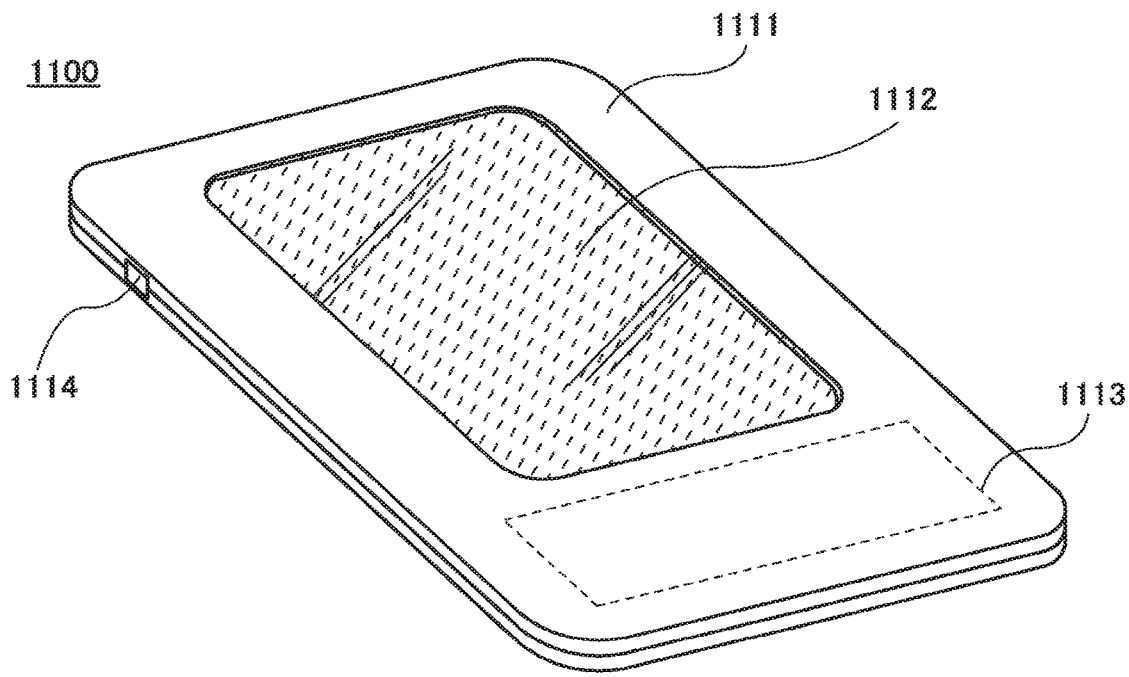
FIGS. 18A and 18B illustrate an example of an electrical device.
Figure 18B:
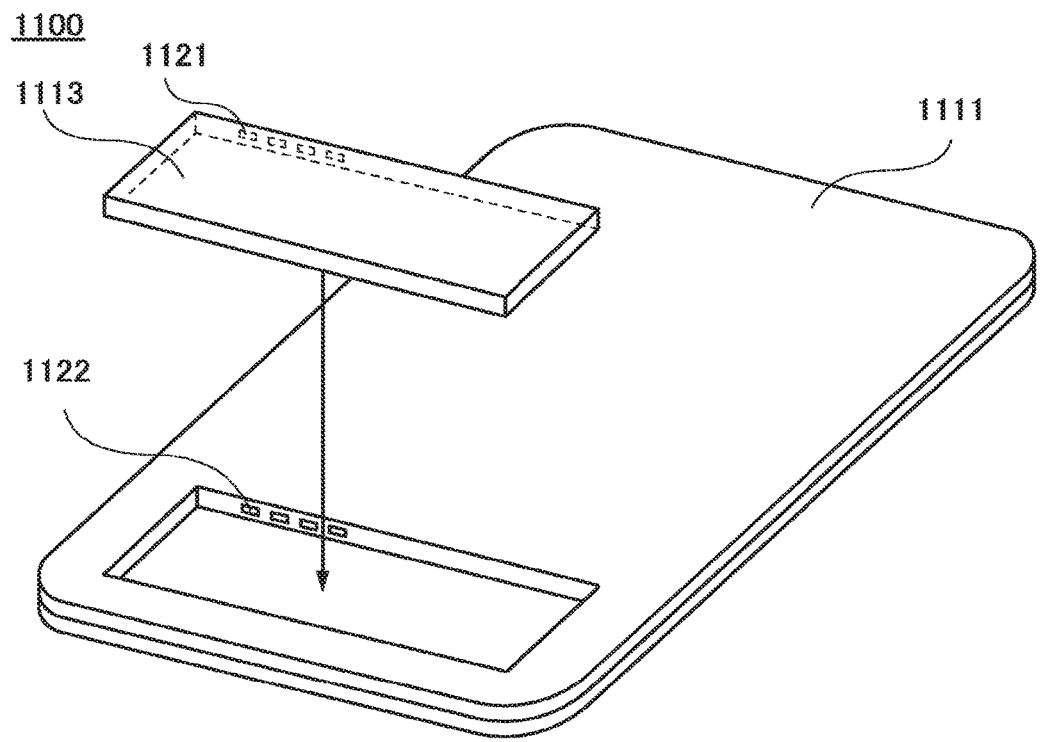

FIGS. 18A and 18B illustrate a portable terminal as an example of an electrical device. FIG. 18A illustrates the front side of the portable terminal and FIG. 18B illustrates the rear side of the portable terminal.

A portable terminal 1100 shown in FIGS. 18A and 18B includes a housing 1111, a display portion 1112, a power storage device 1113, and a power switch 1114.

Part of the display portion 1112 can be a touch panel region, and data can be input by touching operation keys that are displayed. Note that the whole display portion 1112 may have a touch panel function.

As the display portion 1112, for example, an electroluminescent (EL) display module or a liquid crystal display module can be used.

The power storage device 1113 is a cassette-type battery. The power storage device 1113 includes terminals 1121, the number of which is not particularly limited. When the power storage device 1113 is embedded in a depressed portion of the housing 1111, the terminals 1121 are connected to terminals 1122 provided on the housing 1111. Thus, power can be supplied to circuits inside the housing 1111 from the power storage device 1113. Note that the power storage device 1113 being embedded in the depressed portion of the housing 1111 may be exposed, or a cover may be provided over the power storage device 1113. Here, the power storage device 1113 can be detached from the portable terminal 1100; however, one embodiment of the present invention is not limited thereto. It is possible not to allow a user of the portable terminal 1100 to detach the power storage device 1113. With the structure in which the power storage device 1113 is embedded in the depressed portion of the housing 1111, flexibility of the layout of components inside the portable terminal 1100 is increased, so that the portable terminal 1100 can be reduced in size and thickness. In this case, power can be transmitted and received with the power storage device 1113 placed inside the portable terminal 1100. Note that even in the case where the power storage device 1113 is detachable from the portable terminal 1100, power may be transmitted and received with the power storage device 1113 placed inside the portable terminal 1100.

The portable terminal illustrated in FIGS. 18A and 18B can have a function of displaying various kinds of data (e.g., a still image, a moving image, and a text image), a function of displaying a calendar, the date, the time, or the like on the display portion, a touch-input function of operating or editing data displayed on the display portion by touch input, a function of controlling processing by various kinds of software (programs), and the like.

Figure 19:
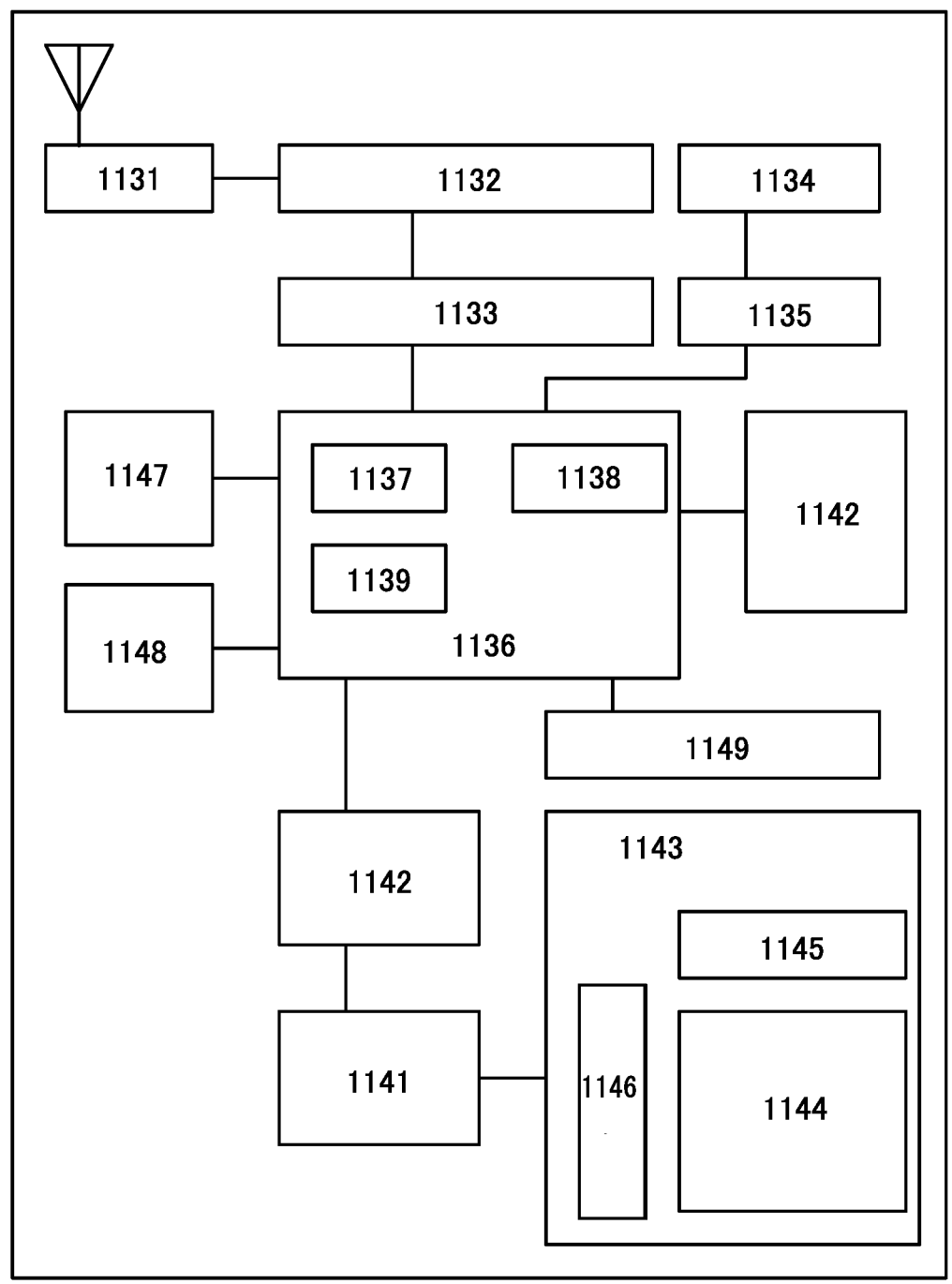
FIG. 19 illustrates an example of an electrical device.

FIG. 19 is a block diagram illustrating an example of a portable terminal. The portable terminal illustrated in FIG. 19 includes, for example, a wireless communication circuit 1131, an analog baseband circuit 1132, a digital baseband circuit 1133, a power storage device 1134, a power supply circuit 1135, an application processor 1136, a display controller 1141, a memory 1142, a display 1143, a touch sensor 1149, an audio circuit 1147 (such as a speaker or a microphone), a keyboard 1148 that is one of input means, and the like.

The power storage device 1134 corresponds to the power storage device 1113 in FIGS. 18A and 18B, and other components correspond to a load.

The wireless communication circuit 1131 has a function of receiving radio waves including data, for example. For example, an antenna or the like is used as the wireless communication circuit 1131.

With the touch sensor 1149, a display portion 1144 the display 1143 can be operated.

The display 1143 includes the display portion 1144, a source driver 1145, and a gate driver 1146. Operation of the display portion 1144 is controlled by the source driver 1145 and the gate driver 1146.

The application processor 1136 includes a CPU 1137, a digital signal processor (also referred to as a DSP) 1138, and an interface (also referred to as an IF) 1139.

The memory 1142 usually includes an SRAM or a DRAM; however, when the memory described with reference to FIG. 8 is used, for example, a unit price per bit of a memory can be reduced and power consumption of the memory 1142 can be reduced.

Further, an operation example of the portable terminal shown in FIG. 19 will be described.

First, as image is formed as a result of reception of radio waves including data, or by the application processor 1136. The data stored in the memory 1142 is output to the display 1143 through the display controller 1141 and an image based on the input image data is displayed by the display 1143. In the case where the image is not changed, the data is read from the memory 1142 at a frequency of, usually, higher than or equal to 60 Hz and lower than or equal to 130 Hz, and the read data is continuously transmitted to the display controller 1141. In the case where the user carries out an operation of rewriting the image, a new image is formed by the application processor 1136, and the image is stored in the memory 1142 as data. The stored image data is read periodically from the memory 1142 even during that time. After the new image data is stored in the memory 1142, in the next frame period for the display 1143, the data stored in the memory 1142 is read and the read data is output to the display 1143 through the display controller 1141. The display 1143 to which the data is input displays an image based on the input image data. The above-described read operation is repeated until when next data is stored in the memory 1142. Data is written to and read from the memory 1142 in this manner, whereby the display 1143 displays an image.

Figure 20A:
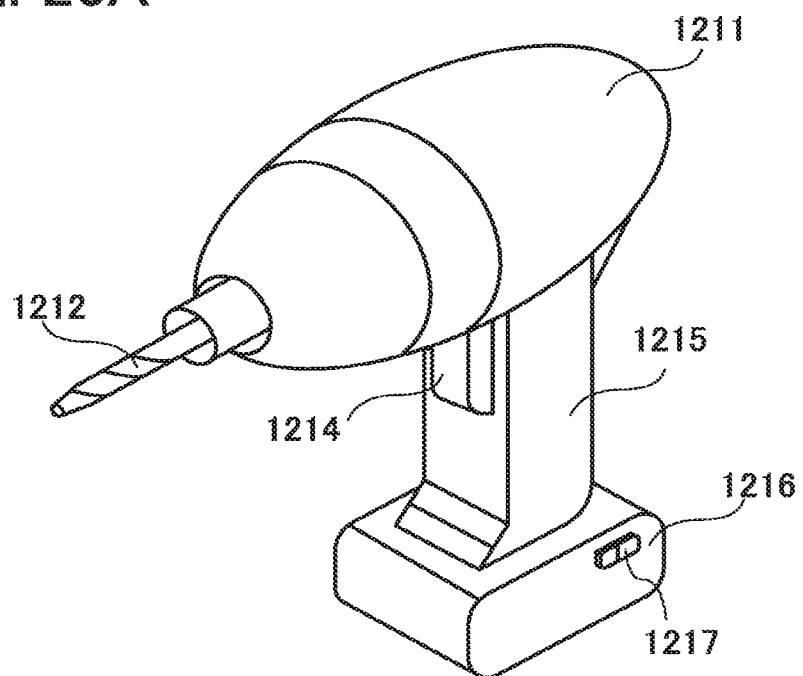
FIGS. 20A and 20B each illustrate an example of an electrical device.
Figure 20B:
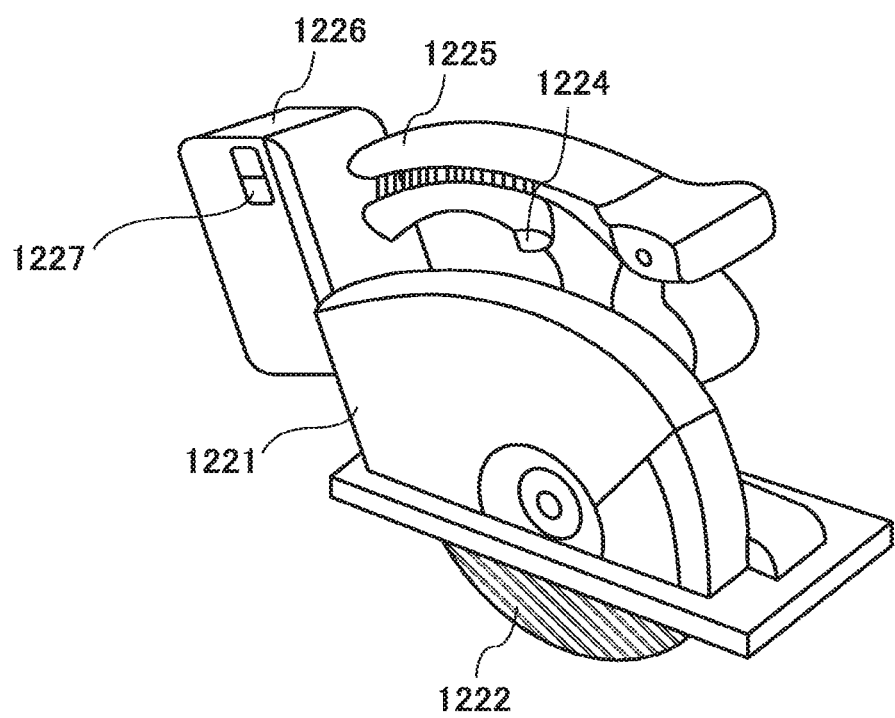

FIGS. 20A and 20B each show an example of an electric power tool.

The electric power tool in FIG. 20A includes a housing 1211, a tip tool 1212, a trigger switch 1214, a power storage device 1216, and an attachment/detachment switch 1217. Note that the electric power tool in FIG. 20A may be an electric drill or an electric driver.

The housing 1211 includes a handle portion 1215.

As the tip tool 1212, for example, a drill, a plus driver bit, or a minus driver bit can be used. Note that the tip tool 1212 may be made detachable and any of a drill, a plus driver bit, and a minus driver bit may be used in accordance with the purpose.

In the case of the electric power tool in FIG. 20A, a power switch is turned on, the handle portion 1215 is gripped, and the trigger switch 1214 is turned on, whereby the tip tool 1212 can be operated.

The power storage device 1216 can be attached and detached by switching the attachment/detachment switch 1217. The power storage device 1216 has terminals as in the portable terminal shown in FIGS. 18A and 18B. When the terminals of the power storage device 1216 are connected to terminals provided on the housing 1211, power can be supplied to the housing 1211 from the power storage device 1216.

The electric power tool in FIG. 20B includes a housing 1221, a blade 1222, a trigger switch 1224, a power storage device 1226, and an attachment/detachment switch 1227. Note that the electric power tool in FIG. 20B may be an electric cutter.

The housing 1221 includes a handle portion 1225.

In the case of the electric power tool in FIG. 20B, the handle portion 1225 is gripped and the trigger switch 1224 is turned on, whereby the blade 1222 rotates and cutting operation or the like can be performed.

The power storage device 1226 can be attached and detached by switching the attachment/detachment switch 1227. The power storage device 1226 has terminals as in the portable terminal shown in FIGS. 18A and 18B. When the terminals of the power storage device 1226 are connected to terminals provided on the housing 1221, power can be supplied to the housing 1221 from the power storage device 1226.

Further, an example of charging the above electrical device will be described with reference to FIGS. 21A and 21B.

Figure 21A:
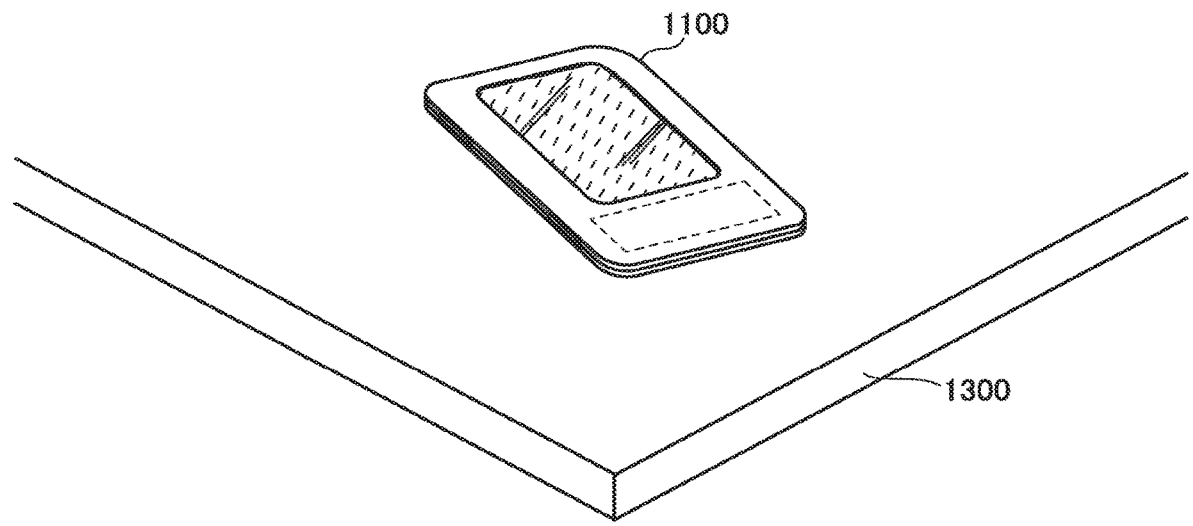
FIGS. 21A and 21B illustrate an example of an electrical device.
Figure 21B:
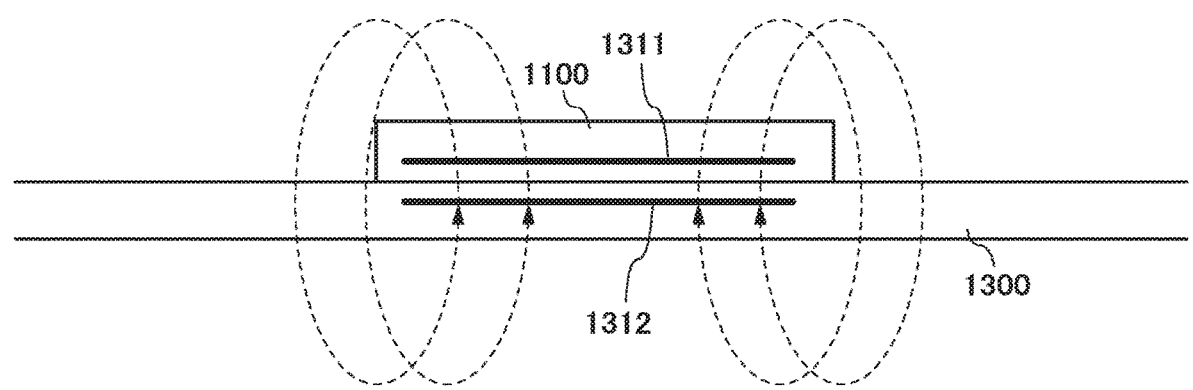

FIG. 21B shows an example where the portable terminal 1100 shown in FIGS. 18A and 18B is placed over a power feeding device 1300.

In FIG. 21B, the portable terminal is viewed from the bottom side. For example, when an electromagnetic induction method is used, as shown in FIG. 21B, an antenna 1311 provided for the portable terminal 1100 and an antenna 1312 provided for the power feeding device 1300 are electromagnetically coupled to form a power transmission transformer, whereby power can be supplied to the portable terminal 1100.

Figure 22:
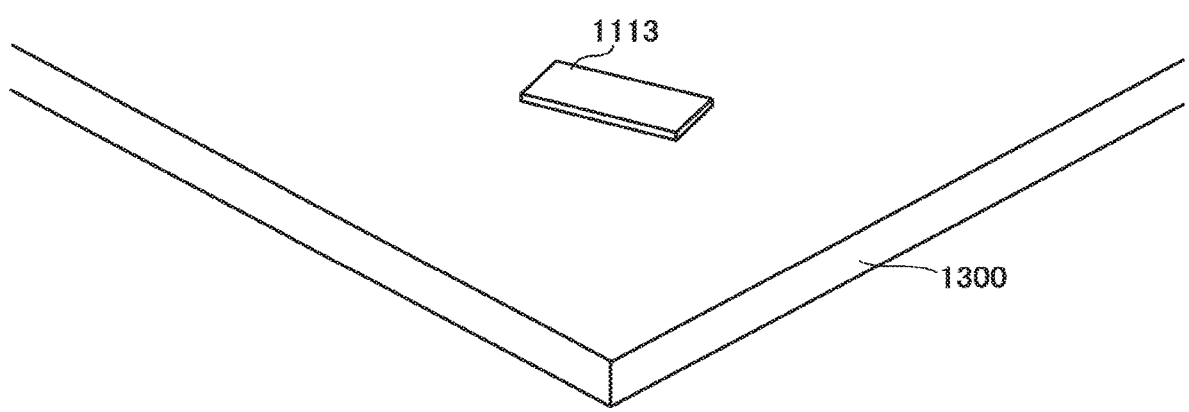
FIG. 22 illustrates an example of an electrical device.

Although FIGS. 21A and 21B illustrate an example where the portable terminal 1100 is placed over the power feeding device 1300, the power storage device 1113 may be detached from the portable terminal 1100 and placed over the power feeding device 1300 as shown in FIG. 22.

There is no particular limitation on the structure of the power feeding device 1300. For example, a moving coil method in which the location of the portable terminal 1100 is detected and the antenna 1312 is moved so as to overlap with the portable terminal 1100 and perform charging of the portable terminal 1100, a multi-coil method in which a plurality of antennas 1312 is provided and charging is performed with the antenna 1312 that overlaps with the portable terminal 1100, or the like may be used.

Electrical devices which can be charged by the power feeding device 1300 are not limited to the above.

Figure 23:
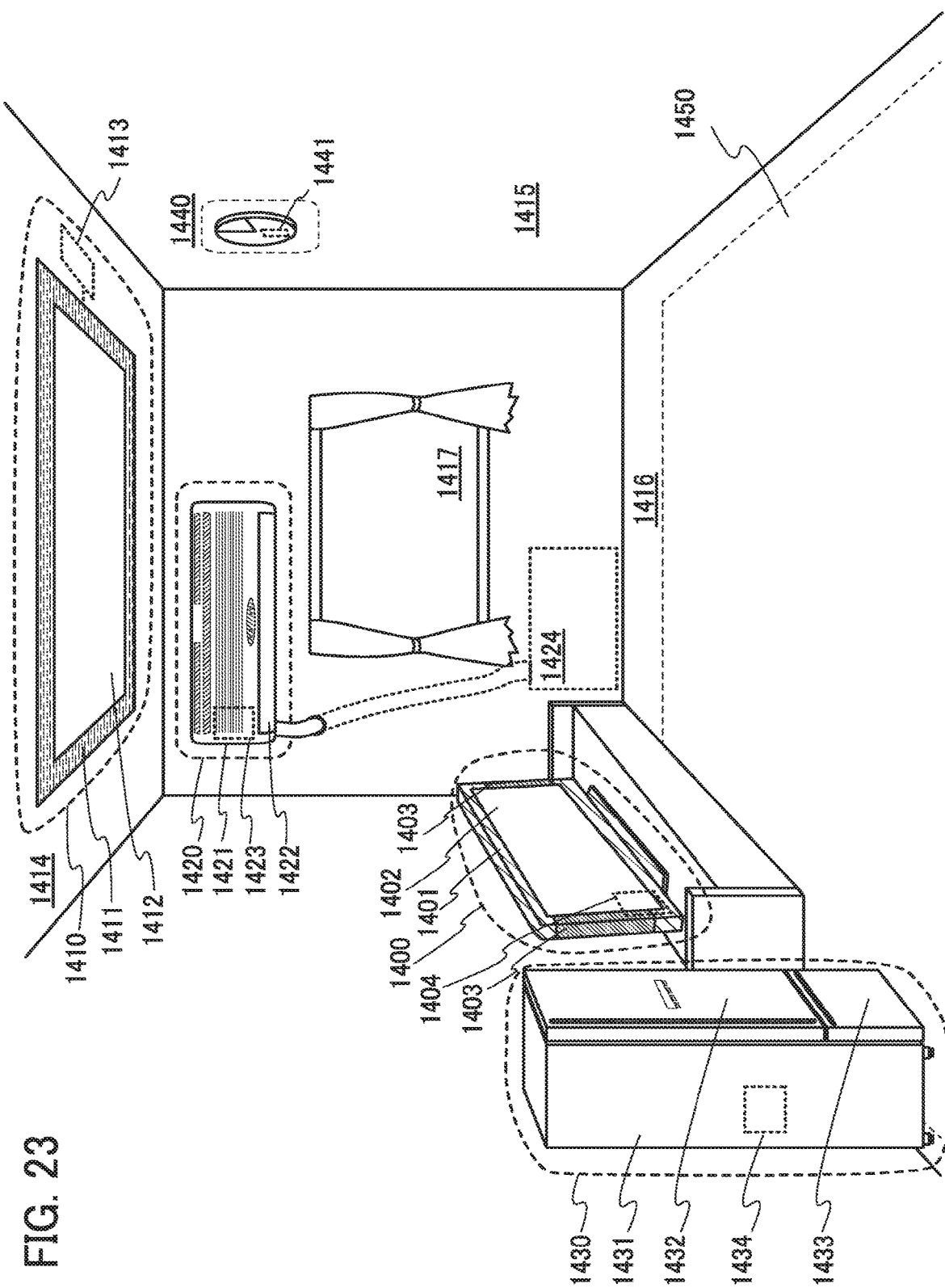
FIG. 23 illustrates examples of electrical devices.

FIG. 23 illustrates specific structures of electrical devices. A display device 1400 in FIG. 23 which can be supplied with power from a power feeding device 1450 is an example of an electrical device including a power storage device 1404 of one embodiment of the present invention. Specifically, the display device 1400 corresponds to a display device for TV broadcast reception and includes a housing 1401, a display portion 1402, speaker portions 1403, the power storage device 1404, and the like. The power storage device 1404 of one embodiment of the present invention is provided in the housing 1401. The display device 1400 can receive electric power from a commercial power source or can use electric power stored in the power storage device 1404. Thus, the display device 1400 can be operated with the use of the power storage device 1404 of one embodiment of the present invention as an uninterruptible power source even when electric power cannot be supplied from a commercial power source due to power failure or the like.

A semiconductor display device such as a liquid crystal display device, a light emitting device in which a light-emitting element such as an organic EL element is provided in each pixel, an electrophoresis display device, a digital micromirror device (DMD), a plasma display panel (PDP), or a field emission display (FED) can be used for the display portion 1402.

Note that the display device includes, in its category, all of information display devices for personal computers, advertisement displays, and the like in addition to TV broadcast reception.

An installation lighting device 1410 in FIG. 23 which can be supplied with power from the power feeding device 1450 is an example of an electrical device including a power storage device 1413 of one embodiment of the present invention. Specifically, the lighting device 1410 includes a housing 1411, a light source 1412, the power storage device 1413, and the like. Power is supplied to the power storage device 1413 from the power feeding device 1450. FIG. 23 shows the case where the power storage device 1413 is provided in a ceiling 1414 on which the housing 1411 and the light source 1412 are installed; alternatively, the power storage device 1413 may be provided in the housing 1411. The lighting device 1410 can receive electric power from a commercial power source. Alternatively, the lighting device 1410 can use electric power stored in the power storage device 1413. Thus, the lighting device 1410 can be operated with the use of the power storage device 1413 of one embodiment of the present invention as an uninterruptible power source even when electric power cannot be supplied from the commercial power source due to power failure or the like.

Note that although the installation lighting device 1410 provided in the ceiling 1414 is illustrated in FIG. 23 as an example, the power storage device of one embodiment of the present invention can be used in an installation lighting device provided in, for example, a wall 1415, a floor 1416, a window 1417, or the like other than the ceiling 1414. Alternatively, the power storage device can be used in a tabletop lighting device and the like.

As the light source 1412, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

An air conditioner including an indoor unit 1420 and an outdoor unit 1424 in FIG. 23, which can be supplied with power from the power feeding device 1450, is an example of an electrical device including a power storage device 1423 of one embodiment of the present invention. Specifically, the indoor unit 1420 includes a housing 1421, an air outlet 1422, the power storage device 1423, and the like. Although FIG. 23 illustrates the case where the power storage device 1423 is provided in the indoor unit 1420, the power storage device 1423 may be provided in the outdoor unit 1424. Alternatively, the power storage device 1423 may be provided in both the indoor unit 1420 and the outdoor unit 1424. The air conditioner can receive electric power from a commercial power source. Alternatively, the air conditioner can use electric power stored in the power storage device 1423. Particularly in the case where the power storage devices 1423 are provided in both the indoor unit 1420 and the outdoor unit 1424, the air conditioner can be operated with the use of the power storage device 1423 of one embodiment of the present invention as an uninterruptible power source even when electric power cannot be supplied from a commercial power source due to power failure or the like.

Note that although the split-type air conditioner including the indoor unit and the outdoor unit is illustrated in FIG. 23 as an example, the power storage device of one embodiment of the present invention can be used in an air conditioner in which the functions of an indoor unit and an outdoor unit are integrated in one housing.

An electric refrigerator-freezer 1430 in FIG. 23 which can be supplied with power from the power feeding device 1450 is an example of an electrical device including a power storage device 1434 of one embodiment of the present invention. Specifically the electric refrigerator-freezer 1430 includes a housing 1431, a door for a refrigerator 1432, a door for a freezer 1433, the power storage device 1434, and the like. The power storage device 1434 is provided in the housing 1431 in FIG. 23. The electric refrigerator-freezer 1430 can receive electric power from a commercial power source. Alternatively, the electric refrigerator-freezer 1430 can use electric power stored in the power storage device 1434. Thus, the electric refrigerator-freezer 1430 can be operated with the use of the power storage device 1434 of one embodiment of the present invention as an uninterruptible power source even when electric power cannot be supplied from a commercial power source due to power failure or the like.

A clock 1440 in FIG. 23 which can be supplied with power from the power feeding device 1450 is an example of an electrical device including a power storage device 1441 of one embodiment of the present invention.

Note that among the electrical devices described above, a high-frequency heating apparatus such as a microwave oven and an electrical device such as an electric rice cooker require high power in a short time. The tripping of a circuit breaker of a commercial power source in use of electrical devices can be prevented by using the power storage device of one embodiment of the present invention as an auxiliary power source for supplying electric power which cannot be supplied enough by a commercial power source.

In addition, in a time period when electrical devices are not used, particularly when the proportion of the amount of electric power which is actually used to the total amount of electric power which can be supplied from a commercial power source (such a proportion referred to as a usage rate of electric power) is low, electric power can be stored in the power storage device, whereby the usage rate of electric power can be reduced in a time period when the electrical devices are used. For example, in the case of the electric refrigerator-freezer 1430, electric power can be stored in the power storage device 1434 in night time when the temperature is low and the door for a refrigerator 1432 and the door for a freezer 1433 are not often opened or closed. On the other hand, in daytime when the temperature is high and the door for a refrigerator 1432 and the door for a freezer 1433 are frequently opened and closed, the power storage device 1434 is used as an auxiliary power supply; thus, the usage rate of electric power in daytime can be reduced.

Further, an example of the moving object which is an example of the electrical devices is described with reference to FIGS. 24A and 24B.

The power storage device described in any of the above embodiments can be used as a power storage device for controlling the moving object. The power storage device for controlling the moving object can be externally charged by electric power supply using plug-in systems or contactless power feeding. Note that in the case where the moving object is an electric railway vehicle, the electric railway vehicle can be charged by electric power supply from an overhead cable or a conductor rail.

Figure 24A:
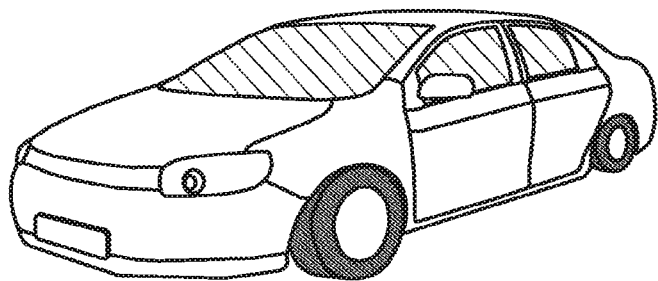
FIGS. 24A and 24B illustrate an example of an electrical device.
Figure 24B:
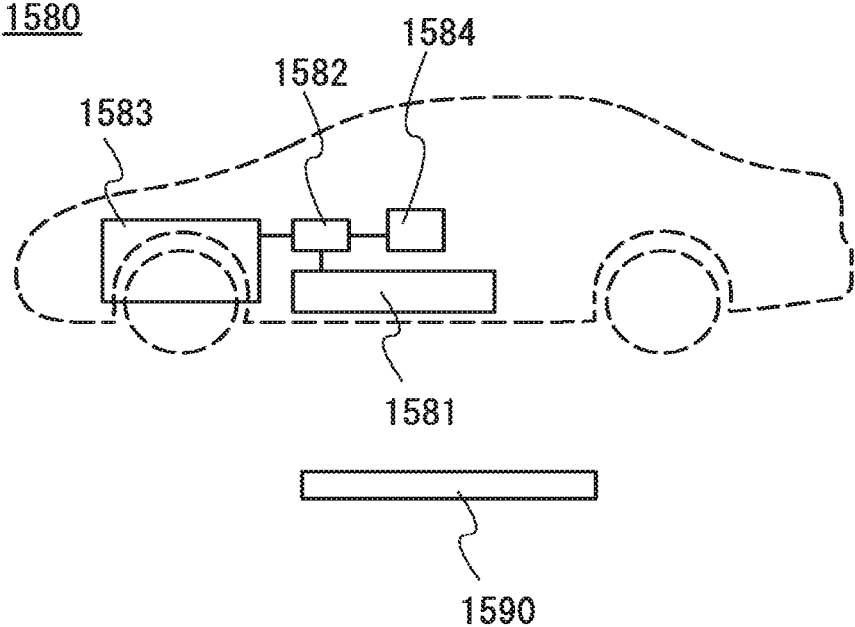

FIGS. 24A and 24B illustrate an example of an electric vehicle which can be supplied with power from a power feeding device 1590. An electric vehicle 1580 is equipped with a power storage device 1581 of one embodiment of the present invention. Power is supplied to the power storage device 1581 from the power feeding device 1590. The output of power of the power storage device 1581 is controlled by a control circuit 1582 and the power is supplied to a driving device 1583. The control circuit 1582 is controlled by a processing unit 1584 including a ROM, a RAM, a CPU, or the like which is not illustrated.

The driving device 1583 includes a DC motor or an AC motor either alone or in combination with an internal-combustion engine. The processing unit 1584 outputs a control signal to the control circuit 1582 on the basis of input data such as data of operation (e.g., acceleration, deceleration, or stop) by a driver or data during driving (e.g., data on an upgrade or a downgrade, or data on a load on a driving wheel) of the electric vehicle 1580. The control circuit 1582 adjusts the electric energy supplied from the power storage device 1581 in accordance with the control signal of the processing unit 1584 to control the output of the driving device 1583. In the case where the AC motor is mounted, although not illustrated, an inverter which converts direct current into alternate current is also incorporated.

The power storage device 1581 can be charged with power supplied from the power feeding device 1590. The power storage device 1581 can be charged by converting the supplied power into DC constant voltage having a predetermined voltage level through a converter such as an AC-DC converter. When the power storage device of one embodiment of the present invention is provided as the power storage device 1581, capacity of the battery can be increased and improved convenience can be realized.

As the power feeding device described using any of FIGS. 20A and 20B, FIGS. 21A and 21B, FIG. 22, FIG. 23, and FIGS. 24A and 24B, the device 200 described in Embodiment 1 can be used, for example.

As the power storage device described using any of FIGS. 20A and 20B, FIGS. 21A and 21B, FIG. 22, FIG. 23, and FIGS. 24A and 24B, the device 100 described in Embodiment 1 can be used, for example.

Note that a plurality of power storage devices can be charged by one power feeding device 1450. For example, the power feeding device 1450 can transmit inquiry signals to electrical devices wirelessly and sequentially feed power to the electrical devices in accordance with response signals from the electrical devices. In that case, each power storage device may have an anti-collision function so that the power storage devices can respond to radio waves received from the power feeding device 1450 at different timings. For example, in the case where the power storage devices have different identification data from each other, the power storage device which is to respond can be selected in accordance with the identification data. Therefore, the power storage devices can respond at different timings. Thus, for example, in the case where the power feeding device 1450 has a plurality of oscillation circuits, the power feeding device 1450 can sequentially feed power to a plurality of power storage devices by individually controlling the oscillation circuits. Alternatively, the power feeding device 1450 can feed power to the power stowage devices concurrently.

As described above, the power storage device of one embodiment of the present invention can be applied to a variety of electrical devices.

EXAMPLE

In this example, an example of a power storage device is described.

The power storage device of this example is a coin-type power storage device.

A positive electrode was fabricated as follows: $LiFePO_4$ particles whose surfaces are provided with carbon layers and NMP (N-methylpyrrolidone) were stirred and mixed in a mixer at 2000 rpm for 3 minutes.

Next, ultrasonic vibration was applied for 3 minutes and the mixture was stirred and mixed in a mixer at 2000 rpm for 1 minute. This step was repeated 5 times.

Next, graphene oxide was added to the mixture and stirring and mixing of the mixture in a mixer at 2000 rpm for 2 minutes were performed 8 times.

After that, PVDF (produced by KURERA CORPORATION) was added as a binder and the mixture was stirred and mixed in a mixer at 2000 rpm for 2 minutes once.

Moreover, NMP was added and the mixture was stirred and mixed at 2000 rpm for 2 minutes. This step was repeated until the viscosity of the sample became suitable for application.

Note that the compounding ratio of $LiFePO_4$ particles provided with carbon layers to graphene oxide and PVDF was 91.4:0.6:8 (wt %).

Through the above steps, slurry was formed. Then, the slurry was applied over a 20-μm-thick aluminum foil with an applicator. Here, the distance between an applicator member of the applicator and a surface where the slurry was applied was 230 μm and the application rate was 10 mm/sec.

The above sample was dried in hot air at 80° C. for 40 minutes, and then pressed with a roller press machine. Moreover, the sample was heated at 170° C. in a reduced pressure atmosphere for 10 hours and pressed again. The obtained electrode was stamped out, whereby the positive electrode was fabricated. Note that the temperature of the roller of the press machine was 120° C., and pressing was performed under conditions such that the thickness of the positive electrode was reduced by 20%. In the positive electrode, the thickness of an active material layer was 58 μm, the electrode density was 1.82 $g/cm^3$, the $LiFePO_4$ content was about 9.7 $mg/cm^2$, and the single-electrode theoretical capacity was about 1.6 $mAh/cm^2$.

The $LiFePO_4$ particles whose surfaces are provided with carbon layers were fabricated by a solid phase method in the following manner. Raw materials $Li_2CO_3$, $FeC_2O_4 \cdot 2H_2O$, and $NH_4H_2PO_4$ were weighed in a dry room (dew point −70° C. to −55° C.) so as to satisfy a molar ratio of 2:1:1.

Next, the raw materials were mixed and crushed with a ball mill. Here, a planetary ball mill was used. With the use of a 500 ml zirconia pot and 300 g of zirconia balls with a diameter of 3 mm, the raw materials with a total weight of 150 g were subjected to ball milling at a rotation speed of 300 rpm for 2 hours. In the mixing and crushing, 250 ml acetone containing 0.0068% water (produced by KANTO CHEMICAL CO., INC.) was used as a solvent.

Next, drying was performed with a hot plate at 50° C. in a dry room for 1 hour to 2 hours.

Then, with the use of a vacuum dryer, drying was performed in a vacuum of 0.1 MPa at 80° C. for 2 hours in the dry room.

Next, with the use of a muffle furnace, baking was performed at 350° C. for 10 hours. Here, the $N_2$ flow rate was 5 L/min.

Next, glucose was weighed so as to be 10 wt % with respect to the baked sample, and the baked sample and the glucose was mixed and crushed with a ball mill. The device and method used here were the same as those for the above mixing and crushing.

Next, drying was performed with a hot plate at 50° C. in the dry room for 1 hour to 2 hours.

Then, with the use of a vacuum dryer, drying was performed in a vacuum of 0.1 MPa at 80° C. for 2 hours in the dry room.

Next, with the use of a muffle furnace, baking was performed at 600° C. for 10 hours.

Then, aggregates of particles of the active material were cracked with the ball mill in the dry room. The cracking was performed in the same condition as the mixing and crushing of the raw materials except that the rotation speed was 200 rpm and treatment time was 30 minutes.

Next, drying was performed with a hot plate at 50° C. in the dry room for 1 hour to 2 hours.

Then, with the use of a vacuum dryer, drying was performed in a vacuum of 0.1 MPa at 175° C. for 2 hours in the dry room.

Through the above steps, the $LiFePO_4$ particles whose surfaces are provided with carbon layers were fabricated. The diameter of a primary particle of the obtained $LiFePO_4$ was greater than or equal to 50 nm and less than or equal to 300 nm, and the diameter of a secondary particle thereof was 2 μm or less.

Graphene oxide was fabricated by a Hummers method in the following manner. Graphite was mixed with $KMO_4$ and sulfuric acid to be oxidized. The obtained graphite oxide was cleaned with hydrochloric acid and then dispersed in water, and part of the graphite oxide was separated with an ultrasonic cleaning machine. Then, hydrochloric acid was removed, and moisture was removed with an evaporator and ethanol under a reduced pressure. Moreover, the obtained sample was crushed with a dancing mill and dried. Through the above steps, graphene oxide was fabricated.

A negative electrode was fabricated as follows. MCMB particles whose surfaces are provided with silicon oxide layers, NMP, and PVDF were stirred and mixed in a mixer at 2000 rpm for 5 minutes. Note that the weight ratio of PVDF to MCMB was 10 wt % (weight percent).

Moreover, NMP was added and the mixture was stirred and mixed at 2000 rpm for 5 minutes. This step was repeated until the viscosity of the sample became suitable for application.

Through the above steps, slurry was formed. Then, the slurry was applied over a 18-μm-thick copper foil with an applicator. Here, the distance between an applicator member of the applicator and a surface where the slurry was applied was 230 μm and the application rate was 10 mm/sec.

The above sample was dried in hot air at 70° C. for 40 minutes, and then pressed with a roller press machine. Moreover, the sample was heated at 170° C. in a reduced pressure atmosphere for 10 hours and pressed again. The obtained electrode was stamped out, whereby the negative electrode was fabricated. Note that the temperature of the roller of the press machine was 120° C., and pressing was performed under conditions such that the thickness of the positive electrode was reduced by 20%. In the negative electrode, the thickness of an active material, layer was 89 μm, the electrode density was 1.42 $g/cm^3$, the MCMB content was about 11.4 $mg/cm^2$, and the single-electrode theoretical capacity was about 4.2 $mAh/cm^2$.

The MCMB particles provided with silicon oxide layers were fabricated by a sol-gel method in the following manner. Silicon ethoxide, hydrochloric acid, and toluene were mixed and stirred to give a $Si(OEt)_4$ toluene solution. At this time, the amount of silicon ethoxide was determined so that silicon oxide formed later was 1 wt % (weight percent) with respect to MCMB. The compounding ratio of this solution was as follows: $Si(OEt)_4$ was $3.14 \times 10^{-4}$ mol; 1N hydrochloric acid, $2.91 \times 10^{-4}$ mol; and toluene, 2 ml.

Next, MCMB, particles of which have an average grain size of 9 μm, was added to the $Si(OEt)_4$ toluene solution and the mixture was stirred in the dry room. After that, the obtained solution was kept at 70° C. for 3 hours in a humid environment.

Next, baking as performed with a muffle furnace at 500° C. in a nitrogen atmosphere for 3 hours.

Then, aggregates of particles of the active material were cracked with a mortar, whereby the MCMB particles provided with silicon oxide layers were fabricated.

Moreover, a CR2032 coin-type cell (with a diameter of 20 mm and a height of 3.2 mm) was fabricated with the use of the above positive electrode and negative electrode. Here, 25-μm-thick polypropylene was used as a separator. An electrolytic solution formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 3:7 was used as an electrolytic solution.

Further, the charge and discharge capacity of the fabricated coin-type cell was evaluated. For the evaluation, a charge and discharge test was performed with a galvanostatic charge and discharge apparatus (TOSCAT-3100 manufactured by TOYO SYSTEM CO., LTD) under the following conditions: environmental temperature of 25° C., charge and discharge rate of 0.2 C (34 mA/g), the upper limit voltage of 4.0 V, and the lower limit voltage of 2.0 V.

Figure 25:
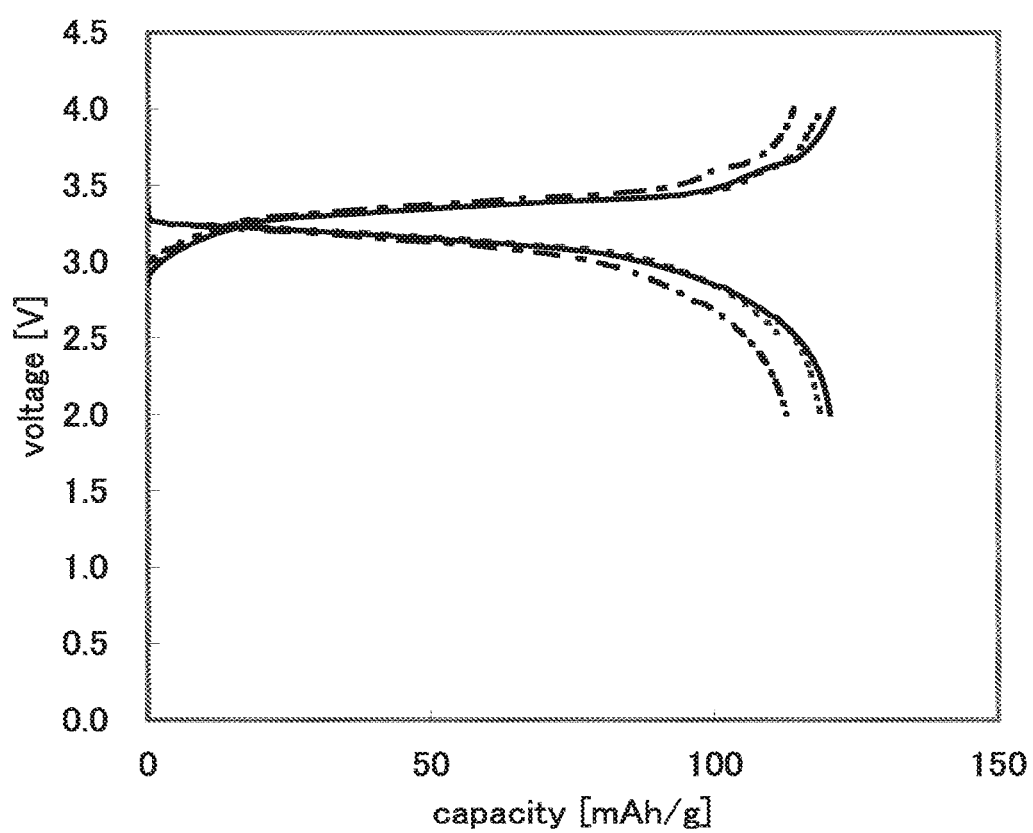
FIG. 25 shows charge and discharge characteristics of a power storage device.

FIG. 25 shows the results of the charge and discharge test. In FIG. 25, the horizontal axis represents capacity (mAh/g) and the vertical axis represents voltage (V). Three samples were evaluated and the results are shown by a solid line, a chain line, and a dotted line.

FIG. 25 shows that the maximum values of the charge capacity and the discharge capacity of all the samples were about 120 mAh/g. This means that it is possible to form a power storage device using the above positive electrode and negative electrode.

This application is based on Japanese Patent Application serial no. 2012-272121 filed with Japan Patent Office on Dec. 13, 2012, the entire contents of which are hereby incorporated by reference.

What is claimed is:

1. A power storage device comprising:
   a power receiving circuit;
   a power storage unit;
   a first transistor between the power receiving circuit and the power storage unit;
   a second transistor between the first transistor and the power storage unit;
   a third transistor between the second transistor and the power storage unit; and
   a control circuit electrically connected to a gate of the first transistor, a gate of the second transistor, a gate of the third transistor, and the power storage unit,
   wherein the power receiving circuit is electrically connected to a one of a source and a drain of the first transistor,
   wherein the other one of the source and the drain of the first transistor is electrically connected to a one of a source and a drain of the second transistor, wherein the other one of the source and the drain of the second transistor is electrically connected to a one of a source and a drain of the third transistor, wherein the other one of the source and the drain of the third transistor is electrically connected to the power storage unit, wherein the second transistor is configured to serve as a protection switch for preventing overcharge of the power storage unit, wherein the third transistor is configured to serve as a protection switch for preventing over-discharge of the power storage unit, and wherein the control circuit includes:
- a first memory circuit configured to hold data in a period during which power is supplied to the control circuit from the power storage unit; and
- a second memory circuit configured to hold data in a period during which supply of the power to the control circuit from the power storage unit is stopped.

2. The power storage device according to claim 1, wherein the control circuit further includes:
- a processor that includes a register and is electrically connected to the gate of the first transistor;
- a memory that includes data for identifying the power storage device and is electrically connected to the processor; and
- a controller electrically connected to the processor and to the memory.

3. The power storage device according to claim 1, further comprising a protection circuit between the second memory circuit and the power storage unit.

4. The power storage device according to claim 1, wherein the data for identifying the power storage device includes at least one of data on an average voltage of the power storage device, a capacity of the power storage device, an energy density of the power storage device, a resistance of the power storage device, output power of the power storage device, cycle characteristics of the power storage device, a temperature of the power storage device, an operating temperature range of the power storage device, and an allowable charging current of the power storage device.

5. The power storage device according to claim 1, wherein the second memory circuit comprises a second transistor, and wherein an off-state current per micrometer of channel width of the second transistor is lower than or equal to 100 zA.

6. The power storage device according to claim 1, wherein the second memory circuit comprises a second transistor, and wherein the second transistor comprises a oxide semiconductor.

7. The power storage device according to claim 6, wherein the oxide semiconductor comprises at least one of In, Zn and Ga.

8. The power storage device according to claim 1, wherein the power receiving circuit is configured to receive power wirelessly.

* * * * *